United States Patent
Paynter et al.

(10) Patent No.: US 10,399,862 B2
(45) Date of Patent: Sep. 3, 2019

(54) PROCESS FOR TREATING A SULFUROUS FLUID TO FORM GYPSUM AND MAGNESIUM CARBONATE

(71) Applicant: Imerys USA, Inc., Roswell, GA (US)

(72) Inventors: Christopher Paynter, Atlanta, GA (US); Kalena Stovall, Atlanta, GA (US); Douglas Wicks, Johns Creek, GA (US); Gavin Butler-Lee, St. Austell (GB); Parvin Golbayani, Kennesaw, GA (US); Nigel Victor Jarvis, St. Austell (GB); Graham M. Pring, Lostwithiel (GB); David Taylor, Marietta, GA (US); Ricardo M. Perez, Cumming, GA (US)

(73) Assignee: Imerys USA, Inc., Roswell, GA (US)

( * ) Notice: Subject to any disclaimer, the term of this patent is extended or adjusted under 35 U.S.C. 154(b) by 17 days.

(21) Appl. No.: 15/543,594

(22) PCT Filed: Jan. 14, 2016

(86) PCT No.: PCT/US2016/013477
§ 371 (c)(1),
(2) Date: Jul. 14, 2017

(87) PCT Pub. No.: WO2016/115393
PCT Pub. Date: Jul. 21, 2016

(65) Prior Publication Data
US 2018/0002187 A1    Jan. 4, 2018

Related U.S. Application Data

(60) Provisional application No. 62/103,425, filed on Jan. 14, 2015, provisional application No. 62/127,687, (Continued)

(51) Int. Cl.
*C01F 11/18* (2006.01)
*D21H 17/67* (2006.01)
(Continued)

(52) U.S. Cl.
CPC ............ *C01F 11/18* (2013.01); *B01D 53/501* (2013.01); *C01F 5/24* (2013.01); *C01F 5/40* (2013.01);
(Continued)

(58) Field of Classification Search
CPC ........ C01F 11/468; C01F 11/464; C01F 5/40; C01F 5/24; C04B 14/28; C09C 1/021;
(Continued)

(56) References Cited

U.S. PATENT DOCUMENTS 3,904,742 A    9/1975  Akimoto
4,490,341 A   12/1984  Cares
(Continued)

FOREIGN PATENT DOCUMENTS

CN    101 760 638 A    6/2010

OTHER PUBLICATIONS

International Search Report and Written Opinion dated Apr. 7, 2016, in International Application No. PCT/US2016/013477 (7 pgs.).
(Continued)

*Primary Examiner* — Richard M Rump
(74) *Attorney, Agent, or Firm* — Finnegan, Henderson, Farabow, Garrett & Dunner LLP

(57) ABSTRACT

A process for treating a sulfurous fluid to form gypsum and magnesium carbonate, whereby the sulfurous fluid is scrubbed with a sequestrating agent to yield a scrubbed fluid, gypsum and magnesium sulfate. The flue gas desulfurized gypsum is isolated from the magnesium sulfate solution by filtration or centrifugation. The magnesium sulfate is reacted with a carbonate salt to produce a magnesium carbonate
(Continued)

whereby the reaction conditions are controlled to control the properties of the magnesium carbonate produced.

20 Claims, 41 Drawing Sheets

Related U.S. Application Data filed on Mar. 3, 2015, provisional application No. 62/132,385, filed on Mar. 12, 2015, provisional application No. 62/206,594, filed on Aug. 18, 2015.

(51) Int. Cl.
| | |
|---|---|
| *B01D 53/50* | (2006.01) |
| *C01F 5/24* | (2006.01) |
| *C01F 5/40* | (2006.01) |
| *C01F 11/46* | (2006.01) |
| *C04B 14/28* | (2006.01) |
| *C09C 1/02* | (2006.01) |
| *C08K 3/26* | (2006.01) |

(52) U.S. Cl.
CPC .......... *C01F 11/181* (2013.01); *C01F 11/182* (2013.01); *C01F 11/183* (2013.01); *C01F 11/185* (2013.01); *C01F 11/464* (2013.01); *C01F 11/468* (2013.01); *C04B 14/28* (2013.01); *C08K 3/26* (2013.01); *C09C 1/021* (2013.01); *D21H 17/67* (2013.01); *D21H 17/675* (2013.01); *B01D 53/502* (2013.01); *B01D 2251/404* (2013.01); *B01D 2251/606* (2013.01); *C01P 2002/76* (2013.01); *C01P 2004/03* (2013.01); *C01P 2004/51* (2013.01); *C01P 2004/61* (2013.01); *C01P 2004/62* (2013.01); *C01P 2006/12* (2013.01); *C01P 2006/60* (2013.01); *C01P 2006/80* (2013.01); *C08K 2003/265* (2013.01)

(58) Field of Classification Search
CPC ............ B01D 53/501; B01D 2251/404; B01D 2251/606; D21H 17/675; C01P 2006/80; C01P 2004/03; C01P 2004/61; C01P 2006/12

See application file for complete search history.

(56) References Cited

U.S. PATENT DOCUMENTS

| | | |
|---|---|---|
| 2009/0118564 A1 | 5/2009 | McCullough et al. |
| 2011/0166256 A1 | 7/2011 | Gallez et al. |
| 2012/0090517 A1 | 4/2012 | Radway |
| 2013/0036948 A1 | 2/2013 | Fernandez et al. |
| 2013/0243674 A1 | 9/2013 | Constantz et al. |

OTHER PUBLICATIONS

Extended European Search Report dated Aug. 3, 2018, corresponding to EP Application No. 16737912.2, 7 pages.

Smaller PSD with Increasing Feed Concentration
→

12% gypsum + 14%
ammonia-based carbonate
(aged 24 hrs), pure gypsum

35% gypsum + 33%
ammonia-based carbonate
(aged 19 hrs), FGD gypsum

PROCESS FOR TREATING A SULFUROUS FLUID TO FORM GYPSUM AND MAGNESIUM CARBONATE

CLAIM FOR PRIORITY

This application is a U.S. national phase entry under 35 U.S.C. § 371 from PCT international Application No. PCT/US2016/013477, filed Jan. 14, 2016, which claims the benefit of priority of U.S. Provisional Patent Application Nos. 62/103,425, filed Jan. 14, 2015, 62/127,687, filed Mar. 3, 2015, 62/132,385, filed Mar. 12, 2015, and 62/206,594, filed Aug. 18, 2015, to all of which this application claims the benefit of priority, and the entirety of the subject matter of all of which is incorporated herein by reference.

BACKGROUND OF THE DISCLOSURE

Technical Field

The present disclosure relates to a process for treating a sulfurous fluid to form gypsum and magnesium carbonate, whereby the properties of the gypsum and the magnesium carbonate are controlled.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A power plant is an industrial facility for the generation of electric power. Each power station contains one or more generators, a rotating machine that converts mechanical power into electrical power by creating relative motion between a magnetic field and a conductor. The energy source harnessed to turn the generator varies widely. Most power stations in the world burn fossil fuels such as coal, oil, and natural gas to generate electricity. Fossil fuel power plants are commonly coal-fired power stations. These coal powered plants produce heat by burning coal in a steam boiler. The steam drives a steam turbine and generator that then produces electricity. A biomass-fuelled power plant may be fuelled by waste from sugar cane, municipal solid waste, landfill methane, or other forms of biomass. The waste products from these processes include ash, sulfur dioxide, nitrogen oxides and carbon dioxide. Some of the gases can be removed from the waste stream to reduce pollution.

Flue gas is the gas exiting to the atmosphere via a flue, which is a pipe or channel for conveying exhaust gases from a fireplace, oven, furnace, boiler or steam generator. Quite often, the flue gas refers to the combustion exhaust gas produced at power plants. The removal of waste products from flue gas, such as $SO_2$, is mandated by air quality regulatory agencies to reduce the acid rain caused by coal burning. To reduce the emissions of $SO_2$ from coal fired power plants the post-combustion flue gas is treated with limestone that sequesters the $SO_2$ in the form of gypsum (e.g., calcium sulfate).

Coal plants that use flue gas desulfurization (herein referred to as "FGD") to reduce sulfur content set very high specifications for the calcium content of the limestone they use. There is a large market for calcium sulfate from FGD for reuse in construction (e.g. Dry Wall), additionally as a solid with limited water solubility it can be effectively isolated from the process water and landfilled as a solid if required or alternatively converted into calcium carbonate by known processes.

Gypsum resulting from the FGD of coal fired power plants is an impure form of calcium sulfate. These impurities may have a major impact on the quality and polymorph of precipitated calcium carbonate obtained when the gypsum is reacted with ammonium sulfate. Magnesium sulfate, for example, is a co-product with the gypsum from the FGD process is problematic as its high water solubility increases the difficulty of cleaning up the FGD process water. Overcoming these effects would be advantageous in providing a consistent industrial calcium carbonate.

Producing precipitated calcium carbonate (PCC) by use of calcined calcium carbonate is well-known and widely used in the industry. Calcining forces formation of calcium oxide from which a precipitated calcium carbonate is produced upon consecutive exposure to water and carbon dioxide. The energy consumed in calcining calcium carbonate is a large part of the production cost.

In view of the foregoing, one aspect of the present disclosure is to provide a process for treating a sulfurous fluid to form gypsum while avoiding the aforementioned disadvantages.

SUMMARY

According to a first aspect, the present invention relates to a process for treating a sulfurous fluid to form gypsum and magnesium carbonate, which includes i) contacting the sulfurous fluid with a sequestrating agent to yield a scrubbed fluid, gypsum and magnesium sulfate, and ii) reacting a carbonate salt with the magnesium sulfate to produce a magnesium carbonate.

In one embodiment, the process for treating a sulfurous fluid to form gypsum and magnesium carbonate further includes separating at least a portion of the gypsum from the magnesium sulfate to form a gypsum product. The separating is performed by filtration or centrifugation. The gypsum product that is separated from magnesium sulfate has a moisture content that does not exceed 10%. Further, the gypsum product comprises at least one impurity selected from the group consisting of a carbonate, a sulfate, an iron mineral, and an organic species.

In one embodiment, the sequestrating agent is a calcium-containing carbonate mineral. The calcium-containing carbonate mineral has an average particle size ranging from 50 μm to 100 μm. While calcium carbonate is a main component of the calcium-containing carbonate mineral, other materials may also be present, for example $MgCO_3$. For instance, dolomite or dolomitic limestone contain both calcium carbonate and magnesium carbonate. Therefore, in one embodiment, the calcium-containing carbonate mineral of the present disclosure is dolomite, or dolomitic limestone.

In one embodiment, sulfurous fluid is a flue gas and the flue gas has a temperature ranging from 350° C. to 1200° C. By contacting the sulfurous fluid to the sequestrating agent, 98 to 99% of sulfur is removed from the sulfurous fluid.

In one embodiment, the process for treating a sulfurous fluid to form gypsum and magnesium carbonate further includes flowing a sulfurous fluid into a mixture comprising water and a sequestrating agent, wherein the pH of the mixture is controlled during the flowing by controlling a flow rate of the sulfurous fluid into the mixture, adding a buffer to the mixture, or both. The buffer is selected from ammonia, a dibasic acid, or both. The pH of the mixture is controlled during the flowing such that the mixture has a pH from 5 to 6. Further, one embodiment of the present process involves flowing oxygen into the mixture concurrently with the sulfurous fluid to reduce a concentration of sulfites in the mixture by conversion to sulfur species with higher oxygen content, e.g. sulfates.

In part ii) of the process, the carbonate salt comprises a carbonate anion and at least one cation selected from the group consisting of sodium, calcium, potassium, ammonium, magnesium, and hydronium. Upon reacting the carbonate salt with the magnesium sulfate, a magnesium carbonate is produced, which is amorphous, and has a surface area greater than or equal to 20 $m^2/g$. In one embodiment, the process for treating a sulfurous fluid to form gypsum and magnesium carbonate, further involves seeding the magnesium sulfate prior to the reaction with a carbonate salt. The seed is gypsum, a carbonate salt seed, or both, and the seed controls the production and properties of the magnesium carbonate. Magnesium carbonate may be provided in multiple forms, polymorphs, sizes. In the present disclosure, the magnesium carbonate form is magnesite.

In one embodiment, the process for treating a sulfurous fluid to form gypsum and magnesium carbonate further includes separating at least a portion of the gypsum from the magnesium sulfate to form a gypsum product, and processing the gypsum to form a processed gypsum. The processing is at least one process selected from the group consisting of grinding, milling, recrystallizing, magnetically separating, bleaching, acid washing, and beneficiating, and the process produces a processed gypsum that is 90 to 99% pure gypsum.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

Embodiments of the present disclosure will now be described more fully hereinafter.

According to a first aspect, the present invention relates to a process for treating a sulfurous fluid to form gypsum and magnesium carbonate, which includes i) contacting the sulfurous fluid with a sequestrating agent to yield a scrubbed fluid, gypsum and magnesium sulfate, and ii) reacting a carbonate salt with the magnesium sulfate to produce a magnesium carbonate.

As referred to herein, a "sulfurous fluid" may be a liquid, a gas, a solution, a mixture or a suspension that contains sulfur. In one embodiment, the sulfurous fluid is a gas. Further, this gas may be a sulfur-containing flue gas. Prior to being released into the atmosphere, exhaust gas or flue gas needs to be scrubbed of harmful acid gases associated with combustion processes. Harmful acid gases may include sulfur oxides (SOx), such as lower sulfur oxides such as SO, $S_2O_2$, $S_2O$, $S_3O$, $S_xO$ (where x is 5-10), $SeO_2$, $S_7O_2$, and polymeric sulfuroxides; sulfur monoxide (SO); sulfur dioxide ($SO_2$); sulfur trioxide ($SO_3$); and higher sulfur oxides such as $SO_{3+y}$ (where $0<y\leq1$), or a combination thereof. Sulfurous fluids, such as flue gas, may originate from a fireplace, oven, furnace, boiler or steam generator. The combustion of coal, oil, natural gas, or any other sulfur containing fuels may produce a flue gas in which 98-99% of the sulfur is in the form of sulfur dioxide ($SO_2$) and 1-2% is sulfur trioxide ($SO_3$). For low and high sulfur coals the total concentration of SOx may be in the range of 1,000-4,000 ppm.

Figure 1:
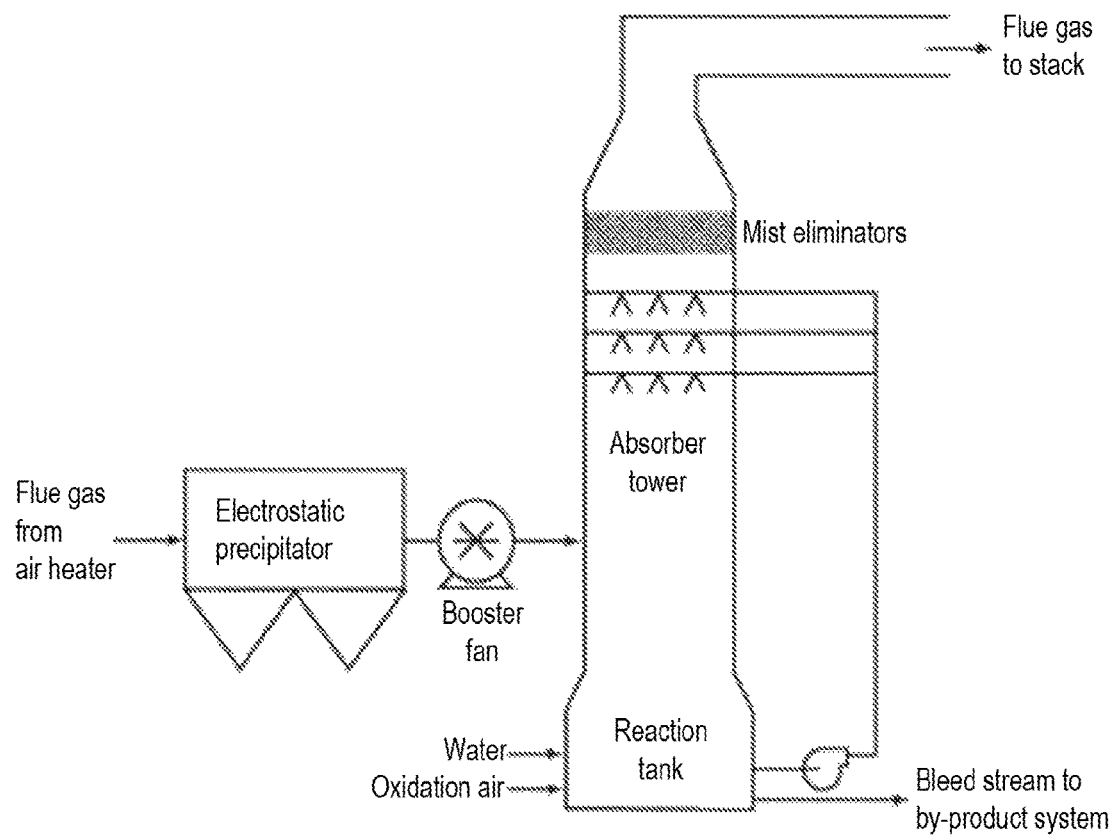
FIG. 1 is an illustration of a flue gas desulfurizing apparatus.
Figure 2:
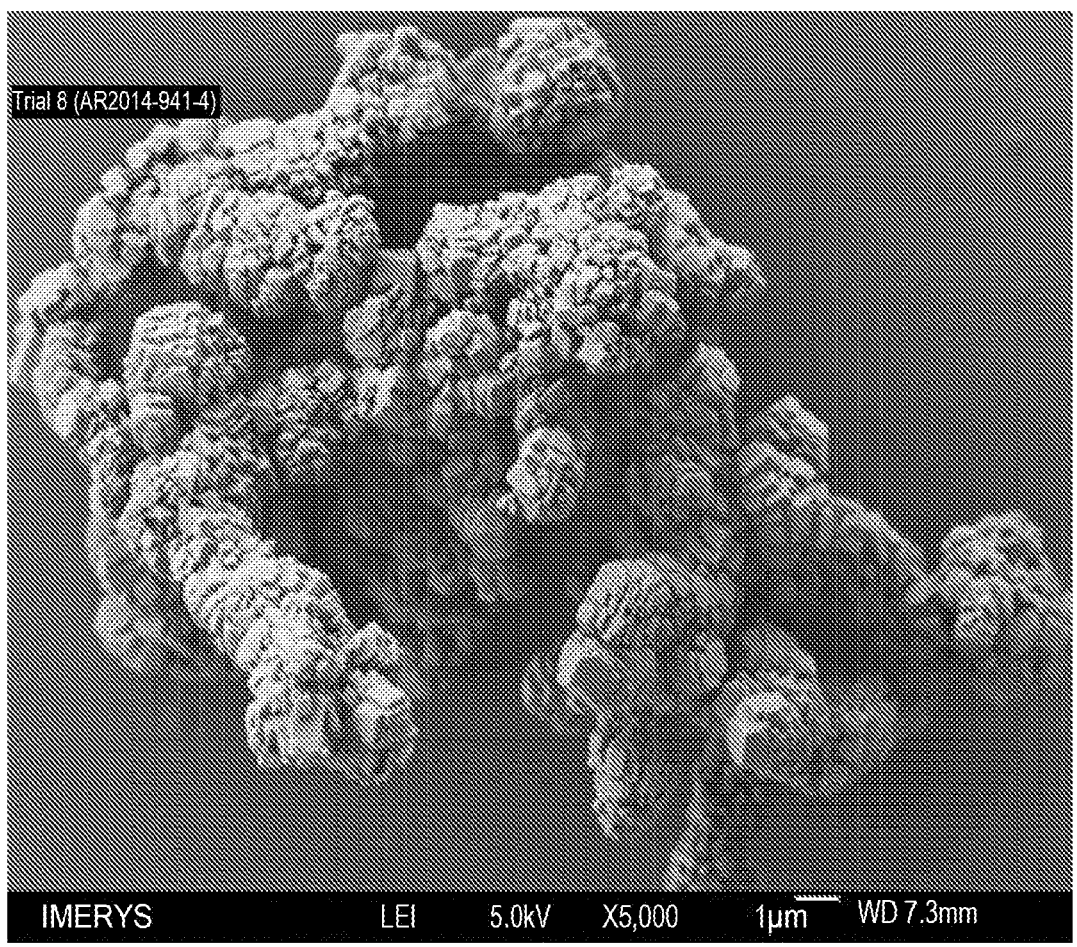
FIG. 2 is an SEM image of a rhombic calcite, 300-500 nm.
Figure 3:
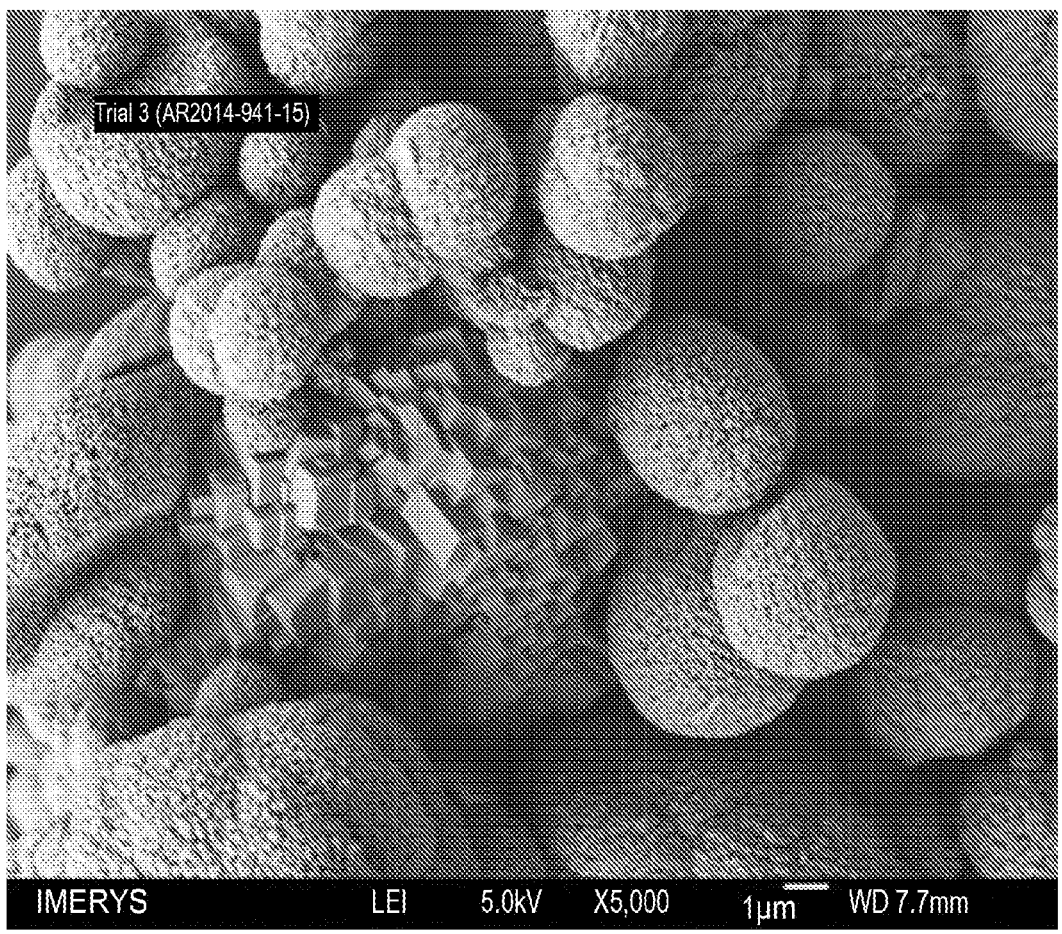
FIG. 3 is an SEM image of a calcite and vaterite blend.
Figure 4:
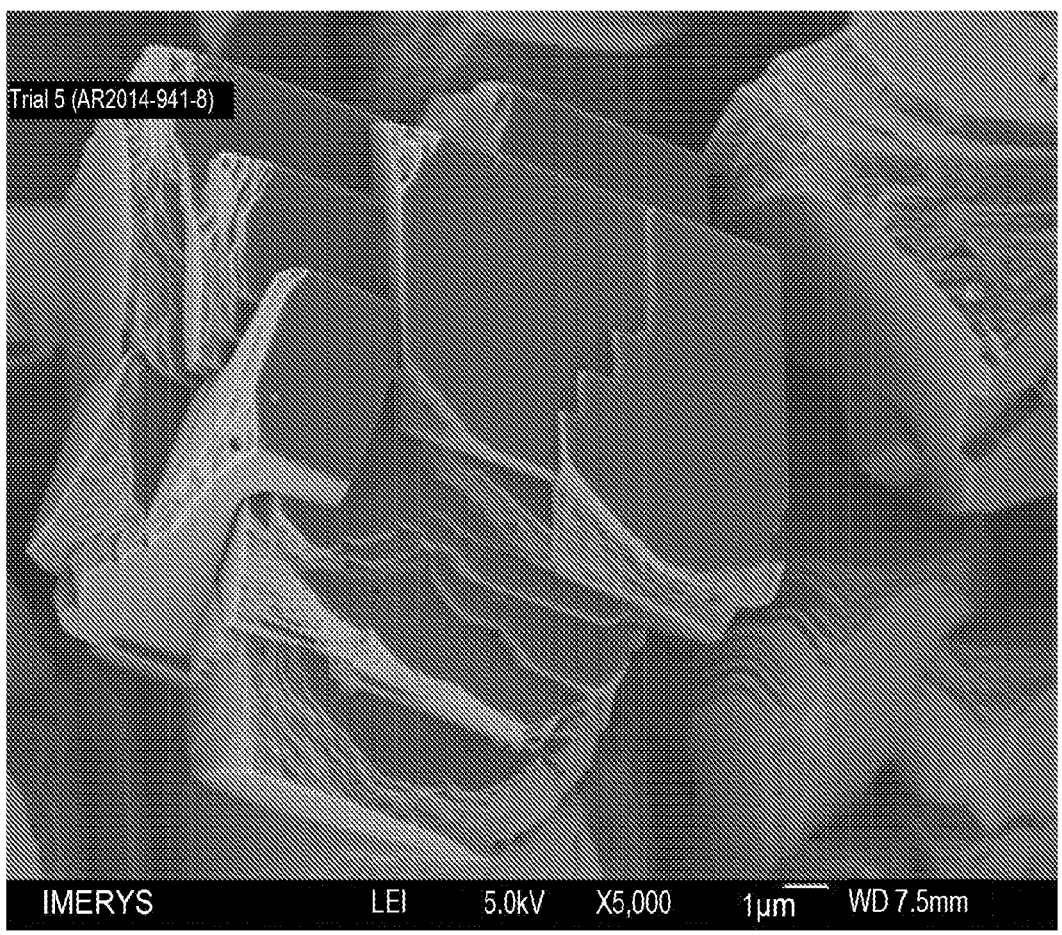
FIG. 4 is an SEM image of a rhombic calcite, ~5 μm.
Figure 5:
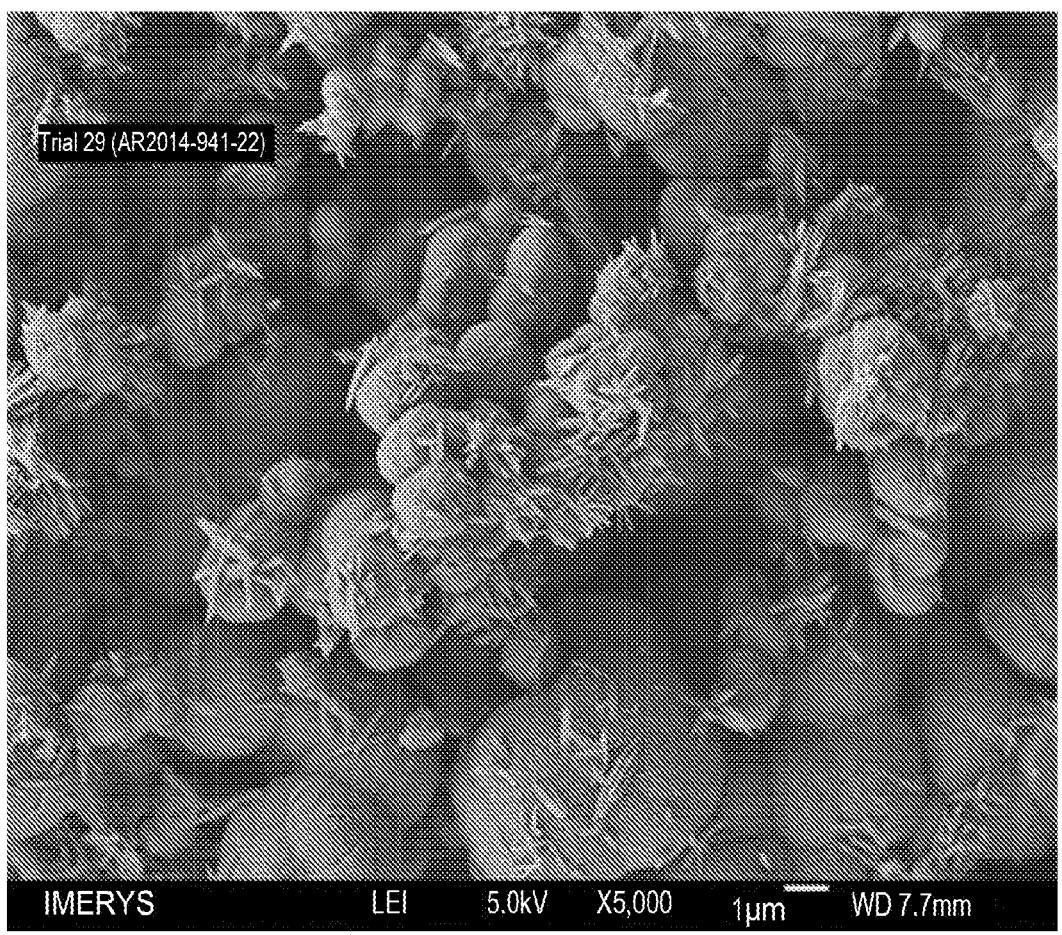
FIG. 5 is an SEM image of a vaterite and aragonite blend.
Figure 6:
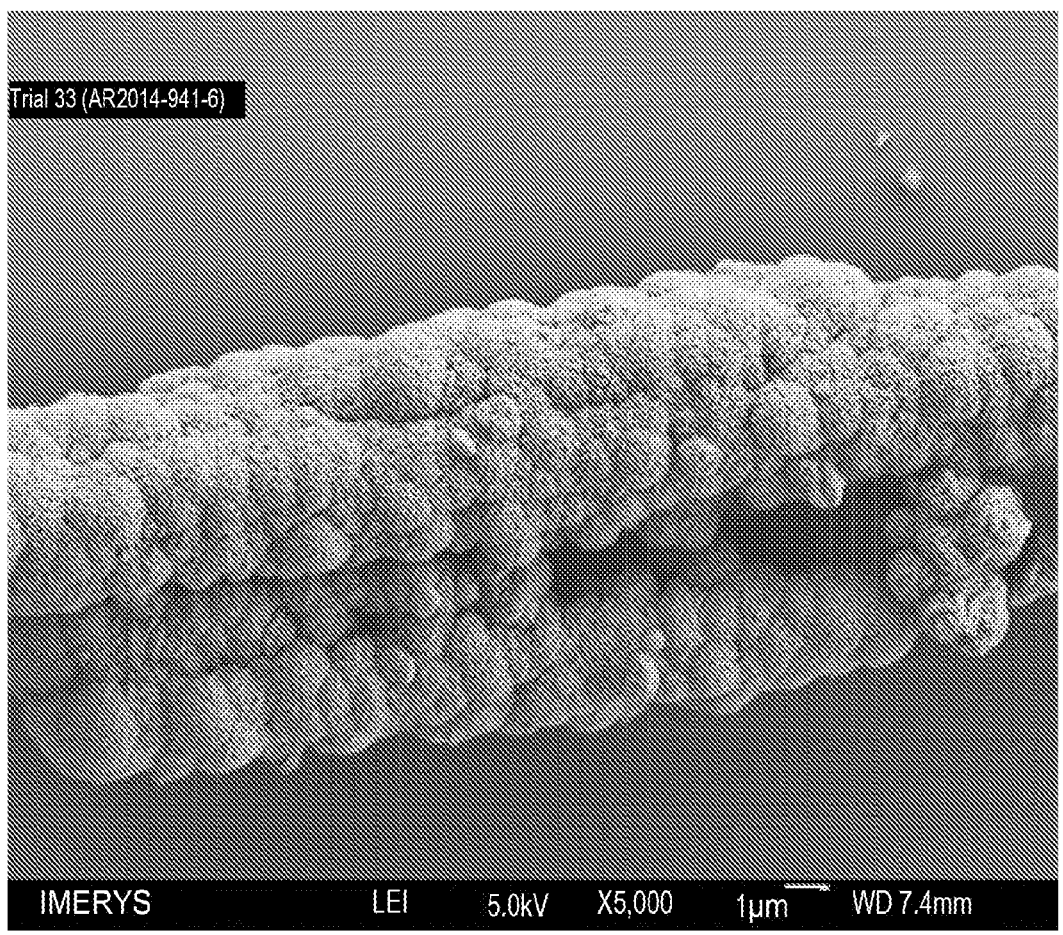
FIG. 6 is an SEM image of vaterite.
Figure 7:
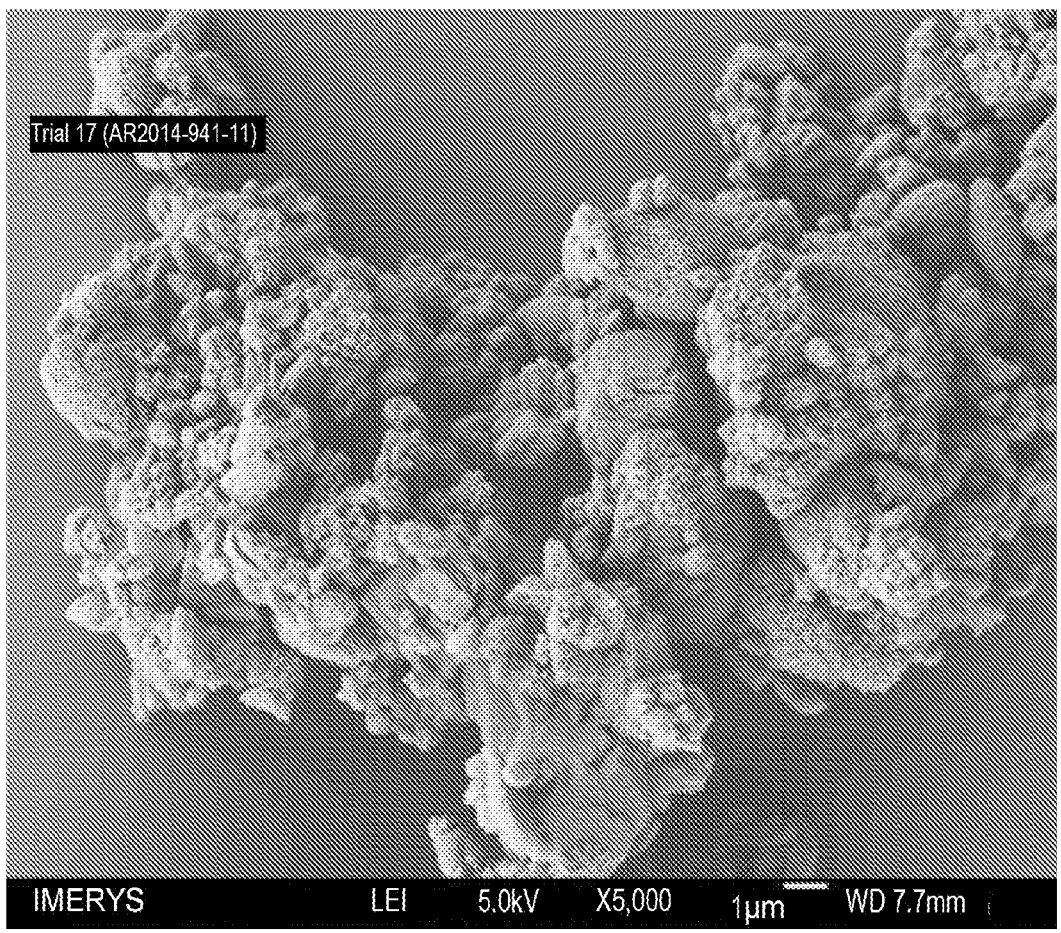
FIG. 7 is an SEM image of a vaterite and calcite blend produced from gypsum and sodium carbonate.

The process to remove the harmful acid gases from exhaust gas is commonly referred to as "scrubbing". Types of scrubbing processes include, but are not limited to, wet scrubbing, spray-dry scrubbing, and dry sorbent injection systems. See FIG. 1 for an illustrative example of a commercial scrubbing apparatus. In each of the particular embodiments herein, it is envisioned that the sulfurous fluid is obtained from a coal power plant, an oil power plant, a natural gas power plant, paper plant, and/or a biomass fueled plant, and that contacting the sulfurous fluid to a sequestrating agent removes or reduces the sulfur oxide that is present in the sulfurous fluid. Contact protocols for scrubbing may involve contacting the sulfurous fluid and the sequestrating agent in various forms, for example, contacting the sulfurous fluid as a gas or a liquid mixture with water to the sequestrating agent as a solid or a liquid mixture with water. Exemplary contacting protocols include, but are not limited to: direct contacting protocols, e.g., bubbling a sulfurous fluid into a mixture of water and the sequestrating agent, concurrent contacting means, i.e., contact between unidirectionally flowing gaseous and liquid phase streams, countercurrent means, i.e., contact between oppositely flowing gaseous and liquid phase streams, and the like. Thus, contact may be accomplished through use of infusers, bubblers, fluidic Venturi reactor, sparger, gas filter, spray, tray, or packed column reactors, and the like, as may be convenient.

As used herein, a "sequestrating agent" refers to a calcium-containing carbonate mineral that is used for scrubbing a sulfurous fluid, wherein a calcium carbonate is a main component. Limestone is an exemplary sequestrating agent. In some embodiments, the sequestrating agent can be, but is not limited to, calcite, vaterite, aragonite, minrecordite, barytocite, ikaite, amorphous calcium carbonate, hydrates thereof, or combinations thereof. Calcium-containing carbonate minerals used in the disclosed process can be substantially pure calcium carbonate or may have other components, such as magnesium. In some embodiments, the calcium-containing carbonate mineral also includes magnesium in the form of magnesium carbonate. Limestone that further contains magnesium carbonate is referred to as "dolomite" or "dolomitic limestone". Dolomite is an anhydrous carbonate mineral composed of calcium magnesium carbonate, e.g. $CaMg(CO_3)_2$. The word dolomite is also used to describe the sedimentary carbonate rock, which is composed predominantly of the mineral dolomite. The mineral dolomite crystallizes in the trigonal-rhombohedral system. It forms white, tan, gray, or pink crystals. Dolomite is a double carbonate, having an alternating structural arrangement of calcium and magnesium ions. Therefore, dolomitic limestone is a type of limestone with a high dolomite content, and thus a high magnesium content compared to limestone comprising higher levels of calcium carbonate. The differences between calcium carbonate and magnesium carbonate content between limestone and dolomitic limestone are well recognized by those of ordinary skill in the art. Other minerals that contain both calcium and magnesium carbonates include, but are not limited to, ankerite and huntite, or hydrates or mixtures thereof. In terms of the present disclosure, the sequestrating agent may refer to any of the aforementioned calcium-containing carbonate minerals. In one embodiment, the calcium-containing carbonate mineral is dolomite or dolomitic limestone, i.e. also contains magnesium carbonate.

In certain embodiments, the amount of magnesium in the calcium-containing carbonate material ranges from 0.1 to 29% by weight. In other embodiments, the amount of magnesium in the calcium containing carbonate material ranges from 2 to 29% by weight. In still other embodiments the amount of magnesium in the calcium containing carbonate material ranges from 10 to 15% by weight.

When limestone containing a high magnesium content (e.g. dolomitic limestone) is used for FGD processes, large quantities of magnesium byproducts are formed. It would be advantageous to develop a method of converting these magnesium byproducts into useful magnesium-based products, such as magnesium carbonate, which can be used as a binder in flooring material, as a catalyst and filler in the production of synthetic rubbers, in the preparation of magnesium chemicals and fertilizers, and as a filler pigment for applications which require some degree of acid resistance (e.g. food packaging, synthetic marble, etc.).

The calcium-containing carbonate mineral of the present invention may be size reduced prior to contact with the sulfurous fluid. The size reduction technique may involve grinding, pulverizing, sonicating, sieving, and the like, and combinations thereof. The calcium-containing carbonate mineral of the present disclosure may have an average particle size ranging from 0.5 μm to 100 μm, or from 10 μm to 80 μm, or from 30 μm to 60 μm.

In one embodiment, the sulfurous fluid is a flue gas and the flue gas has a temperature ranging from 100° C. to 1200° C., or 150° C. to 800° C., or 800° C. to 1200° C. By contacting the sulfurous fluid to the sequestrating agent, 80% to 99%, or 95% to 99% of sulfur is removed from the sulfurous fluid.

Contacting the sulfurous fluid to dolomite or dolomitic limestone results in the formation of scrubbed fluid, gypsum and magnesium sulfate. "Gypsum" as used herein, refers to a calcium sulfate material. Pure gypsum is a soft sulfate mineral composed of calcium sulfate dihydrate, with the chemical formula $CaSO_4.2H_2O$. It can be used as a fertilizer, is the main constituent in many forms of plaster and is widely mined. Gypsum that is produced from a process involving scrubbing a sulfurous fluid that is a sulfur-containing flue gas with a sequestrating agent, is referred to as flue gas desulfurized (FGD) gypsum.

In one embodiment, the process for treating a sulfurous fluid to form gypsum and magnesium carbonate further includes separating at least a portion of the gypsum from the magnesium sulfate to form a gypsum product. The separating may be performed by filtration or centrifugation. Filtration methods may include, but are not limited to, vacuum filtration, belt filtration, rotary vacuum-drum filtration, tangential flow filtration, and the like. The gypsum product that is separated from magnesium sulfate has a moisture content that does not exceed 20%, or does not exceed 15%, or does not exceed 8%, or does not exceed 7%. Gypsum resulting from processes involving scrubbing a sulfurous fluid (e.g., of coal fired power plants) is an impure form of calcium sulfate. For example, the magnesium sulfate is a co-product with the gypsum from scrubbing processes that use dolomite, and the magnesium sulfate is difficult to separate from the gypsum due to its high water solubility. In addition to magnesium sulfate impurities, other common impurities found in gypsum from scrubbing processes include calcite and $MgCO_3$, which can be present in impure gypsum in a 1:3 ratio (impurity:calcium sulfate), iron minerals, various organic species, and the like. In this disclosure, US gypsum refers to an impure natural gypsum, which generally is 80-90% pure. The % purity of the gypsum recovered from the process of the present disclosure is variable, and can change depending on the starting purity of sulfurous fluid and the sequestrating agent. Generally, the gypsum of the present disclosure contains at least 20%, or at least 30%, or at least 40%, or at least 50%, or at least 60%, or at least 70%, or at least 80%, or at least 90% calcium sulfate. When converted into calcium carbonate, the impurities present in the gypsum may have a major impact on the quality and polymorph of precipitated calcium carbonate obtained when the gypsum is reacted with a carbonate source.

In certain embodiments of the present disclosure, the gypsum isolated by filtration or centrifugation can optionally be 1) used in manufacture of wall board or other construction materials, 2) landfilled, 3) converted into calcium carbonate by known processes in the prior art or 4) converted into calcium carbonate by processes disclosed hereinafter.

In one embodiment, the process for treating a sulfurous fluid to form gypsum and magnesium carbonate further includes flowing a sulfurous fluid into a mixture comprising water and a sequestrating agent, wherein the pH of the mixture is controlled during the flowing by controlling a flow rate of the sulfurous fluid into the mixture, adding a buffer to the mixture, or both.

In one embodiment, the pH of the mixture is controlled by adding a buffer. The buffer used for increasing the pH during the contacting stage of the present disclosure may be ammonia. The gaseous ammonia may be flowed concurrently with the sulfurous fluid during the contacting with the sequestrating agent, whereby the flow of ammonia is adjusted to impart a desired pH range. Alternatively, the gaseous ammonia may be pre-mixed with the sulfurous fluid prior to the contacting stage. The buffer may also be a carboxylic acid, including a monobasic acid or a dibasic acid. Exemplary dibasic acids include glutaric acid, succinic acid, adipic acid, and mixtures thereof. Further the buffer may involve the use of both ammonia and a dibasic acid to adjust the pH during the contacting. The pH of the mixture may be controlled during the flowing such that the scrubbed fluid has a pH from 5 to 6, or 5.2 to 5.8, or 5.3 to 5.7. Further, one embodiment of the present process involves flowing oxygen into the mixture concurrently with the sulfurous fluid to reduce a concentration of sulfites in the scrubbed fluid. The flow rate of oxygen may be adjusted to convert sulfite species in the scrubbed fluid to sulfur species with higher oxygen content, e.g. sulfates. For instance, magnesium sulfite and calcium sulfite may be oxidized to their corresponding sulfates by flowing oxygen into the scrubbed fluid.

The process next involves reacting a carbonate salt with the magnesium sulfate to produce a magnesium carbonate. In the present disclosure, the term "reacting" refers to any complete or partial reaction. A partial reaction refers to any reaction where some amount of a reagent or substrate remains in the reaction mixture after the reaction takes place.

A "carbonate salt", as referred to herein, is a salt composed of a cation and a carbonate anion, where the carbonate anion is either a carbonate anion (i.e. $CO_3^{-2}$), a bicarbonate anion (e.g. $HCO_3^-$), or mixtures thereof. The term carbonate salt is also inclusive of reagents that, when mixed and reacted form carbonate anions. For example, when $CO_2$ is mixed and reacted with ammonia in water, the reaction produces ammonium bicarbonate and ammonium carbonate. Therefore, $CO_2$ and ammonia together are included in the definition of a carbonate salt in the present disclosure. In one embodiment, the carbonate salt comprises a carbonate anion and at least one cation selected from the group consisting of sodium, calcium, potassium, ammonium, magnesium, and hydronium. The carbonate salts listed above are not meant to be limiting, and other carbonate salts may be used, including carbonate salts having cations of Group 1 or Group 2 elements. The carbonate salt may be added in solid form, in aqueous solution, or a suspension or slurry.

The rate of magnesium carbonate precipitation can be varied by varying the conditions in which the magnesium sulfate is reacted with the carbonate salt. Different forms, morphologies, properties, and sizes of magnesium carbonate can also be varied by selecting suitable reaction conditions, see FIG. 31-34. In the present disclosure, the magnesium carbonate may be formed as magnesite. In other embodiments, the magnesium carbonate may be in the form of barringtonite, nesquehonite, lansfordite, artinite, hydromagnesite, dypingite, or mixtures thereof. In terms of the present disclosure, magnesite may refer to the crystalline form or the amorphous form of magnesium carbonate, $MgCO_3$. Magnesite is a mineral with the chemical formula $MgCO_3$ (magnesium carbonate). Naturally occurring magnesite generally is a trigonal-hexagonal scalenohedral crystal system. Similar to the production of lime, magnesite can be burned in the presence of charcoal to produce MgO, which in the form of a mineral is known as periclase. Large quantities of magnesite are burnt to make magnesium oxide, which is a refractory material used as a lining in blast furnaces, kilns and incinerators. Magnesite can also be used as a binder in flooring material. Furthermore it is being used as a catalyst and filler in the production of synthetic rubber and in the preparation of magnesium chemicals and fertilizers. The isolated magnesite from the present disclosure, in particular, has value as a filler pigment especially for applications which require some degree of acid resistance (food packaging, synthetic marble). Similar to processing techniques described for gypsum, the magnesite may also be processed (i.e. by grinding, milling, recrystallizing, magnetically separating, bleaching, acid washing, and/or beneficiating) to meet different application requirements, such as for example, a pharmaceutical ingredient, a laxative, a calcium bioabsorption additive, a flow enhancer, etc.

Under conditions which the carbonate salt is added as a solution or suspension, the pH of the solution or suspension may be acidic (pH less than 6.5), neutral (pH 6.5-7.5), or basic (pH greater than 7.5).

In one embodiment, the reaction rate is controlled by controlling the rate of addition of the carbonate salt. For instance, the carbonate salt may be added to the magnesium sulfate in bulk, portion-wise, or by a slow-addition process. The rate of addition therefore also controls the concentration of reactive species in the reaction mixture. Further, the reaction time for reacting the magnesium sulfate with the carbonate salt can be varied. In one embodiment, the reaction time is 8-240 min, or 8-120 min, or 10-60 min. The temperature during the reacting may also be varied to control the reaction rate and the properties of the precipitated magnesium carbonate. In one embodiment, the reaction temperature is 0-60° C., or 5-55° C., or 10-50° C.

In one embodiment, the reaction between the carbonate salt with the magnesium sulfate produces amorphous magnesium carbonate with a surface area greater than or equal to 4 $m^2/g$, or greater than or equal to 10 $m^2/g$, or greater than or equal to 25 $m^2/g$.

The process for treating a sulfurous fluid to form gypsum and magnesium carbonate, may further comprise seeding the magnesium sulfate prior to the reaction with a carbonate salt. The seed may include a gypsum seed, a carbonate salt seed, or both, and the seed controls the production and properties of the magnesium carbonate.

In one embodiment, the process for treating a sulfurous fluid to form gypsum and magnesium carbonate further includes separating at least a portion of the gypsum from the magnesium sulfate to form a gypsum product, and processing the gypsum to form a processed gypsum. The processing is at least one process selected from the group consisting of grinding, milling, recrystallizing, magnetically separating, bleaching, acid washing, and beneficiating. The processing produces a processed gypsum that is 90 to 99% pure gypsum, or 92 to 99%, or 94 to 99% pure gypsum. The gypsum of the present disclosure may be processed using a plurality of processing steps, and these processes can be carried out in sequence. For instance, the gypsum may be first ground or milled to a suitable particle size. The grinding or milling of the gypsum may then be followed by one or more of magnetic separation, bleaching, acid washing, or other beneficiation processes to produce the processed gypsum of the present disclosure with suitable purity.

In a different embodiment, the present disclosure relates to a process for converting flue gas desulfurized gypsum into precipitated calcium carbonate comprising i) optionally reacting the flue gas desulfurized gypsum with a mineral acid ii) optionally adding a calcium carbonate seed to the flue gas desulfurized gypsum iii) optionally adding an additive to the flue gas desulfurized gypsum iv) reacting the flue gas desulfurized gypsum with at least one carbonate source selected from the group consisting of ammonium carbonate, ammonium bicarbonate, ammonium carbamate, calcium carbonate, dolomite, a metal carbonate, and carbon dioxide with an aqueous flue gas desulfurized gypsum slurry at a temperature of 8-50° C. and a reaction time of 5-250 minutes, to yield precipitated calcium carbonate and v) isolating the precipitated calcium carbonate. In a certain embodiment, reaction conditions are used to control the crystalline polymorph and particle size of the precipitated calcium carbonate thus obtained.

The method of producing precipitated calcium carbonate (PCC) by use of calcined calcium carbonate is well-known and widely used in the industry. Calcining forces formation of calcium oxide from which a precipitated calcium carbonate is produced upon consecutive exposure to water and carbon dioxide. However, the energy consumed in calcining calcium carbonate is a large part of the production cost. Therefore, converting impure FGD gypsum, a bulk byproduct from power plant energy production, into PCC would provide a low energy and economical method for PCC manufacture.

The calcium carbonate selected should, after reaction with the gypsum, yield a sulfate product with higher solubility than the calcium carbonate generated. Therefore, the generated sulfate may be separated from the calcium carbonate precipitate by removal of the aqueous phase from the reaction slurry. Appropriate metal carbonates include ammonium carbonate, sodium carbonate, and magnesium carbonate. The sulfate product can be treated as needed, and used for an appropriate, separate application. For example, if ammonium carbonate is used in the reaction, ammonium sulfate will be generated, which can be separated and used in applications such as fertilizer. In addition, a portion can be fed into the starting gypsum slurry to aid in control of the reaction rate, and consequently, control the PCC produced. After separating the PCC slurry from the aqueous solution to form a PCC cake, the cake can be washed with water to remove remaining sulfate.

Calcium carbonate can be precipitated from aqueous solution in one or more different compositional forms: vaterite, calcite, aragonite, amorphous, or a combination thereof. Generally, vaterite, calcite, and aragonite are crystalline compositions and may have different morphologies or internal crystal structures, such as, for example, rhombic, orthorhombic, hexagonal, or variations thereof.

Vaterite is a metastable phase of calcium carbonate at ambient conditions at the surface of the earth and belongs to the hexagonal crystal system. Vaterite is less stable than either calcite or aragonite, and has a higher solubility than either of these phases. Therefore, once vaterite is exposed to water, it may convert to calcite (at low temperature) or aragonite (at high temperature: ~60° C.). The vaterite form is uncommon because it is generally thermodynamically unstable.

The calcite form is the most stable form and the most abundant in nature and may have one or more of several different shapes, for example, rhombic and scalenohedral shapes. The rhombic shape is the most common and may be characterized by crystals having approximately equal lengths and diameters, which may be aggregated or unaggregated. Calcite crystals are commonly trigonal-rhombohedral. Scalenohedral crystals are similar to double, two-pointed pyramids and are generally aggregated.

The aragonite form is metastable under ambient temperature and pressure, but converts to calcite at elevated temperatures and pressures. The aragonite crystalline form may be characterized by acicular, needle- or spindle-shaped crystals, which are generally aggregated and which typically exhibit high length-to-width or aspect ratios. For instance, aragonite may have an aspect ratio ranging from about 3:1 to about 15:1. Aragonite may be produced, for example, by the reaction of carbon dioxide with slaked lime.

In the present disclosure, the methods of producing a PCC composition may be varied to yield different polymorphs of calcium carbonate, such as, for example, vaterite, calcite, aragonite, amorphous calcium carbonate, or combinations thereof. The methods may be modified by varying one or more of the reaction rate, the pH of the mixtures, the reaction temperature, the carbonate species present in the reaction (e.g., ammonium carbonate, ammonium carbamate), the concentration of the different carbonate species present in the reaction (e.g., ammonium carbonate and/or ammonium carbamate concentrations), the purity of the feed materials (e.g., purity of the feed gypsum), and the concentrations of the feed materials (e.g., gypsum and/or carbonate concentrations).

In the present disclosure, the crystalline content of a PCC composition may be readily determined through visual inspection by use of, for example, a scanning electron microscope or by x-ray diffraction. Such determination may be based upon the identification of the crystalline form and is well known to those of skill in the art.

The PCC compositions may also be characterized by their particle size distribution (PSD). As used herein and as generally defined in the art, the median particle size (also called ds) is defined as the size at which 50 percent of the particle weight is accounted for by particles having a diameter less than or equal to the specified value.

The PCC compositions may have a $d_{50}$ in a range from about 0.1 micron to about 15 microns, for example, from about 2 microns to about 12 microns, from about 2 to about 6 microns, from about 1 micron to about 4 microns, or from about 0.1 micron to about 1.5 microns. The $d_{50}$ may vary with the morphology of the PCC. For example, calcite PCC may have a $d_{50}$ in a range from about 0.1 to about 11 microns, such as, for example, from about 0.1 to about 2 microns, from about 1 to about 5 microns, from about 2 to about 4 microns, or from about 4 to about 6 microns. Vaterite PCC may have a $d_{50}$ in a range from about 0.1 microns to about 5 microns, such as, for example, from about 0.1 to about 2 microns, from about 1 to about 5 microns, or from about 2 to about 4 microns.

According to some embodiments, between about 30 percent and about 80 percent of the PCC particles are less than about 2 microns in diameter. In other embodiments, between about 55 percent and about 99 percent of the PCC particles are less than 2 microns in diameter. According to some embodiments, less than about 1 percent of the PCC particles are greater than 10 microns in diameter, such as, for example, less than 0.5 percent of the PCC particles are greater than 10 microns in diameter, or less than 0.1% of the PCC particles are greater than 10 microns in diameter.

The PCC compositions may be further characterized by their aspect ratio. The aspect ratio of the particles of a PCC composition may be determined by various methods. One such method involves first depositing a pigment slurry on a standard SEM stage and coating the slurry with platinum. Images are then obtained and the particle dimensions are determined, using a computer based analysis in which it is assumed that the thickness and width of the particles are equal. The aspect ratio may then be determined by averaging fifty calculations of individual particle length-to-width aspect ratios.

The PCC compositions may also be characterized in terms of their cubicity, or the ratio of surface area to particle size (i.e., how close the material is to a cube, rectangular prism, or rhombohedron). In certain embodiments of the present disclosure, a lower surface area is advantageous. Smaller particles typically have much higher surface area, but small particle size is advantageous for many different applications. Thus PCC products with small particle size material and lower than "normal" surface area are particularly advantageous. Rhombic crystal forms are generally preferred in terms of cubicity.

Figure 41:
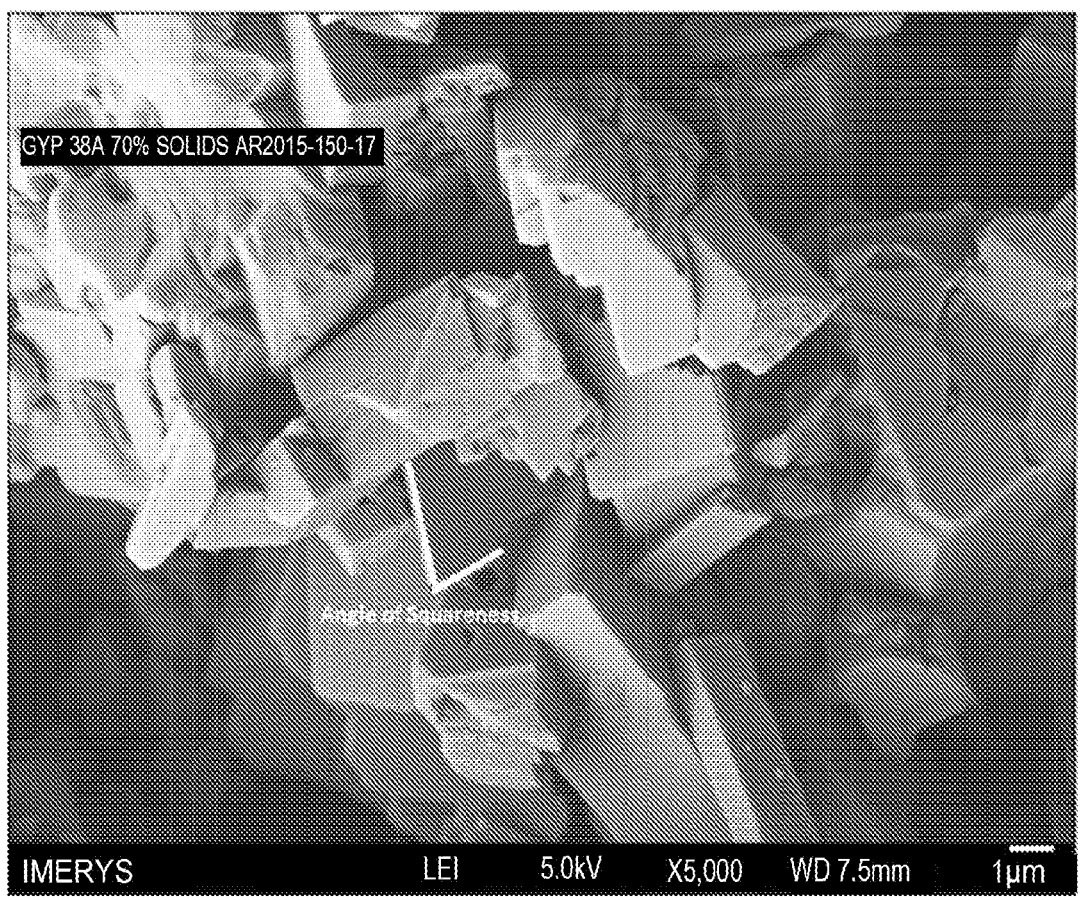
FIG. 41 shows an SEM image and an exemplary measurement of squareness.

According to some embodiments, the cubic nature of the PCC compositions may be determined by the "squareness" of the PCC particles. A squareness measurement generally describes the angles formed by the faces of the PCC particle. Squareness, as used herein, can be determined by calculating the angle between adjacent faces of the PCC, where the faces are substantially planar. Squareness may be measured using SEM images by determining the angle formed by the edges of the planar faces of the PCC particle when viewed from a perspective that is parallel to the faces being measured. FIG. 41 shows an exemplary measurement of squareness. According to some embodiments, the PCC compositions may have a squareness in a range from about 70 degrees to about 110 degrees.

In the present disclosure, the monodispersity of the product refers to the uniformity of crystal size and polymorphs. The steepness ($d_{70}/d_{30}$) refers to the particle size distribution bell curve, and is a monodispersity indicator. $d_x$ is the equivalent spherical diameter relative to which x % by weight of the particles are finer. According to some embodiments, the PCC may have a steepness in a range from about 1.0 to about 4.0, such as, for example, in a range from about 1.0 to about 3.0, from about 1.3 to about 2.4, from about 1.33 to about 2.31, from about 1.42 to about 2.17, from about 1.5 to about 2.0, from about 1.5 to about 1.7, or from about 1.53 to about 1.61. According to some embodiments, the PCC may have a steepness in a range from about 1.4 to about 5, such as, for example, in a range from about 2.0 to about 4.0. In some embodiments, the steepness may vary according to the morphology of the PCC. For example, calcite may have a different steepness than vaterite.

According to some embodiments, the PCC compositions may have a top-cut ($d_{90}$) particle size less than about 25 microns, such as, for example, less than about 17 microns, less than about 15 microns, less than about 12 microns, or less than about 10 microns. According to some embodiments, the PCC compositions may have a top-cut particle size in a range from about 5 microns to about 25 microns, such as, for example, in a range from about 15 microns to about 25 microns, from about 10 microns to about 20 microns, or from about 5 microns to about 15 microns.

According to some embodiments, the PCC compositions may have a bottom-cut ($d_{10}$) particle size less than about 3 microns, such as, for example, less than about 2 microns, less than about 1 micron, less than about 0.7 microns, less than about 0.5 microns, less than 0.3 microns, or less than 0.2 microns. According to some embodiments, the PCC compositions may have a bottom-cut particle size in a range from about 0.1 micron to about 3 microns, such as, for example, in a range from about 0.1 micron to about 1 micron, from about 1 micron to about 3 microns, or from about 0.5 microns to about 1.5 microns.

The PCC compositions may additionally be characterized by their BET surface area. The BET surface area may vary according to the morphology of the PCC. According to some embodiments, the PCC may have a BET surface area less than 40 m$^2$/g, such as, for example, less than 30 m$^2$/g, less than 20 m$^2$/g, less than 15 m$^2$/g, less than 10 m$^2$/g, less than 5 m$^2$/g, less than 4 m$^2$/g, or less than 3 m$^2$/g. In some embodiments, the calcite PCC composition particles have a surface area in a range from 1.0 to 15.0 m$^2$/g, such as, for example, from 2 to 10 m$^2$/g, from 3.3 to 6.0 m$^2$/g, from 3.6 to 5.0 m$^2$/g. In other embodiments, calcite PCC may have a BET surface area in a range from 1 to 6 m$^2$/g, from 1 to 4 m$^2$/g, from 3 to 6 m$^2$/g, or from 1 to 10 m$^2$/g, from 2 to 10 m$^2$/g, or from 5 to 10 m$^2$/g. According to some embodiments, calcite PCC may have a BET surface area less than or equal to 15 m$^2$/g. Vaterite PCC may have a BET surface area in a range from 9 to 16 m$^2$/g. In certain embodiments, the vaterite PCC composition particles have a BET surface area in a range from 8 to 18 m$^2$/g, or from 10 to 17 m$^2$/g, or from 10.4 to 16.1 m$^2$/g.

The PCC compositions may additionally be characterized by the ratio of BET surface area to $d_{50}$. In a certain embodiment, the vaterite PCC composition particles have a ratio of BET surface area to $d_{50}$ of 1.0-6.5, or 2.0-5.5, or 2.5-5.0. In another embodiment, the calcite PCC composition particles have a ratio of BET surface area to $d_{50}$ of 0.6-2.0, or 0.7-1.8, or 0.8-1.5.

In some embodiments, the yield of PCC using the process herein is greater than 50%, or greater than 60%, or greater than 80%, or greater than 90%.

A Method for Converting Gypsum into Precipitated Calcium Carbonate

Referring now to FIG. 2-30 and FIG. 35-41. In the present disclosure, converting flue gas desulfurized gypsum into precipitated calcium carbonate is accomplished with Methods A-I, or a combination thereof. Method and process parameter selection enables control of the precipitated calcium carbonate structure, such as crystalline polymorph and particle size. The following is a general description of the Methods A-I.

Method A

The method comprises:

i. Treating raw gypsum with a mineral acid including, but not limited to, nitric, sulfuric or phosphoric acid, to consume any unreacted calcium or magnesium carbonate remaining from the desulfurization process. The amount of mineral acid added to the FGD gypsum is optionally a molar equivalent of or in excess of the amount of unreacted carbonate.

ii. Reacting the mineral acid treated FGD gypsum with ammonium carbonate at low temperature ranging from 0-60° C., or 8-50° C., for 3-300 min, or 5-250 min, to produce calcium carbonate in a vaterite crystal structure, calcite crystal structure, aragonite crystal structure, amorphous calcium carbonate, or mixtures or blends thereof.

iii. Optionally annealing the resulting calcium carbonate in a dry or wet state to form a desired polymorph or polymorph mixture.

Method B

The method comprises:

i. Treating raw gypsum with a mineral acid including, but not limited to, nitric, sulfuric or phosphoric acid, to consume any unreacted calcium or magnesium carbonate remaining from the desulfurization process. The amount of mineral acid added to the FGD gypsum is equimolar to the amount of unreacted carbonate.

ii. Adding calcite (or aragonite) from either (ground calcium carbonate) GCC or PCC to the mineral acid treated FGD gypsum as a seed, and reacting with ammonium carbonate at low temperature ranging from 0-60° C., or 8-50° C., for 3-300 min, or 5-250 min, to produce a calcium carbonate with a different dominant morphologies (e.g., crystalline or amorphous) from that obtained without the added calcium carbonate. The calcite can be rhombohedral or scalenohedral.

Method C

The method comprises:

i. Adding calcium carbonate to raw FGD gypsum to afford a well-defined mixture of calcium carbonate and calcium sulfate.

ii. Reacting the FGD gypsum and calcium carbonate mixture with ammonium carbonate at low temperature ranging from 0-60° C., or 8-50° C., for 3-300 min, or 5-250 min, to produce calcium carbonate with a different dominant crystal structure from that obtained without the added calcium carbonate.

Method D

The method comprises:

i. Preparing a seeded FGD gypsum by the process of Method B or Method C above, where dolomite, dolomitic carbonate, magnesium sulfate, magnesium hydroxide, titania ($TiO_2$), silica ($SiO_2$), or zinc oxide (e.g., ZnO), or mixtures thereof, is added as a seed instead of calcium carbonate.

ii. Reacting the seeded FGD gypsum with ammonium carbonate to produce calcium carbonate in a vaterite crystal structure, calcite crystal structure, aragonite crystal structure, amorphous calcium carbonate, or mixtures or blends thereof.

iii. According to some embodiments, the seed may result in a hybrid morphology having morphologies related to both the seed morphology and the PCC morphology.

Method E

The method comprises:

i. The process of Methods A, B, C, or D where an additive is added to the gypsum to yield other defined calcium carbonate polymorphs and particle sizes, including but not limited to, rhombic or scalenohedral calcite, vaterite, aragonite, amorphous calcium carbonate, or blends thereof.

Method F

The method comprises i. The process of Methods A through E wherein the ammonium carbonate comprises a mixture of ammonium carbonate, ammonium carbamate and ammonium bicarbonate, such that the amount of ammonium bicarbonate is greater than or equal to the ammonium carbamate concentration, and upon reaction yields a calcite or calcite-vaterite blend.

Method G

The method comprises:

i. The process of Methods A through E wherein the ammonium carbonate comprises a mixture of ammonium carbonate, ammonium carbamate and ammonium bicarbonate, such that the amount of ammonium bicarbonate is less than or equal to the ammonium carbamate concentration, and upon reaction yields a vaterite or vaterite-calcite blend.

Method H

The method comprises:

i. The process of Methods A-G where the ammonium carbonate is produced by the reaction of ammonium hydroxide with $CO_2$. The ammonium carbonate introduced to the gypsum slurry is of a tailored pH, and/or excess $CO_2$ is employed to influence the polymorph and particle size obtained.

Method I

The method comprises:

i. The process of Methods A through E where a metal carbonate is used in place of the ammonium carbonate for reaction with the FGD gypsum.

ii. Reacting the FGD gypsum of Methods A through E with the metal carbonate to produce calcium carbonate in a vaterite crystal structure, calcite crystal structure, or calcite-vaterite-aragonite crystal structure blend.

Tables 1 and 2 below identify product characteristics obtained from various examples of the foregoing methods.

TABLE 1

| Reaction Details | Reaction Temperature | Reaction Time (minutes) | Product (FTIR) | Geometry (SEM) | PSD (d50), microns | D30/d70 × 100 | Surface Area (BET), m$^2$/g | Surface Area (StA uptake), m$^2$/g |
|---|---|---|---|---|---|---|---|---|
| 99% pure gypsum + ammonium carbonate (DI water) | n/a | 20 | vaterite | spherical "coral" + some rhombic | 5.32 | 68.49 | 11.25 | 10.63 |
| 99% pure gypsum + ammonium carbonate | 46° C. | 10 | vaterite | spherical "coral" + some rhombic | 5.02 | 63.29 | 11.67 | 10.43 |
| 99% pure gypsum + ammonium carbonate | 32-37° C. | 10 | vaterite | spherical "coral" | 3.96 | 67.11 | — | 13.51 |
| 99% pure gypsum + ammonium carbonate @ room temp | n/a | 95 | vaterite | spherical "coral" + some large rhombic | 4.72 | 62.50 | 13.9 | 12.89 |
| 99% pure gypsum + ammonium carbonate @ room temp (redo of Trial 15) | 20-22° C. | 60 | vaterite | spherical "coral" + some rhombic | 4.02 | 62.50 | 14.17 | — |
| 99% pure gypsum, 2% "pure" calcium carbonate + 2% H2SO4 (excess) w ammonium carbonate | 32° C. | 30 | vaterite | spherical "coral" + some rhombic | 3.08 | 65.79 | n/a | 14.89/14.82 |
| 99% pure gypsum, 2% Supermite + ammonium carbonate | 35-36° C. | 12 | calcite | rhombic | 4.61 | 60.24 | 4.95 | 4.56 |
| 99% pure gypsum, 2% "pure" calcium carbonate + ammonium carbonate | 32° C. | 10 | calcite | rhombic | 5.24 | 59.52 | 4.15 | 4.41 |
| 99% pure gypsum, 2% "pure" calcium carbonate + ammonium carbonate | 30° C. | 20 | calcite | rhombic | 5.51 | 59.52 | 3.65 | 3.74 |
| US gypsum + ammonium carbonate | 36° C. | 10 | calcite | rhombic | — | — | 4.65 | 3.03 |
| 99% pure gypsum, 2% MgCO3 w ammonium carbonate | 32° C. | 30 | vaterite + small amount calcite | spherical "coral" + needles | 3.23 | 59.88 | n/a | 24.32 |
| 99% pure gypsum, 2% magnesite w ammonium carbonate | 32-34° C. | 10 | calcite/vaterite ~9:1 | spherical "coral" | 4.84 | 60.98 | n/a | 6.33 |

TABLE 1-continued

| Reaction Details | Reaction Temperature | Reaction Time (minutes) | Product (FTIR) | Geometry (SEM) | PSD (d50), microns | D30/d70 × 100 | Surface Area (BET), m²/g | Surface Area (StA uptake), m²/g |
|---|---|---|---|---|---|---|---|---|
| 99% pure gypsum, 2% dolomitic quicklime + ammonium carbonate | 31° C. | 13 | vaterite, calcite, aragonite | Rhombic, spherical "coral" + needles | 2.89 | 51.00 | n/a | 13.73 |
| 99% pure gypsum, 2% dolomite + ammonium carbonate | 30° C. | 25 | calcite | rhombic | 4.91 | 60.98 | n/a | 2.62 |
| 99% pure gypsum, ~10% ammonium sulfate solution + ammonium carbonate | 32° C. | 10 | vaterite | spherical "coral" + some large rhombic | 4.26 | 68.97 | 14.25 | 12.69 |
| 99% pure gypsum + ammonium carbonate (amm carb temp fluctuated >46 C. during dissolution, but cooled to 43 C. prior to gypsum addition) | 31-33° C. | 10 | calcite | rhombic - large | 27.1 | 72.46 | — | 2.78 |
| Sigma gypsum + ammonium hydroxide w CO₂ at 12 C. | 12° C. | 120 | vaterite + ~8% gypsum | spherical "coral" | 13.76 | 71.43 | — | 15.25/16.04 |
| Sigma gypsum + sodium carbonate | 29-30° C. | 12 | vaterite | elliptical "coral" + some large rhombic | 2.66 | 43.29 | 10.71 | 10.66 |
| dolomitic quicklime + ammonium carbonate | 35° C. | 40 | carbonate + 15-20% Mg(OH)2 | various shapes: balls, other | 3.5 | 26 | 32.29 | n/a |
| MgSO4 + sodium carbonate | 25-26° C. | 10 | MgCO3 | undefined | 0.74 | could not be determined | could not be determined | could not be determined |

TABLE 2

| Reaction Details | Reaction Temperature | Reaction Time (minutes) | Product (FTIR) | Geometry (SEM) | PSD (d50), microns | d30/d70 × 100 | Surface Area (BET), m2/g | Surface Area (StA update), m2/g |
|---|---|---|---|---|---|---|---|---|
| 99% gypsum + ammonium carbonate (at elevated ammonium carbonate temperature) | 33° C. | 10 | calcite | large rhombic | 27.1 | 72.46 | n/a | 2.78 |

TABLE 2-continued

| Reaction Details | Reaction Temperature | Reaction Time (minutes) | Product (FTIR) | Geometry (SEM) | PSD (d50), microns | d30/d70 × 100 | Surface Area (BET), m2/g | Surface Area (StA update), m2/g |
|---|---|---|---|---|---|---|---|---|
| 99% pure gypsum, 2% calcite + ammonium carbonate | 36° C. | 12 | calcite | Rhombic | 4.61 | 60.24 | 4.95 | 4.56 |
| 99% pure gypsum, 2% magnesite + ammonium carbonate | 34° C. | 10 | calcite w small amount of vaterite | Rhombic | 4.84 | 60.24 | n/a | 6.33 |
| 99% pure gypsum, 2% dolomite + ammonium carbonate | 35° C. | 25 | calcite | Rhombic | 4.91 | 60.24 | n/a | 2.62 |

In regards to methods A-I, precipitation of the PCC may be influenced or controlled by one or more of the reaction rate, pH, reaction temperature, carbonate species present in the reaction, seed species composition, seed species concentration, purity of the feed materials (e.g., gypsum), concentration of the feed materials, ratio of the feed materials, or aging of the reaction components.

In terms of the present disclosure and methods A-I, the pH of the reacting mixture may be controlled. In one embodiment, the reacting mixture may be acidic (pH less than 6.5), neutral (pH 6.5-7.5), or basic (pH greater than 7.5).

In regards to methods A-I, the ionic strength of the reacting mixture may also be controlled. The ionic strength, I, of a solution is a function of the concentration of all ions present in that solution.

$$I = \frac{1}{2}\sum_{i=1}^{n} c_i z_i^2$$

where $c_i$ is the molar concentration of ion i (M, mol/L), $z_i$ is the charge number of that ion, and the sum is taken over all ions in the solution. In one embodiment, the ionic strength is controlled by the stoichiometry of ionizable reactants. In another embodiment, the ionic strength is controlled by the addition of ionic additives. These ionic additives may be a participating reactant, a spectator ion (i.e. a non-participating reactant), and/or a total ionic strength adjustment buffer. In another embodiment, the ionic strength is controlled by the use of deionized (DI) water.

In regards to methods A-I, a solvent may be added to gypsum to form a gypsum solution, slurry or suspension prior to reacting with the carbonate source. Suitable solvents that may be used for forming a gypsum solution, slurry, or suspension include aprotic polar solvents, polar protic solvents, and non-polar solvents. Suitable aprotic polar solvents may include, but are not limited to, propylene carbonate, ethylene carbonate, butyrolactone, acetonitrile, benzonitrile, nitromethane, acetonitrile, nitrobenzene, sulfolane, dimethylformamide, N-methylpyrrolidone, or the like. Suitable polar protic solvents may include, but are not limited to, water, nitromethane, and short chain alcohols. Suitable short chain alcohols may include, but are not limited to, one or more of methanol, ethanol, propanol, isopropanol, butanol, or the like. Suitable non-polar solvents may include, but are not limited to, cyclohexane, octane, heptane, hexane, benzene, toluene, methylene chloride, carbon tetrachloride, or diethyl ether. Co-solvents may also be used.

In a certain embodiment, the solvent added to gypsum is water. Gypsum is moderately water-soluble (2.0-2.5 g/l at 25° C.). Therefore, to form a gypsum solution, enough water is added to fully dissolve all of the gypsum prior to reaction. To form a slurry or suspension, an amount of water is added to partially dissolve the gypsum, such that some of the gypsum is fully dissolved and some of the gypsum remains in solid form. In another embodiment, water is added to gypsum to form a slurry, wherein the percent of solids in the slurry is 10-50%, or 20-40%, or 30-35%.

In methods A-I, the concentration of the reacting mixture is also controlled. In a certain embodiment, the concentration is controlled by the addition or subtraction of water from the reacting solution, mixture, or slurry.

In terms of the present disclosure and methods A-I, the mineral acid, ammonium carbonate, calcite, aragonite, calcium carbonate, dolomite, ammonium bicarbonate, ammonium carbamate, ammonium hydroxide, carbon dioxide, or any other additive or combination thereof, is added to the FGD gypsum in bulk, portion-wise, or by a slow-addition process to control the PCC product characteristics. In one embodiment, the rate of addition of these components also controls the reacting mixture concentration.

In terms of method A-I, the mineral acid, ammonium carbonate, calcite, aragonite, calcium carbonate, dolomite, ammonium bicarbonate, ammonium carbamate, ammonium hydroxide, carbon dioxide, or any other additive or carbonate source or combination thereof is added as a solution, a solid, a suspension or slurry, a gas, or a neat liquid. In terms of adding a gas, the gas may be bubbled into a solution to an effective concentration, or may be used to purge or pressurize the reaction vessel until a desired effective concentration is reached. In one embodiment, the carbonate source is selected from the group consisting of ammonium carbonate, ammonium bicarbonate, ammonium carbamate, calcium carbonate, dolomite, a metal carbonate, and carbon dioxide, wherein the metal carbonate comprises a carbonate or bicarbonate anion and at least one cation selected from the group consisting of sodium, calcium, cobalt, copper, potassium, ammonium, chromium, iron, aluminum, tin, lead, magnesium, silver, titanium, vanadium, zinc, lithium, nickel, barium, strontium, and hydronium.

In a certain embodiment, water is added to the carbonate source to form a slurry prior to the reaction with gypsum. The carbonate source slurry is then added to the gypsum to give a molar ratio of reaction of gypsum:carbonate source of 1:1.1 to 1:3, or 1:1.3 to 1:2.5, or 1:1.5 to 1:2.

The PCC compositions of the present disclosure are characterized by a single crystal polymorph content of greater than or equal to 30% by weight relative to the total weight of the composition, or greater than or equal to 40% by weight, or greater than or equal to 60% by weight, or greater than or equal to about 80% by weight, or greater than or equal to about 90% by weight.

Most advantageously, the PCC production process of Methods A-I of the present disclosure aims to produce only one form of PCC. However, a small amount of an alternative polymorph is often present, and can be readily tolerated in most end uses. Thus, the PCC compositions comprising mixtures of crystalline forms (e.g., aragonite and calcite) can be readily employed in coating formulations. Even in the case of PCC compositions predominantly comprising one form (predominately vaterite, for example), the compositions are likely to contain a small amount of at least one other crystal PCC structure (e.g., calcite). As a result, the PCC compositions of the present disclosure may optionally comprise at least one second PCC form that differs from the main PCC form.

In some embodiments, the size, surface area, and cubicity of calcite may be influenced by feed concentrations or aging of the reaction components. For example, a lower feed concentration may result in a larger particle size distribution. A larger particle size distribution may have a lower surface area. Aging, for example, may reduce the surface area of the PCC or improve the cubicity of the PCC particles. According to some embodiments, the aging may convert some or all of a vaterite phase to calcite. According to some embodiments, including ammonium sulfate in a gypsum slurry feed may aid in controlling the PCC polymorph and particle size.

In certain embodiments of the present disclosure, a stage of drying the PCC product may also be carried out in any of Methods A-I subsequent to dewatering. The drying of the product may also contribute to the resulting crystal product polymorph. In certain embodiments of the present disclosure, the PCC reaction product is a first composition after the reaction, prior to drying, with a solids content of at least 70%. The PCC reaction product may convert to a second composition after the drying stage. The drying stage may convert any amorphous PCC product of a first composition to a crystalline polymorph of a second composition (and different drying methods may make different polymorphs). The product of a first composition may be aged and seeded. A dried product may also be aged. Similar to the drying process, aging may also change the polymorph composition. The reaction to form PCC, the seeding, the drying, and the aging may all be employed in a batch process, or a continuous process (e.g. in a tubular reactor with inline static mixtures or cascade mixers). In one embodiment, the drying is performed at a temperature range of 30-150° C. for 1-15 hours.

In some embodiments, the addition of additives or seed materials may affect the structure of the PCC. For example, adding citric acid to the PCC formation step may increase the surface area of a vaterite phase that is formed. Altering the pH such as through the use of an acidic additive, such as an acid (e.g., phosphoric acid), may be used to control or vary the shape, particle size, or surface area of the PCC, and in particular to vary the morphology of a vaterite PCC. In some embodiments, the seed composition may be used to control the resulting PCC morphology. For example, using greater than about 5 wt % coarse scalenohedral PCC (relative to the weight of the feed material) as a seed material may yield a larger or coarser PCC product, and may result in a greater surface area. For example, using less than about 5% of a fine rhombohedral PCC as a seed material yields a PCC product with a finer crystal size within a PCC aggregate, whereas greater than about 5% of the fine rhombohedral PCC seed material yields a finer-sized aggregate of the PCC produced.

A structure described as amorphous herein refers to no short or long chain order and a crystalline structure refers to at least some level of order. Materials that may be described as semi-crystalline may therefore be considered crystalline in the present disclosure. The products herein are typically not 100% crystalline or 100% amorphous or non-crystalline, but rather exist on a spectrum between these points. In some embodiments, the PCC may be predominantly amorphous or a combination of an amorphous phase and a crystalline phase (such as calcite, vaterite, or argonite).

Referring now to Method A, in one embodiment, the PCC produced has a dominant crystal polymorph consistent with vaterite, with a geometry comprising spherical "coral" as well as some rhombic. In some embodiments, the vaterite PCC may have a flower-shaped geometry, a rose-shaped geometry, a needle-shaped geometry, a ball-shaped or spherical-shaped geometry, or a hexagonal geometry. The geometry or structure of the vaterite may be varied by varying one or more of the reaction rate, pH, reaction temperature, or purity of the feed gypsum. For example, a feed of high-purity gypsum (e.g., 99%) yields vaterite with a ball-shaped geometry, whereas co-generating an ammonia-based carbonate precursor and the PCC tends to yield s more flower-shaped vaterite. According to some embodiments, ball-shaped vaterite PCC is produced with pre-formed ammonia-based carbonates and lower purity gypsum during the PCC reaction.

In another embodiment, the PCC produced has a PSD ($d_{50}$) ranging from 2.0-7.0, or 3.0-6.0 microns. In another embodiment, the PCC has a steepness ($d_{70}/d_{30}$) ranging from 1.0-2.0, or 1.2-1.8, or 1.4-1.7. In another embodiment, the PCC has a surface area ranging from 8-20 m$^2$/g, or 10-15 m$^2$/g.

Referring now to Method B, in one embodiment, less than 10% by weight of a calcium carbonate seed is added to the gypsum, or less than 5%, or less than 2%, or less than 1%. In one embodiment, the PCC produced has a dominant crystal polymorph consistent with calcite, with a geometry comprising rhombic. In another embodiment, the PCC produced has a PSD (do) ranging from 4.0-6.0, or 5.0-5.8 microns. In another embodiment, the PCC has a steepness ($d_{70}/d_{30}$) in a range from 1.0-2.0, or 1.4-1.9, or 1.6-1.7. In another embodiment, the PCC has a surface area ranging from 2-6, or 3-5 m$^2$/g. According to some embodiments, the PCC may have a relatively steep particle size distribution, for example, a steepness less than about 2.2. According to some embodiments, the PCC may have a relatively broad particle size distribution, for example, a steepness greater than about 2.5.

Referring now to Method C, in some embodiments, at least 10% by weight of calcium carbonate is added to the gypsum, or at least 5%, or at least 2%, or at least 1%. In one embodiment, the PCC produced has a dominant crystal polymorph consistent with calcite, with a geometry comprising rhombic. In another embodiment, the PCC has a surface area ranging from 2-8, or 2.5-7.5 m$^2$/g.

Referring now to Method D, in some embodiments, the PCC produced may have a crystal geometry including needle forms of aragonite, rhombic calcite, spherical vaterite, flower-shaped vaterite, and other forms.

Referring to Method D, in some embodiments, the PCC may produce a hybrid structure when seeded with a non-PCC seed material, such as, for example, titania, silica, zinc oxide, or mixtures thereof.

Referring to Method D, in some embodiments, the gypsum may be seeded with magnesium sulfate and/or magnesium hydroxide instead of calcium carbonate.

Referring now to Method E, in one embodiment, the additive may be, but is not limited to a buffer, a dispersant, a thickener, an anticaking agent, a defoamer, a rheology agent, a wetting agent, a crystal seed, a co-solvent, a brightness enhancer, or any agent that affects crystal morphology/geometry of the product. Examples of additives include, but are not limited to, citric acid, phosphoric acid, a sugar, $BaCl_2$, MgO, $MgCO_3$, $H_2SO_4$, $H_3PO_4$ HCl, various phosphates, sodium hexametaphosphate, and $NO_3$ compounds. Examples of brightness enhancers include, but are not limited to, $Fe_2O_3$, MnO, and $Pb^{+2}$. According to some embodiments, when the additive is an acid, such as, for example, citric acid, the surface area of a resulting PCC morphology, such as vaterite, may be increased. The selection of the acid, such as, for example, phosphoric acid, may be used in varying amounts to control the shape, particle size, and/or surface area of the PCC, such as a vaterite phase.

Referring now to Method F and G, in one embodiment, ammonium bicarbonate is added to the ammonium carbonate (or vice versa) to generate a mixture, and the mixture is then added to the gypsum. In another embodiment, $CO_2$ gas is bubbled into a slurry containing ammonium hydroxide, and the bubbling results in the formation of ammonium carbonate, and ammonium bicarbonate and/or ammonium carbamate in situ, and the resulting mixture of ammonium carbonate, ammonium carbamate and ammonium bicarbonate is then added to the gypsum. In one embodiment, ammonia and $CO_2$ are reacted in the presence of gypsum.

Referring now to Method H, in one embodiment, the carbon dioxide can be pure carbon dioxide gas, flue gas containing 15-90% carbon dioxide gas, or flue gas with enriched carbon dioxide gas (e.g., greater than 90% $CO_2$). In one embodiment, the FGD gypsum is mixed with ammonia prior to the addition of $CO_2$. In an alternative embodiment, ammonia and $CO_2$ are first mixed and reacted, and then the reacted mixture is added to the FGD gypsum. In one embodiment, the $CO_2$ is added by bubbling into solution. In an alternative embodiment, $CO_2$ is added as dry ice. During the preparation, the nucleation rate and crystal size of calcium carbonate can be controlled through controlling of the reaction time and temperature. In a certain embodiment, the carbon dioxide, or carbon dioxide equivalent is equimolar or greater to the gypsum reactant. The reaction time may be 0.2-10 hours, or 0.5-3 hours, and the temperature may be in a range from 8-90° C., or from 10-98° C. According to some embodiments, a $CO_2$-containing gas, such as a flue gas, may be continuously added during the reaction period with the ammonia. According to some embodiments, the addition of a $CO_2$-containing gas may be stopped during the reaction period with the ammonia. When the $CO_2$ addition is stopped, it may be optionally restarted prior to a filtration step.

According to some embodiments, the reaction products may be stored before isolating the carbonate with ammonium sulfate to allow for ripening of the reaction products. The ripening could be performed with or without the addition of $CO_2$ during the storage. According to some embodiments, the $CO_2$ may be added after the conversion to calcium carbonate and ammonium sulfate. According to some embodiments, the $CO_2$ may be added after isolating the calcium carbonate. According to some embodiments, the introduction of $CO_2$, such as, for example, after isolating the calcium carbonate or after a reslurrying step, may be used to control the particle size of the calcium carbonate.

Referring now to Method I, in one embodiment, the metal of the metal carbonate is a monovalent ion (e.g., an alkali metal). In one embodiment, the PCC produced may have a crystal geometry including needle forms of aragonite, rhombic calcite, spherical vaterite, and other forms. In one embodiment, the metal of the metal carbonate is a divalent ion, such as magnesium. Magnesium carbonate may also be yielded under conditions where magnesium cation is present in the gypsum or in the metal carbonate (e.g. magnesium carbonate, dolomite, etc.).

In some embodiments, ammonium sulfate is added to the reaction mixture to control the reaction rate. In some embodiments, sodium thiosulfate is added instead of ammonium sulfate. For example, the ammonium sulfate may be added to a gypsum slurry. The concentration of ammonium sulfate may be varied to control the PCC polymorph type and particle size.

The carbonate source can be pre-formed or generated during the reaction. For example, $CO_2$ may be bubbled with ammonia gas to generate ammonium carbonate used for the reaction. In general, ammonium carbonate comprises a mixture of ammonium carbonate, ammonium carbamate, and ammonium bicarbonate. The amount of each species may depend on the reaction conditions used to manufacture the ammonium carbonate. Furthermore, ammonium carbamate may convert into ammonium bicarbonate in the presence of water. In general, ammonium bicarbonate dissolves slower and reacts slower with gypsum than ammonium carbamate. When a mixture of ammonium carbonate is in solution with gypsum, and the reaction takes place in solution, the PCC product tends to be calcite. In general, under condition in which the reaction takes place in a slurry, the PCC yielded is vaterite. Reacting ammonium hydroxide with $CO_2$ at room temp or 40° C. gives ammonium bicarbonate, which reacts as anticipated with seeded gypsum (gives calcite) or unseeded gypsum (gives vaterite). Ammonium hydroxide may be pre-formed by addition of ammonia to water, and the ammonium hydroxide may be fed into slurried gypsum prior to addition of $CO_2$. Alternatively, ammonium carbonate may be fully generated, then introduced to the slurried gypsum for reaction. In presence of gypsum, ammonium hydroxide with $CO_2$ yields ammonium bicarbonate, which begins to react with gypsum and yield ammonium sulfate during ammonium bicarbonate generation.

Under seeding conditions, referring to Methods B-I, wherein a pure calcite seed (where dolomite or magnesium levels are <2%) is added to the reacting mixture, the resulting PCC product is formed with a rhombic geometry. Similarly, seeding with magnesite or dolomite also yields rhombic PCC.

According to some embodiments, the gypsum may be seeded to magnesium sulfate and/or magnesium hydroxide. In some embodiments, a magnesium sulfate solution may be seeded with gypsum or carbonate to control the dolomite composition. According to some embodiments, the type of seed material may be used to vary or control the PCC. For example, seeding with coarse scalenohedral PCC in greater than about 5% may yield a PCC product having a larger particle size and a relatively higher surface area. Seeding with a fine rhombohedral PCC in less than about 5% may yield a finer crystal size within an aggregate of the PCC product, while greater than about 5% of fine rhombohedral PCC may yield a finer aggregate size in the PCC product. In some embodiments, during the carbonation step, titania, silica, and/or zinc oxide may be used as a seed to produce a hybrid structure.

According to some embodiments, the hybrid structure may include a PCC component bound to at least a portion of a surface of a seed component. For example, the PCC component may be chemically bound to the seed component, such as, for example, through ionic, coordinate covalent (dative), or van der Waals bonds. According to some embodiments, the PCC component may physically bond or attach to the seed component. According to some embodiments, the PCC component may be adsorbed or physisorbed to the seed component. According to some embodiments, the PCC component may form a carbonate layer over the seed component during the carbonating step. For example, the PCC component may form a carbonate layer, shell, or coating that covers at least a portion of, majority of, or substantially all of, the seed component. According to some embodiments, the PCC component may coat, enclose, or encapsulate substantially all of the seed component.

According to some embodiments, the hybrid structure may include a PCC component, a seed component, and/or an interfacial component. The interfacial component may be, for example, a boundary region between the PCC component and the seed component. The interfacial component may include a chemical composition containing elements of the carbonate component and the second component. For example, when the hybrid structure includes a calcium carbonate as the PCC component and a magnesium carbonate as the seed component, an interfacial region may include calcium and/or magnesium diffusing into the other component, or a region containing a mixture of calcium carbonate and magnesium carbonate. An interfacial region may occur, for example, upon thermal treatment (e.g., sintering) of the hybrid structure.

The PCC compositions of the present disclosure may be in any desired form, including but not limited to, powders, crystalline solids, or in dispersed form, i.e., the PCC compositions may be dispersed in a liquid, such as in an aqueous medium. In one embodiment, the dispersed PCC composition comprises at least about 50% PCC by weight relative to the total weight of the dispersion, or at least about 70% PCC by weight. The dispersed PCC composition may comprise at least one dispersing agent, which may be chosen from dispersing agents now known in the art or hereafter discovered for the dispersion of PCC. Examples of suitable dispersing agents include, but are not limited to: polycarboxylate homopolymers, polycarboxylate copolymers comprising at least one monomer chosen from vinyl and olefinic groups substituted with at least one carboxylic acid group, and water soluble salts thereof. Example of suitable monomers include, but are not limited to, acrylic acid, methacrylic acid, itaconic acid, crotonic acid, fumaric acid, maleic acid, maleic anhydride, isocrotonic acid, undecylenic acid, angelic acid, and hydroxyacrylic acid. The at least one dispersing agent may be present in the dispersed PCC composition in an amount ranging from about 0.01% to about 2%, or from about 0.02% to about 1.5% by weight relative to the total weight of the dispersion.

FGD gypsum typically contains contaminants and is of low whiteness and brightness. Major contributors to discoloration may include insoluble impurities, such as pyrite and various organic species. In the present disclosure, gypsum may be pretreated prior to reaction with a carbonate source. In one embodiment, this pretreatment includes, but is not limited to, a filtration or sieving step and/or a mineral acid treatment step. Filtration method may be, but is not limited to vacuum filtration.

Fully dissolved gypsum may be filtered or centrifuged to remove the impurities that result in low whiteness and brightness. Filtration method may be, but is not limited to vacuum filtration, but may refer to any dewatering process common to the art. Furthermore, large contaminants may be removed from the gypsum by sieving. Alternatively, a mineral acid, such as nitric acid, may be employed to improve whiteness and brightness of the gypsum by removing species causing discoloration. A mineral acid may also be employed to remove remaining carbonate species in the gypsum. Therefore, in terms of Methods A and B wherein mineral acid is added to remove excess carbonate, additional mineral acid may be added to remove non-carbonate contaminants. Additionally, the mineral acid addition step of Methods A and B to remove carbonate impurities may be different from the mineral acid used to remove contaminants resulting in low whiteness and brightness, and the step to remove carbonate impurities may take place prior to the step to remove contaminants resulting in low whiteness and brightness, and vice versa. Thus, it is envisioned within the scope of the present disclosure that in Methods A-I, the method may be modified to include a step for removing impurities and/or improving the whiteness and brightness of the gypsum by filtering from the fully dissolved gypsum, sieving, and/or utilizing a mineral acid. According to some embodiments, the PCC compositions may have low ionic impurities. According to some embodiments, the low ionic impurities may improve the electrical properties of the PCC or a finished product containing the PCC. It is envisioned that this pretreatment step is performed prior to reacting gypsum with the carbonate source, additive, or seed and that a gypsum of improved whiteness and brightness may yield, after reaction with a carbonate source, a PCC product of whiteness and brightness similar to that of the cleaned gypsum. Polymorph and particle size of the PCC yielded may be controlled using methods disclosed herein, in one or more of their embodiments.

According to some embodiments, the PCC may have an ISO brightness greater than or equal to 80, such as, for example, greater than or equal to 85, greater than or equal to 88, greater than or equal to 90, greater than or equal to 92, or greater than or equal to 94. According to some embodiments, the PCC compositions have a consistent or homogeneous brightness across the PCC particles.

Rhombic precipitated calcium carbonate of a particular size distribution can be yielded from FGD gypsum by reacting with ammonium carbonate in the presence of a calcium carbonate crystal seed and by controlling reaction parameters as disclosed herein. Rhombic PCC generated from this method has similar properties to either rhombic produced by traditional methods or ground calcium carbonate (GCC).

Reaction of gypsum with carbonate in the presence or absence of additives to yield the rhombic PCC can be carried out in a batch or continuous process. Specific selection of reaction conditions aid in fine-tuning the properties of the PCC generated. The following may be controlled for rhombic PCC production disclosed herein: concentration of gypsum and other reactants, starting temperature for each reactant, reaction temperature and reaction time, drying temperature, annealing temperature for generated PCC where employed, selection and maintenance of pH and ionic strength for each solution, addition rate of each added component, and rate of $CO_2$ addition, where employed.

PCC may be surface treated with stearic acid, other stearate or hydrocarbon species to yield a specific level of hydrophobicity. Hydrophobicity may be measured using a moisture uptake (MPU) technique, in which a PCC powder is exposed to a high relative humidity atmosphere for 24 h or longer and the weight change due to water sorption is recorded. In general, the maximum reduction in MPU achievable by surface treatment is particularly advantageous. Hydrophobicity may also be measured by contact angle, in which a droplet of a test liquid (e.g. water) is placed on a PCC powder and is observed to see whether the droplet is absorbed (wets) or gives a stable droplet with a measurable contact angle. Surface treatments may involve dry or wet coating with a C6-C22 fatty acid or fatty acid salt. Such treatments are well-known in the art, and in addition to stearic acid, include such materials as ammonium stearate, sodium stearate, palmitic acid, and others. The fatty acid/ fatty acid salt is provided in sufficient quantity to coat a substantial portion of the surface of the majority of PCC particles. The amount of hydrophobizing agent needed to coat a substantial portion of the PCC surface is related to the PCC surface area. In one embodiment, a calcite PCC of this disclosure requires 0.5-1.0% hydrophobizing agent to coat the surface. In another embodiment, a vaterite PCC requires 2.0-3.0% hydrophobizing agent to coat the surface. Treated and untreated PCC or blends thereof, of single or blended size distributions can be used in a variety of applications, including adhesives and sealants as a rheology modifier, in paints and ink for opacity, as an extender, as a paper filler, for surface finishing and brightness, a functional filler in plastics, and as an extender. According to some embodiments, the hydrophobizing agent may form a monolayer on the surface of the PCC. According to some embodiments, the amount of hydrophobizing agent may be in a range from about 0.15 $m^2/g$ to about 18 $m^2/g$ to coat the particles, such as, for example, in a range from about 0.15 $m^2/g$ to about 8 $m^2/g$ or from about 10 $m^2/g$ to about 17 $m^2/g$. The amount of hydrophobizing agent may be dependent on the morphology of the PCC. For example, calcite PCC may have an amount of hydrophobizing agent in a range from about 0.15 $m^2/g$ to about 8 $m^2/g$ to coat the particles, and vaterite PCC may have an amount of hydrophobizing agent in a range from about 10 $m^2/g$ to about 17 $m^2/g$ to coat the particles.

In some embodiments, a size reduction method is employed either in situ or on the product after recovery. A size reduction method may include sonication or grinding. Since the products appear to exhibit 'substructure' that is most likely interpretable as aggregation, a size reduction method may break apart the aggregates into their constituent building blocks. According to some embodiments, ultrasound may be used to break down agglomerates.

According to some embodiments, the PCC may be beneficiated by grinding or milling. In some embodiments, the beneficiation may include one or more of magnetic separation, bleaching, or acid washing. The separation, bleaching, or acid washing may occur before the grinding/milling, after the grinding/milling, or both.

The PCC compositions of the present disclosure may optionally comprise at least one added pigment. Suitable pigments are those now known or that may be hereafter discovered. Exemplary pigments include, but are not limited to, titanium dioxide, calcined clays, delaminated clays, talc, calcium sulfate, other calcium carbonate, kaolin clays, calcined kaolin, satin white, plastic pigments, aluminum hydrate, and mica.

The pigment may be present in the PCC compositions of the present disclosure in an amount less than about 70% by weight relative to the total weight of the composition. It is to be understood that the skilled artisan will select any amounts of the optional at least one second PCC form and the optional at least one pigment in such a way so as to obtain various desired properties without affecting, or without substantially affecting, the advantageous properties of the PCC compositions disclosed herein.

In a different embodiment, the present disclosure relates to a process for converting limestone, marble, or chalk into precipitated calcium carbonate comprising i) treating limestone, marble, or chalk with a mineral acid comprising sulfate anions to yield a calcium sulfate and magnesium sulfate mixture ii) optionally adding a calcium carbonate seed to the calcium sulfate iii) optionally adding an additive to the calcium sulfate iv) reacting the calcium sulfate with at least one carbonate source selected from the group consisting of ammonium carbonate, ammonium bicarbonate, ammonium carbamate, calcium carbonate, dolomite, a metal carbonate, and carbon dioxide at a temperature of 8-50° C. and a reaction time of 5-250 minutes, to yield precipitated calcium carbonate and v) isolating the precipitated calcium carbonate. In a certain embodiment, reaction conditions are used to control the crystalline polymorph and particle size of the precipitated calcium carbonate thus obtained.

Limestone is a sedimentary rock composed largely of the minerals calcite and aragonite. Dolomitic quicklime is calcined dolomite that is rehydrated (e.g., MgOH and CaOH).

Certain embodiments of the present disclosure relate to a low energy method of producing precipitated calcium carbonate of controlled polymorph and particle size with limestone, marble, or chalk as the calcium source. Treating an impure calcium carbonate source with sulfuric acid generates sulfate products, including calcium sulfate (gypsum) and magnesium sulfate. Then, after treatment with ammonium carbonate or a metal carbonate, a PCC and sulfate-based solution-phase byproduct are generated. The polymorph and particle size of PCC generated from gypsum produced in this process can be controlled by methods disclosed within, in one or more of their embodiments. The use of sulfuric acid and limestone to generate gypsum is known in the art. However, the controlled precipitation of calcium carbonate to generate one or more various PCC polymorphs has not been previously described. Separately, magnesium carbonate can be generated from $MgSO_4$ formed during dolomitic limestone reaction with sulfuric acid and dissolved in the aqueous phase by reaction with an appropriate carbonate.

In one embodiment, the amount of sulfuric acid added to limestone is optionally a molar equivalent of or in excess of the amount of calcium present in the limestone.

A Precipitated Calcium Carbonate Compound

The present disclosure relates to a precipitated calcium carbonate compound with a vaterite polymorph. The vaterite precipitated calcium carbonate described within has improved structural characteristics, such as particle size distribution (PSD), steepness, and BET surface area, as compared to heretofore known vaterite precipitated calcium carbonate. See Table 3 below for vaterite characteristics.

TABLE 3

|  | IMERYS Calcite | IMERYS Vaterite |
|---|---|---|
| PSD (d50), | 1.5-28 | 1.5-28 |
| d30/d70 × 100 | 73.5-59.5 | 69.0-43.3 |
| Surface Area (BET), m$^2$/g | 0.4-20 | 8-17 |
| Surface Area (Stearic Acid uptake), m$^2$/g | 0.4-20 | 8-17 |

The PCC compositions may also be characterized in terms of their cubicity, or the ratio of surface area to particle size (i.e., how close the material is to a perfect cube). According to certain embodiments of the present disclosure, a lower surface area is advantageous. Smaller particles typically have much higher surface area, but small particle size is advantageous for many different applications. Thus PCC products with small particle size material and lower than "normal" surface area particularly advantageous. Rhombic crystal forms are generally preferred in terms of cubicity.

Figure 14:
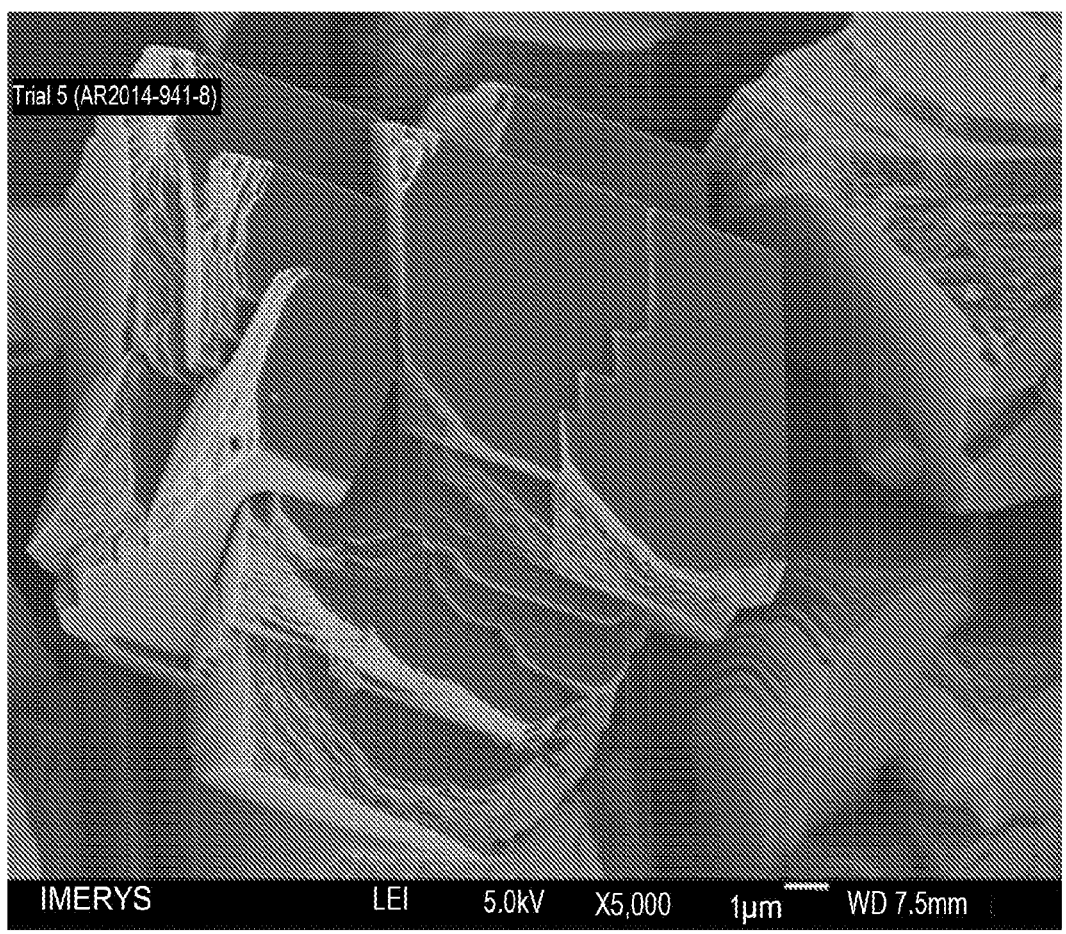
FIG. 14 is an SEM image of a calcite ~300-500 nm with 2% calcite seeding and high theoretical ammonium bicarbonate content in ammonium carbonate.
Figure 15:
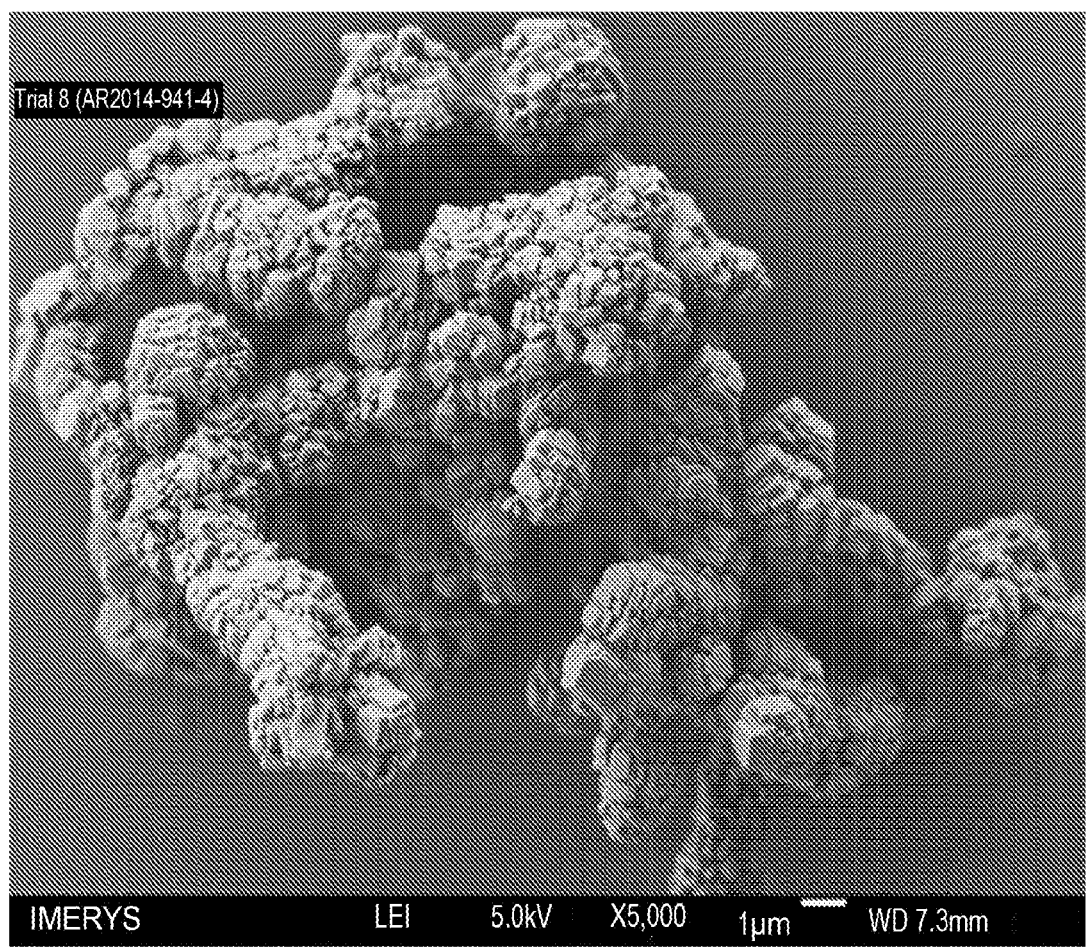
FIG. 15 is an SEM image of a Rhombic PCC from Crystal Seeding with calcite seed.
Figure 16:
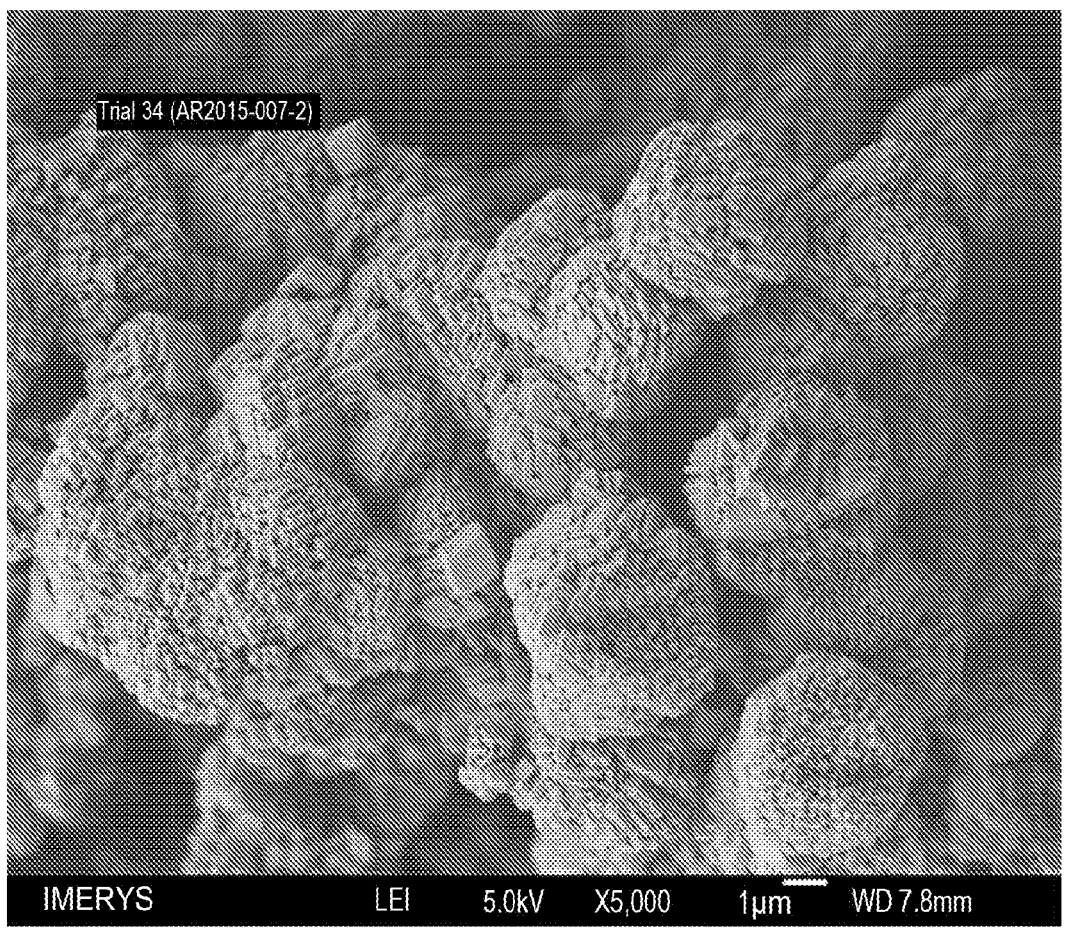
FIG. 16 is an SEM image of a Rhombic PCC from Crystal Seeding with magnesite seed.
Figure 17:
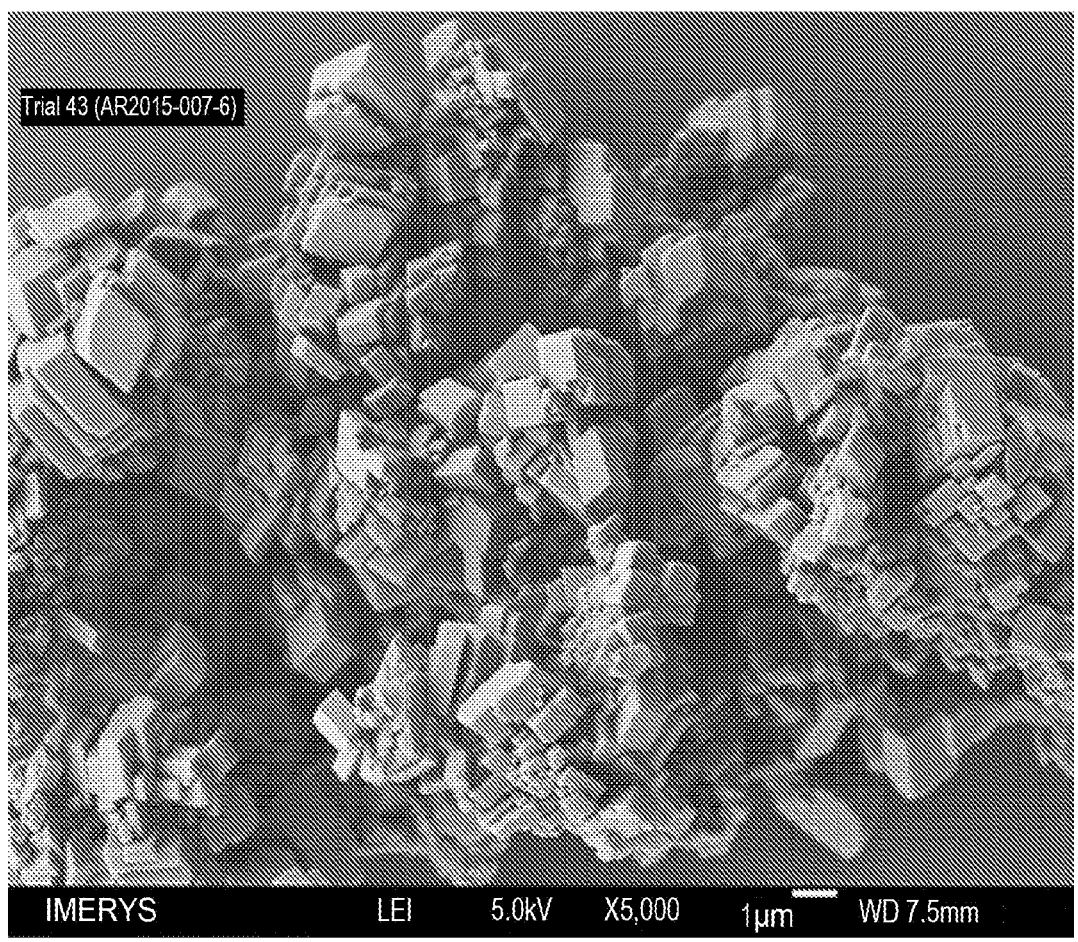
FIG. 17 is an SEM image of a Rhombic PCC from Crystal Seeding with dolomite seed.
Figure 18:
FIG. 18 is an SEM image of a Non-Rhombic Polymorph from Partial-Crystal Seeding of vaterite+aragonite from [calcite+$MgCO_3$ (1:3 molar ratio)] seeding.
Figure 19:
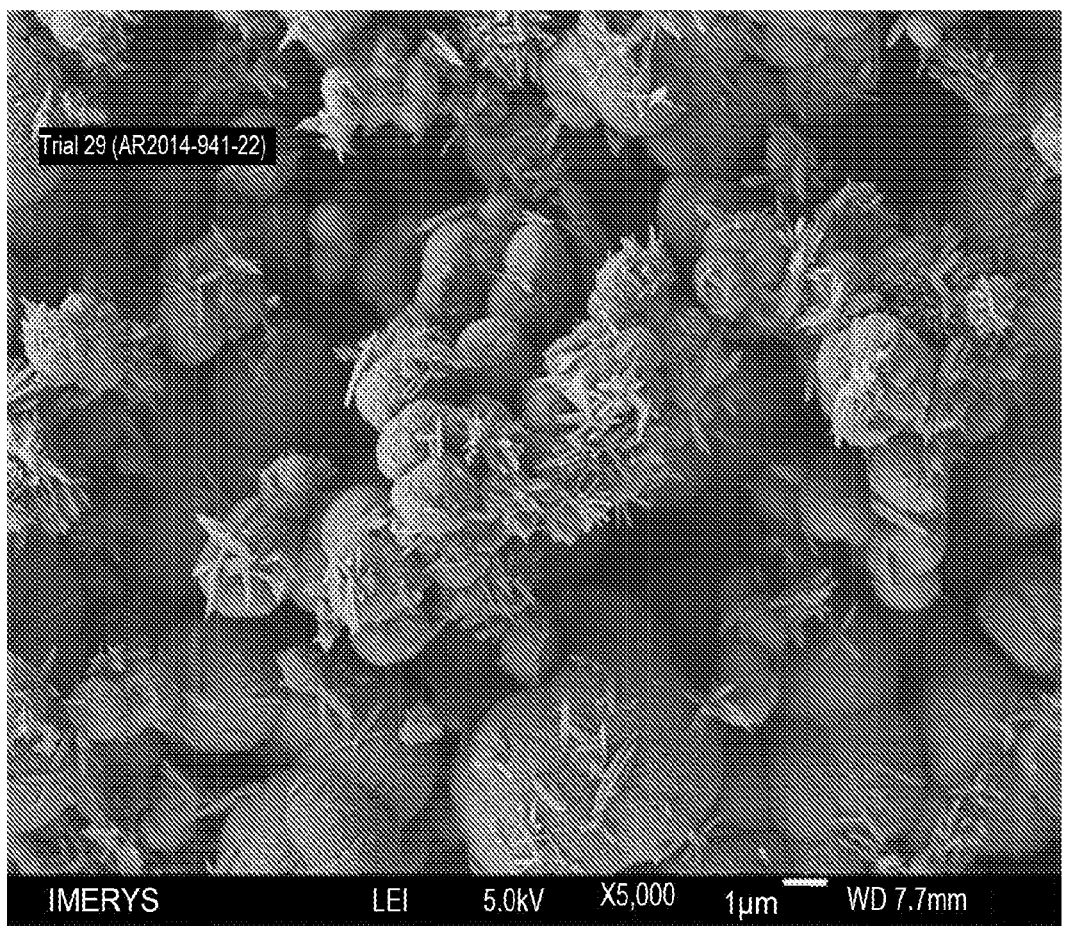
FIG. 19 is an SEM image of a Non-Rhombic Polymorph from Non-Crystal Seeding of vaterite+aragonite from $MgCO_3$ seeding.
Figure 20:
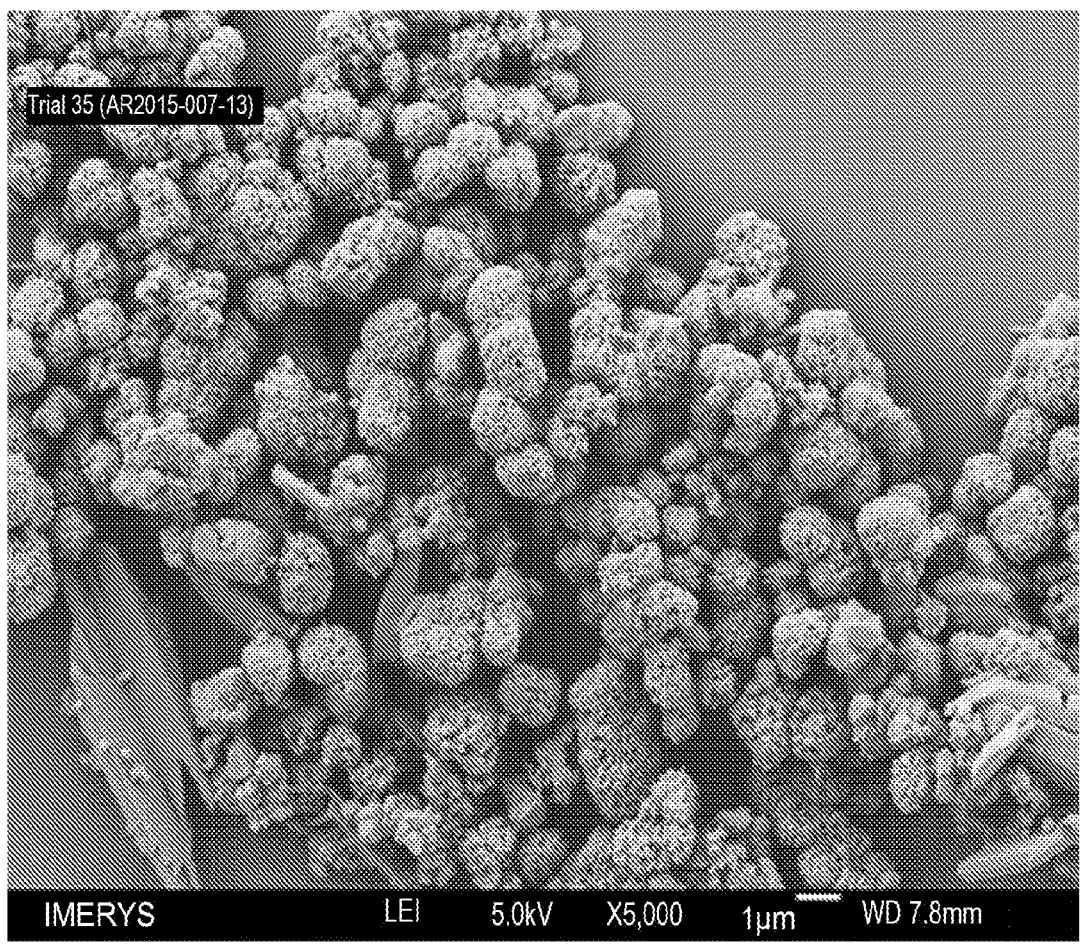
FIG. 20 is an SEM image of a Non-Rhombic Polymorph from Non-Crystal Seeding of vaterite rhombic calcite and aragonite from dolomitic quicklime seeding.
Figure 21:
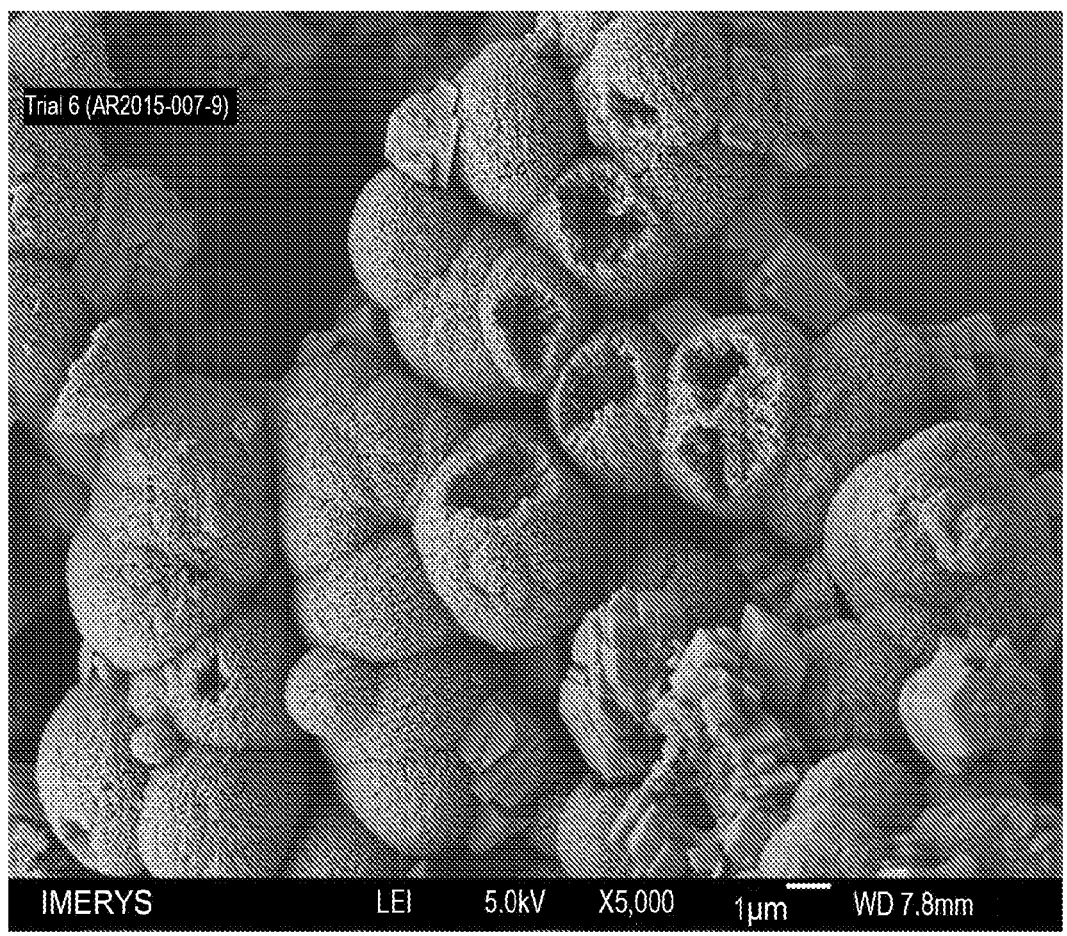
FIG. 21 is an SEM image of a Calcite, Vaterite from FGD Gypsum+Ammonium Carbonate.
Figure 22:
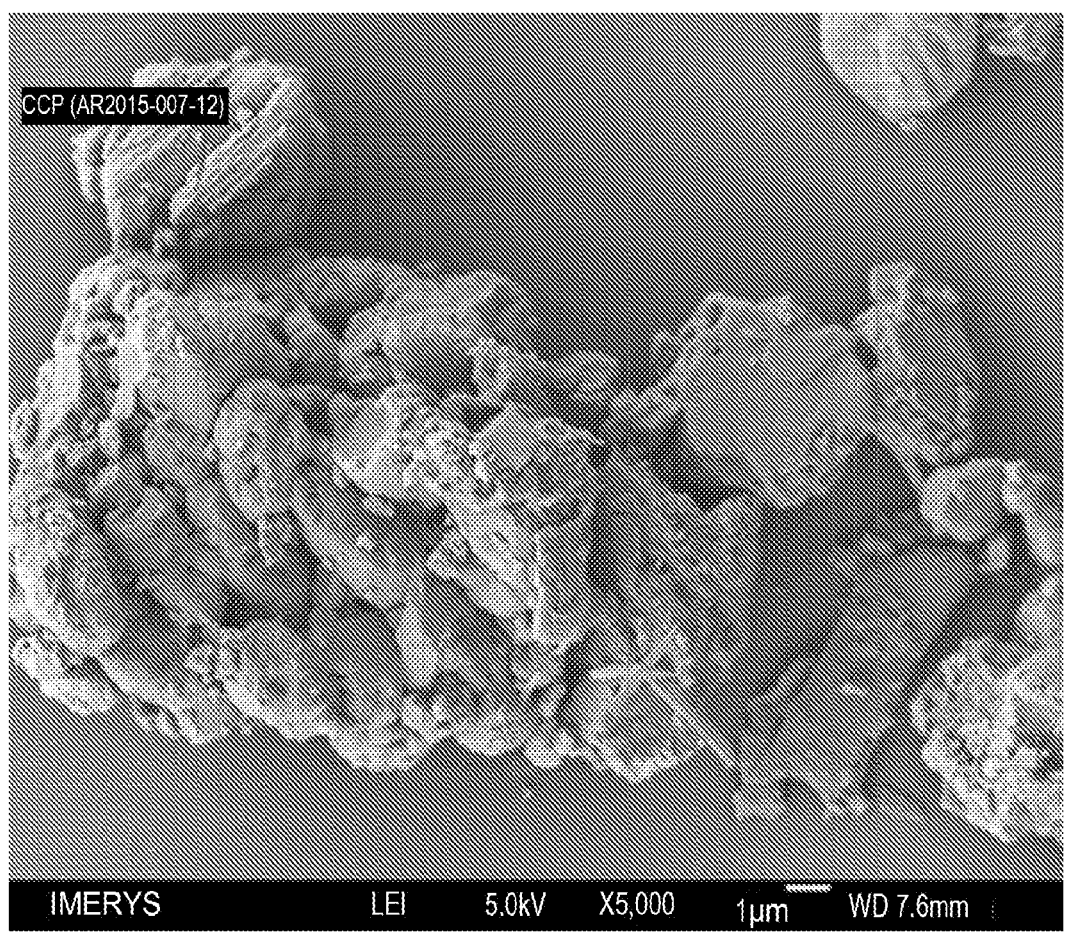
FIG. 22 is an SEM image of a Jamaican ore Seed GCC.
Figure 23:
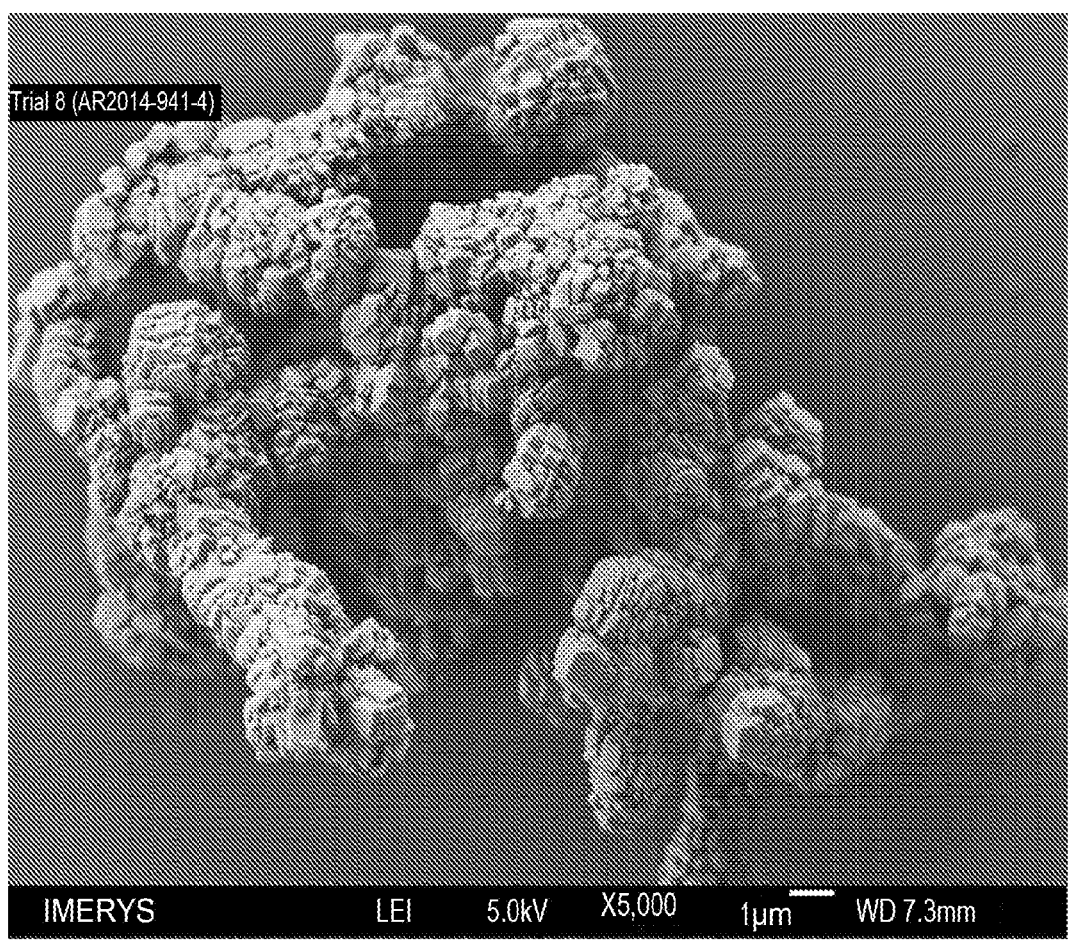
FIG. 23 is an SEM image of a Rhombic Calcite from Calcite-Seeded Gypsum.
Figure 24:
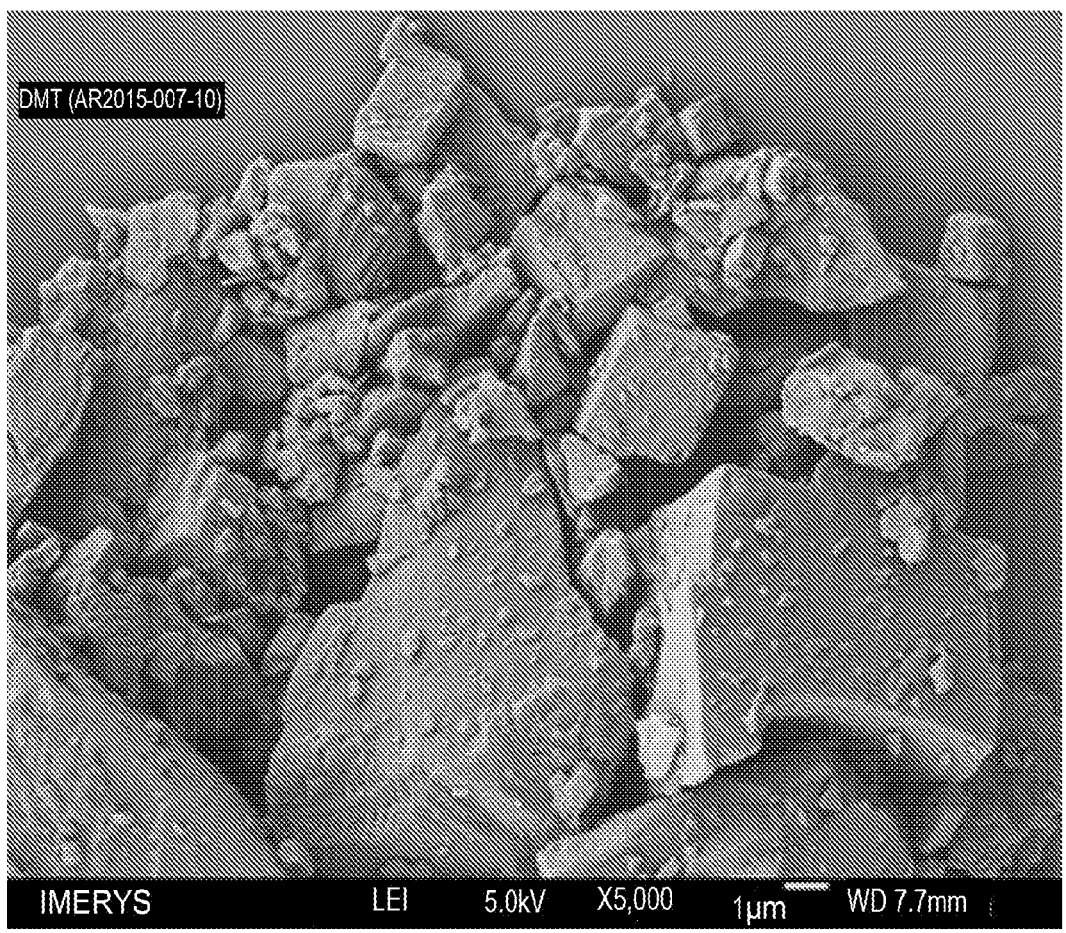
FIG. 24 is an SEM image of a bluegrass ore Dolomite Seed GCC.
Figure 25:
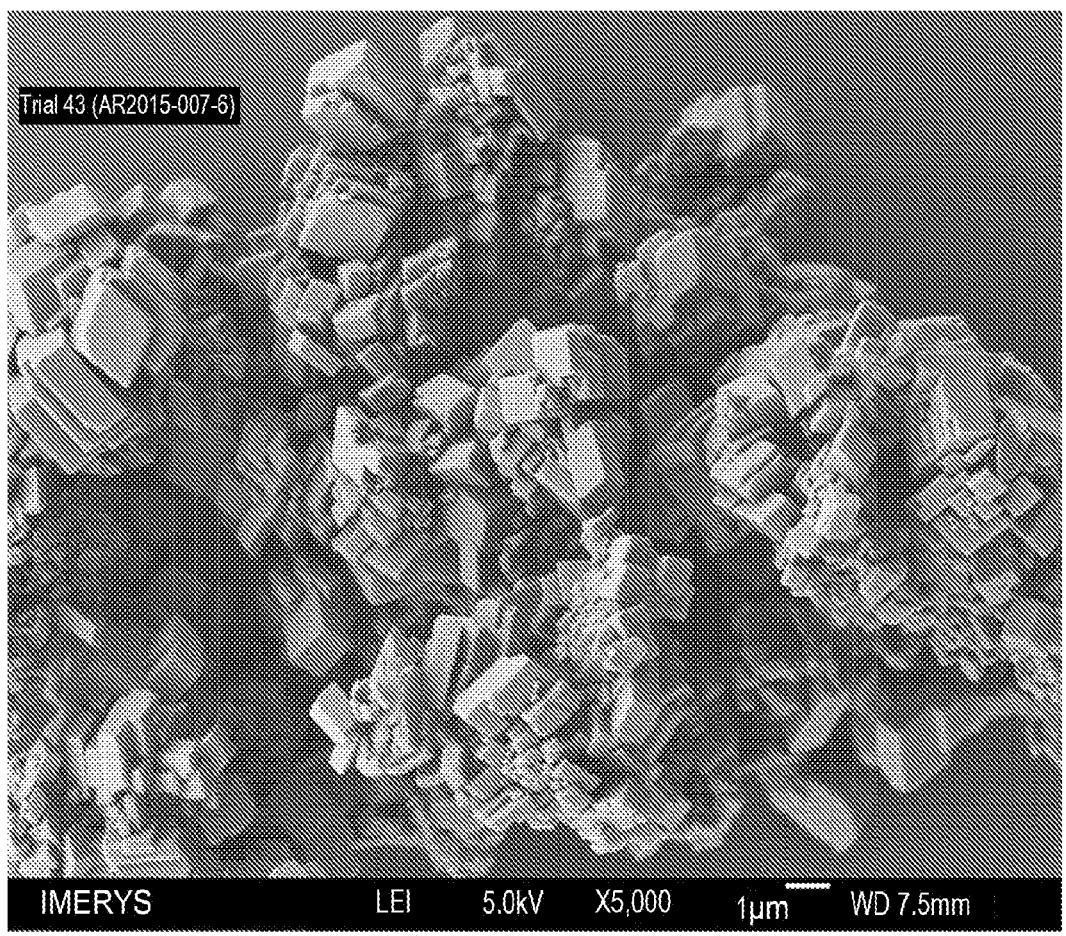
FIG. 25 is an SEM image of a Rhombic Calcite from Dolomite-Seeded Gypsum.
Figure 26:
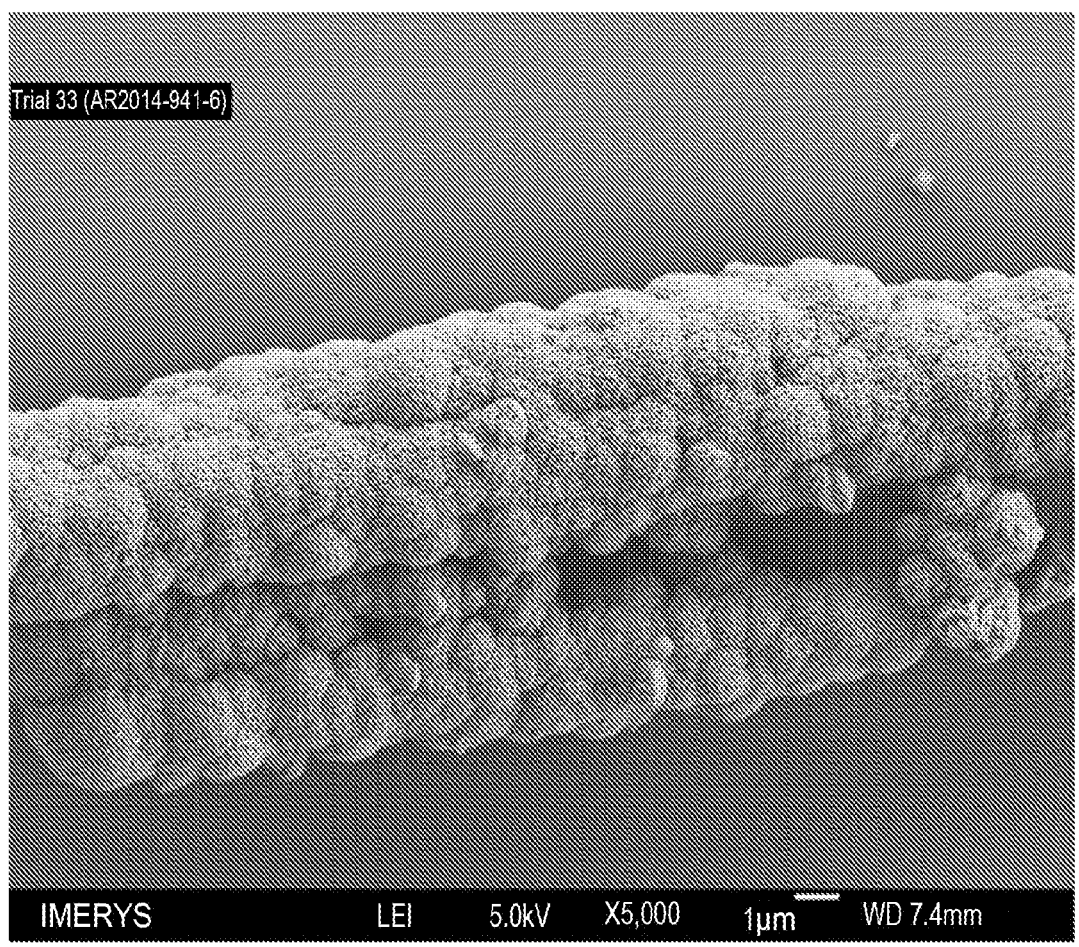
FIG. 26 is an SEM image of a Vaterite from Pure Gypsum (No Seeding) at Low Temp (12 C).
Figure 27:
FIG. 27 is an SEM image of a Calcite, Vaterite Blend from Pure Gypsum (No Seeding).
Figure 28:
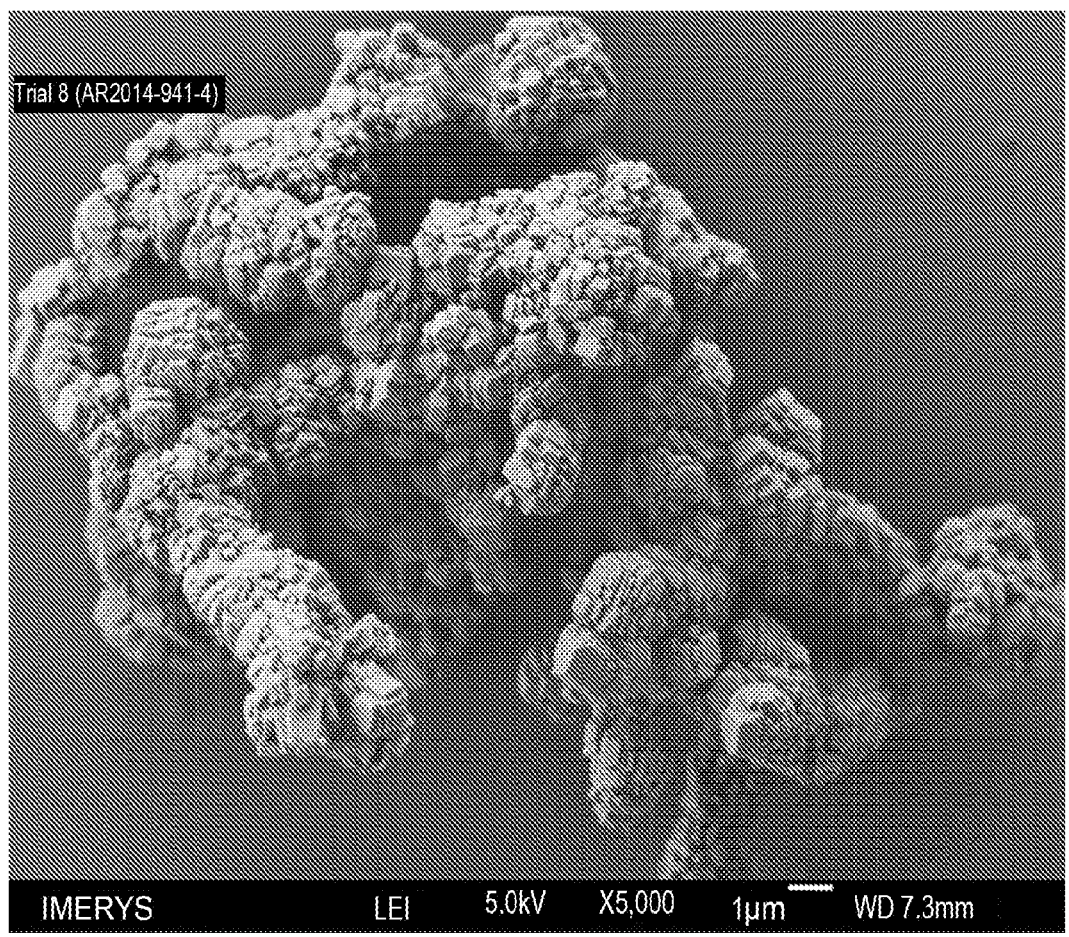
FIG. 28 is an SEM image of a Rhombic Calcite from Calcite-Seeded Gypsum.
Figure 29:
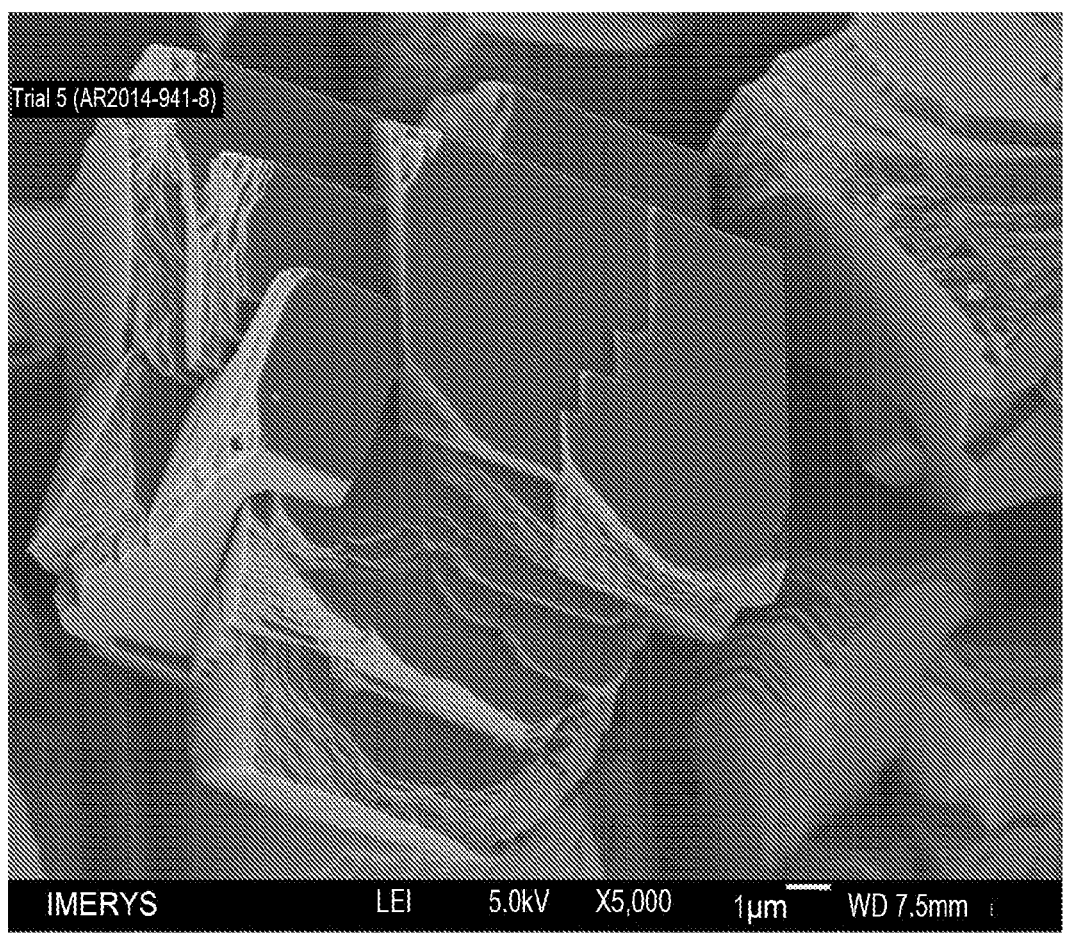
FIG. 29 is an SEM image of a Large Rhombic Calcite from Calcite-Seeded Gypsum Reacted with Ammonium Carbonate Heated >46 C.
Figure 30:
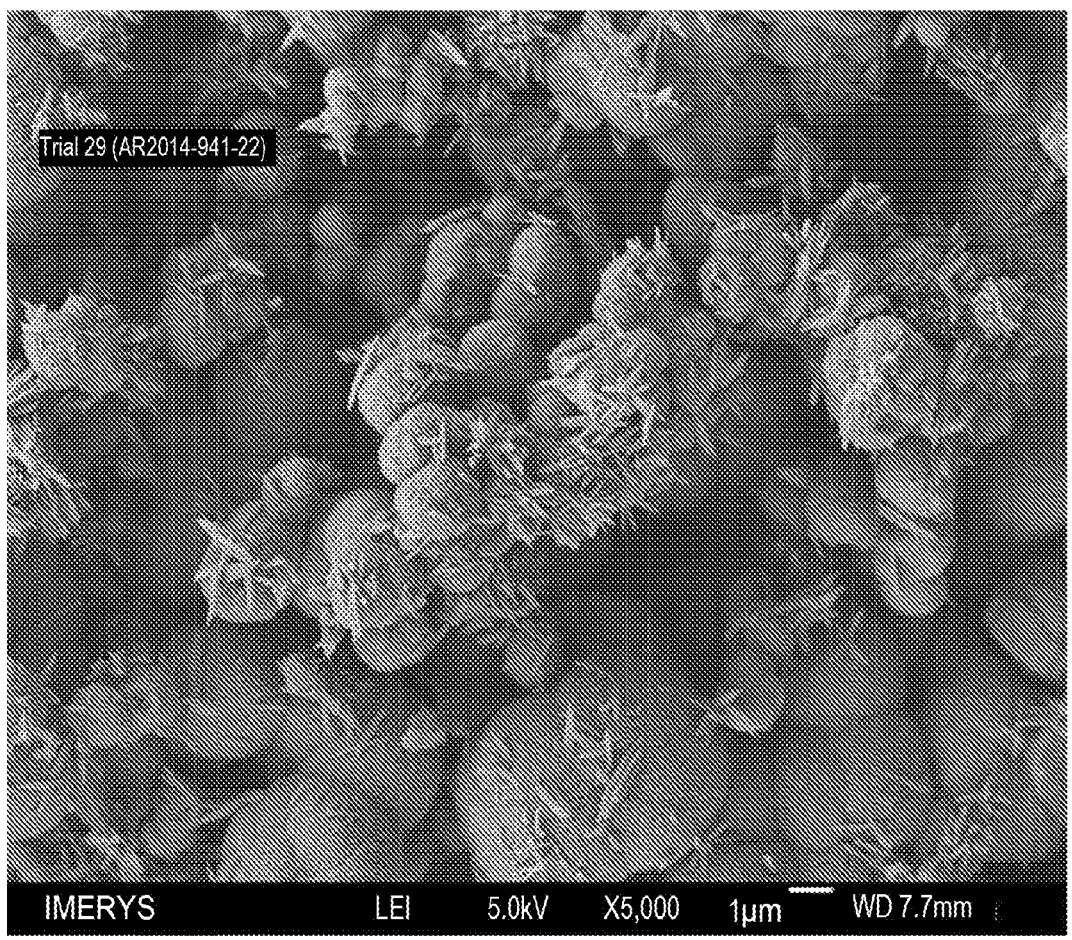
FIG. 30 is an SEM image of a Vaterite, Aragonite from Gypsum seeded with $MgCO_3$.
Figure 31:
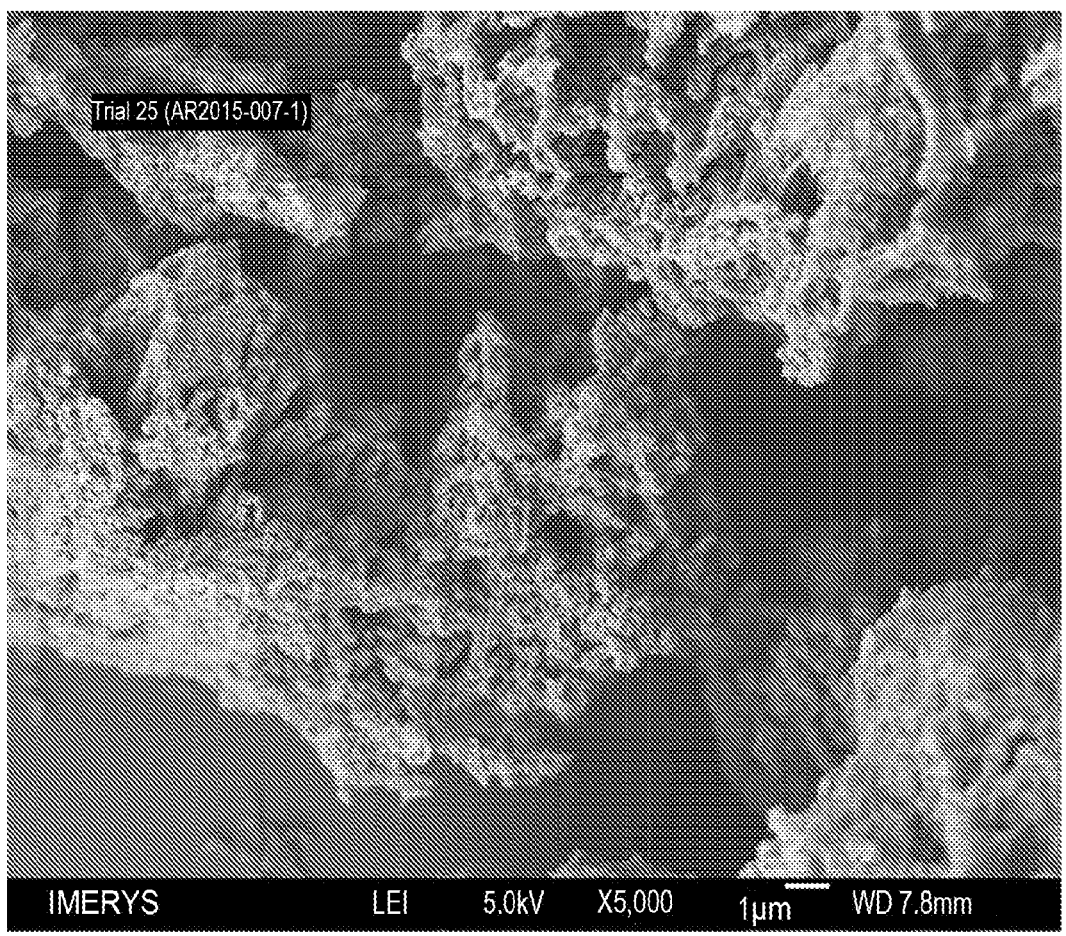
FIG. 31 is an SEM image of $MgCO_3$ from $MgSO_4$+Ammonium Carbonate.
Figure 32:
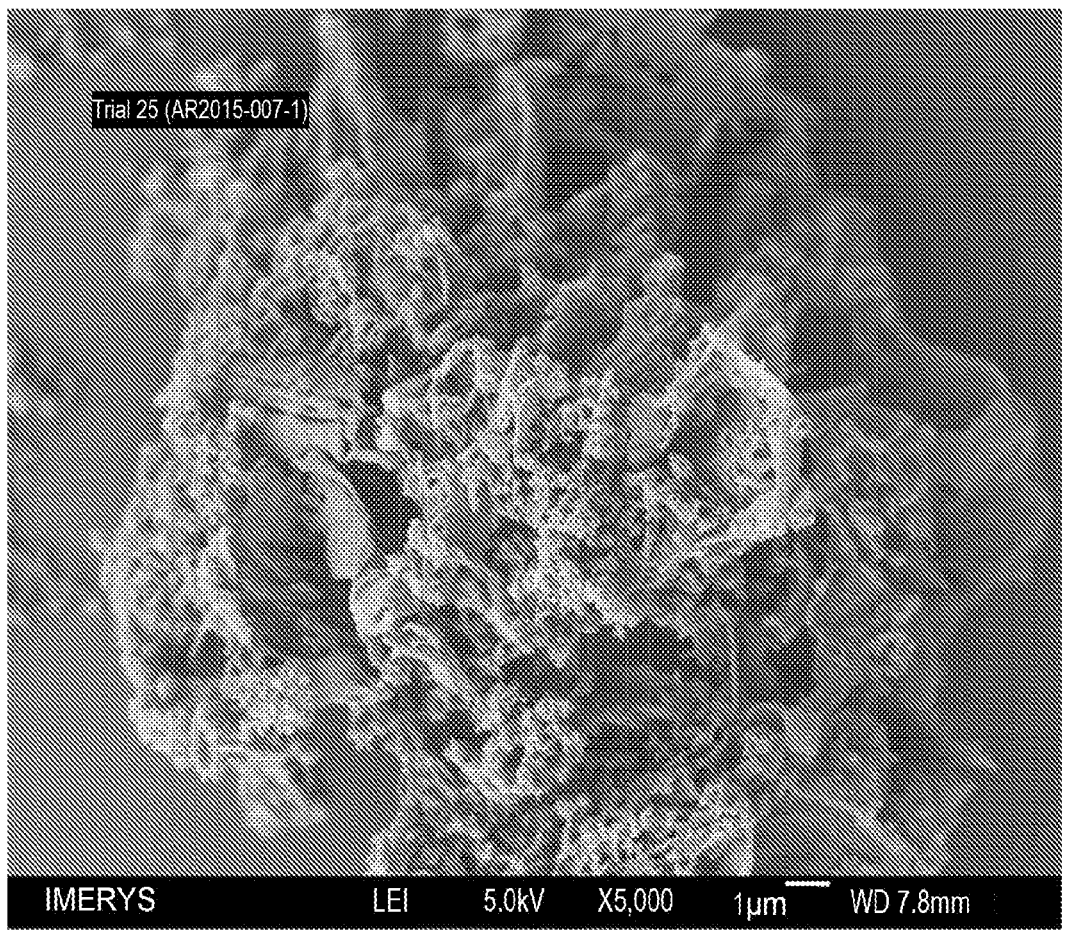
FIG. 32 is an SEM image of $MgCO_3$ from $MgSO_4$+Ammonium Carbonate.
Figure 33:
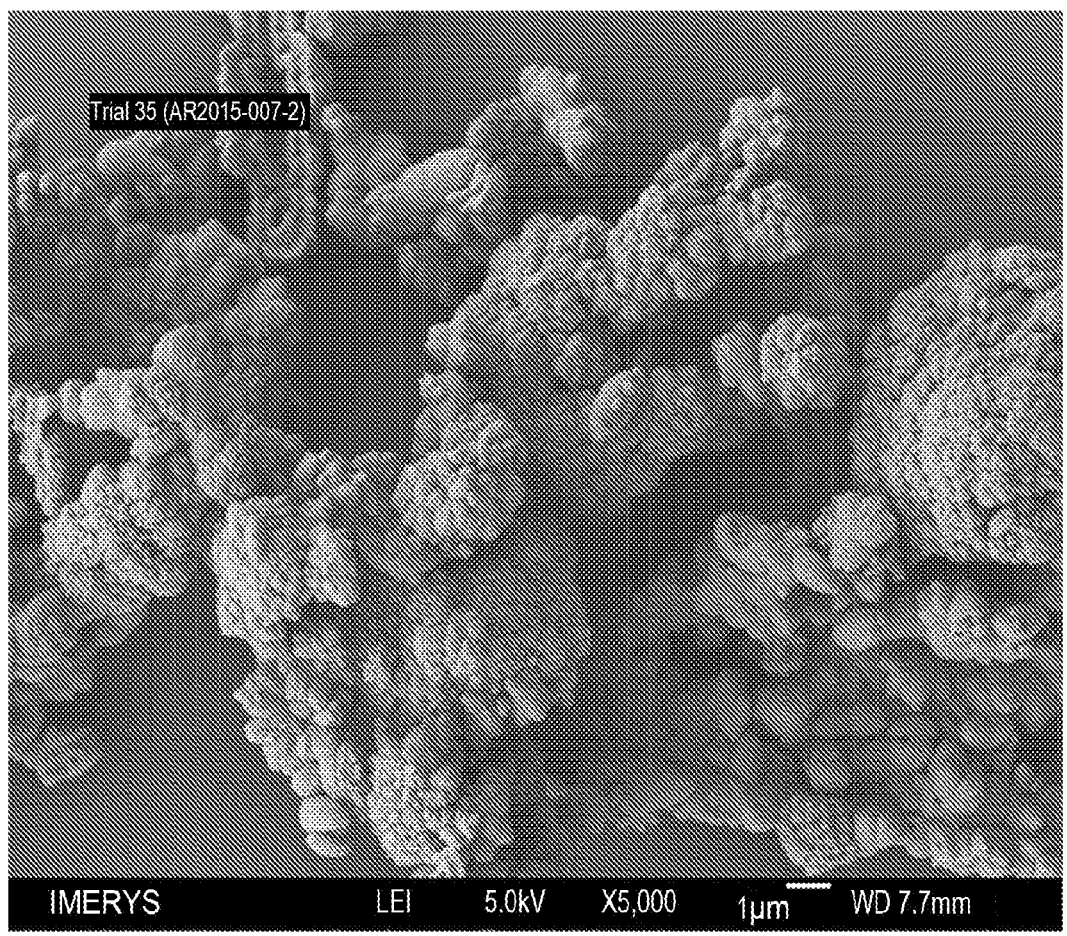
FIG. 33 is an SEM image of a Carbonate Blend (est. ~7.3% $MgCO_3$, 22.4% $MgCa(CO_3)_2$ and 61.8% $CaCO_3$) from 1:1 [$CaSO_4$:$MgSO_4$]+Ammonium Carbonate.
Figure 34:
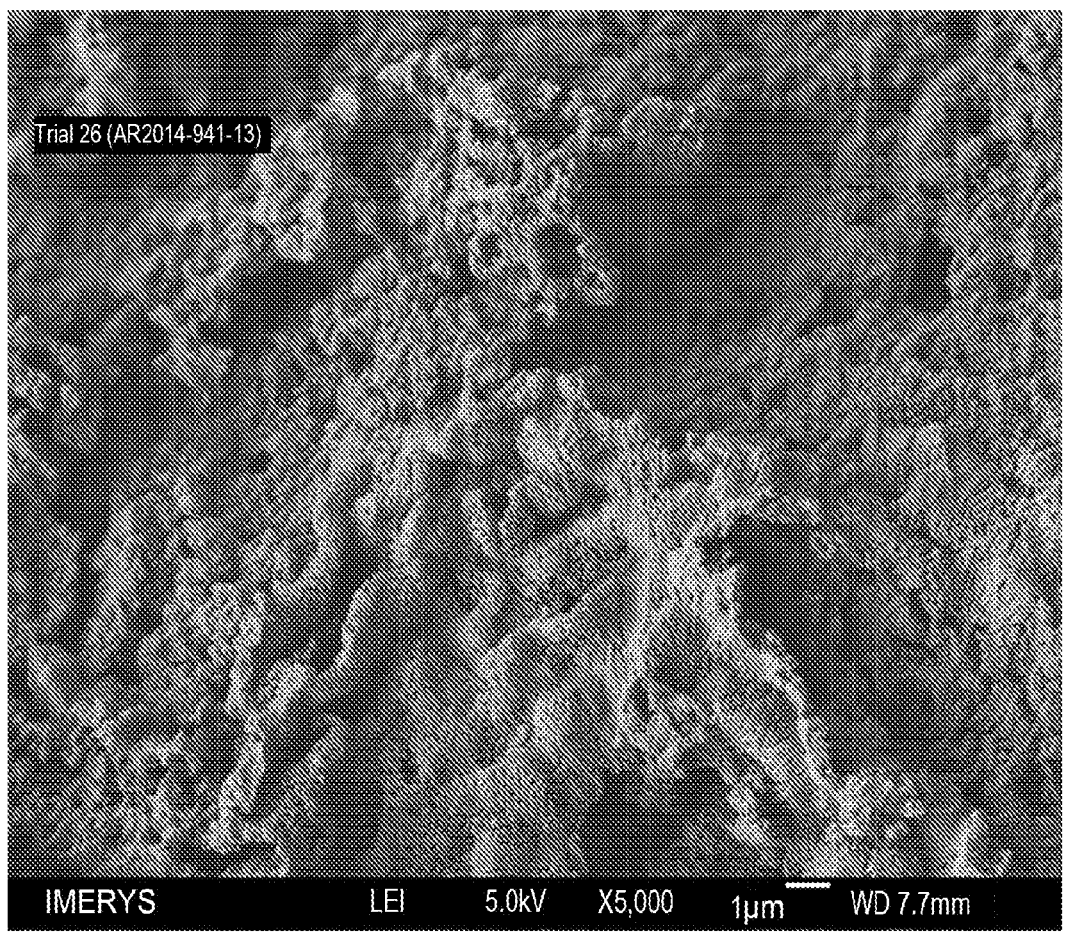
FIG. 34 is an SEM image of $MgCO_3$ from $MgSO_4$+Sodium Carbonate.
Figure 35:
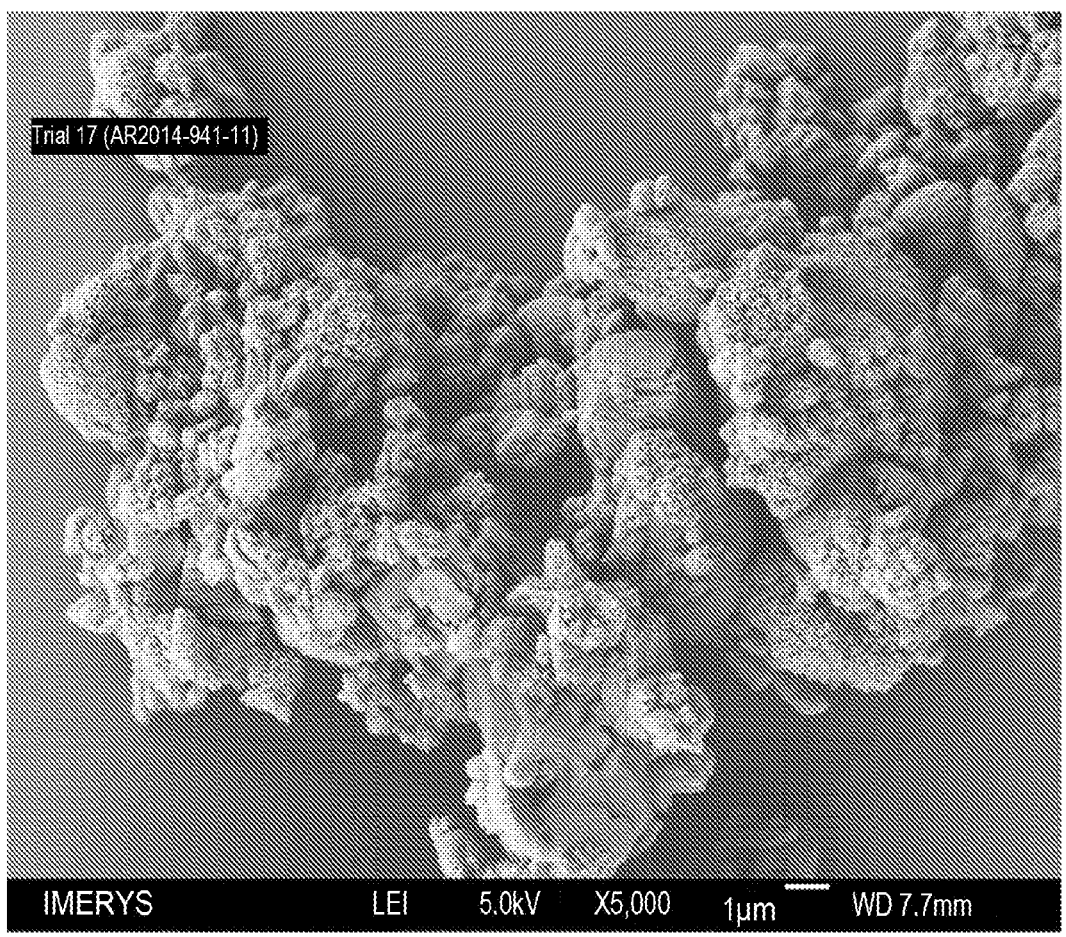
FIG. 35 is an SEM image of a Vaterite, Calcite from Gypsum+Sodium Carbonate.
Figure 36:
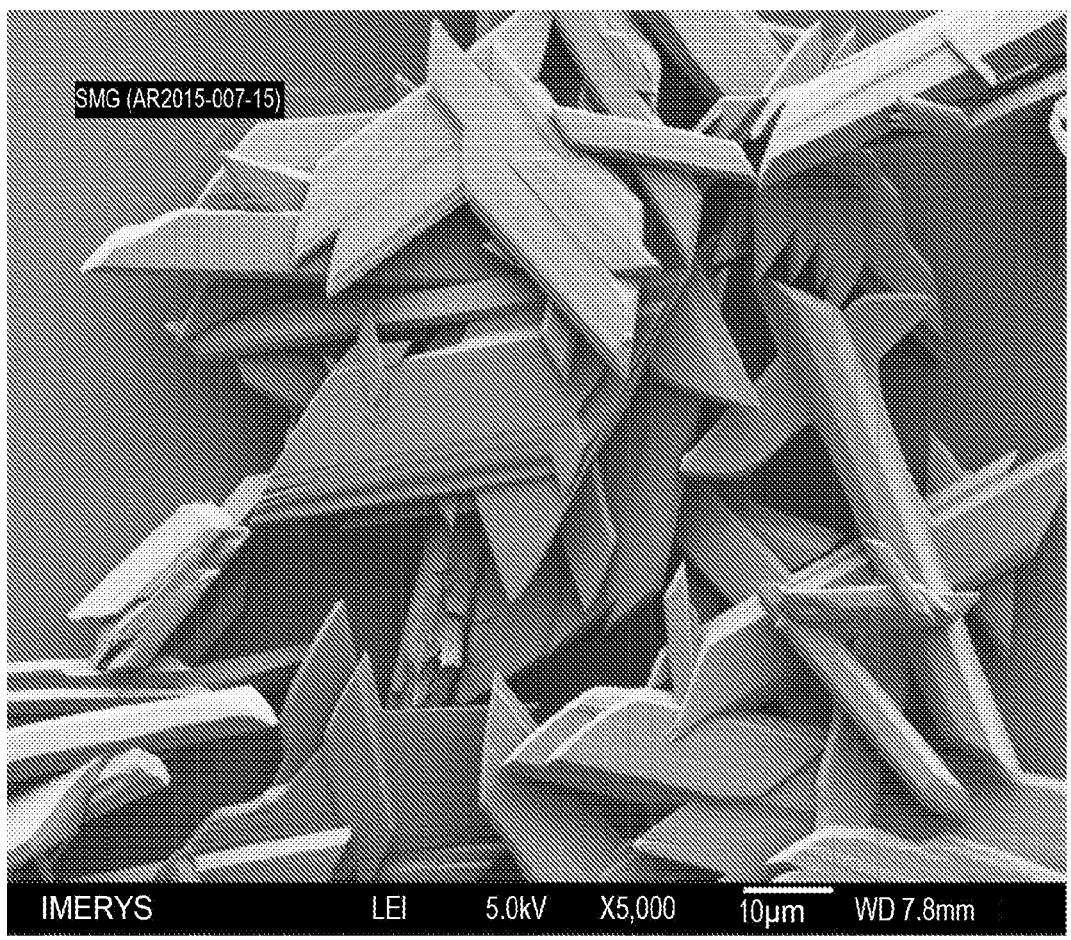
FIG. 36 is an SEM image of Gypsum, 99% (Sigma Gypsum) Used for Most Trials (Except Where Noted).
Figure 37:
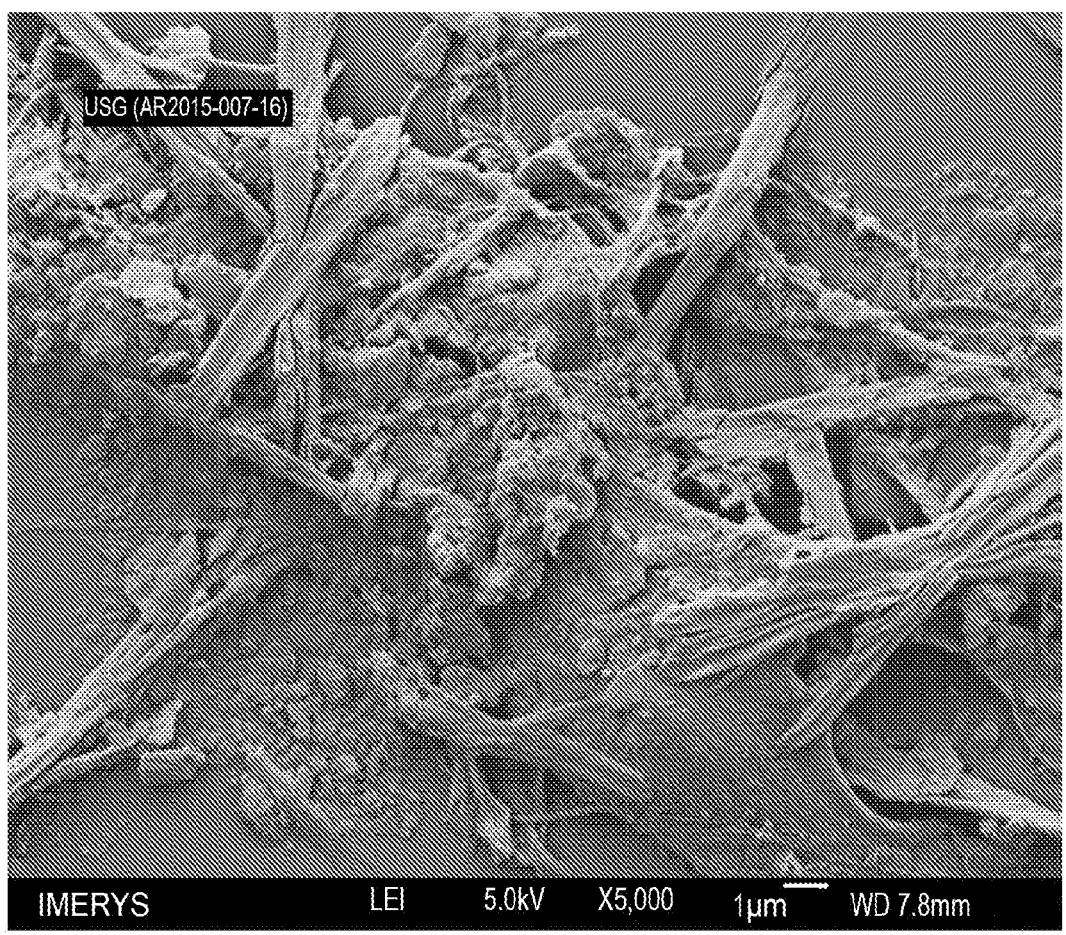
FIG. 37 is an SEM image of a US Gypsum.
Figure 38:
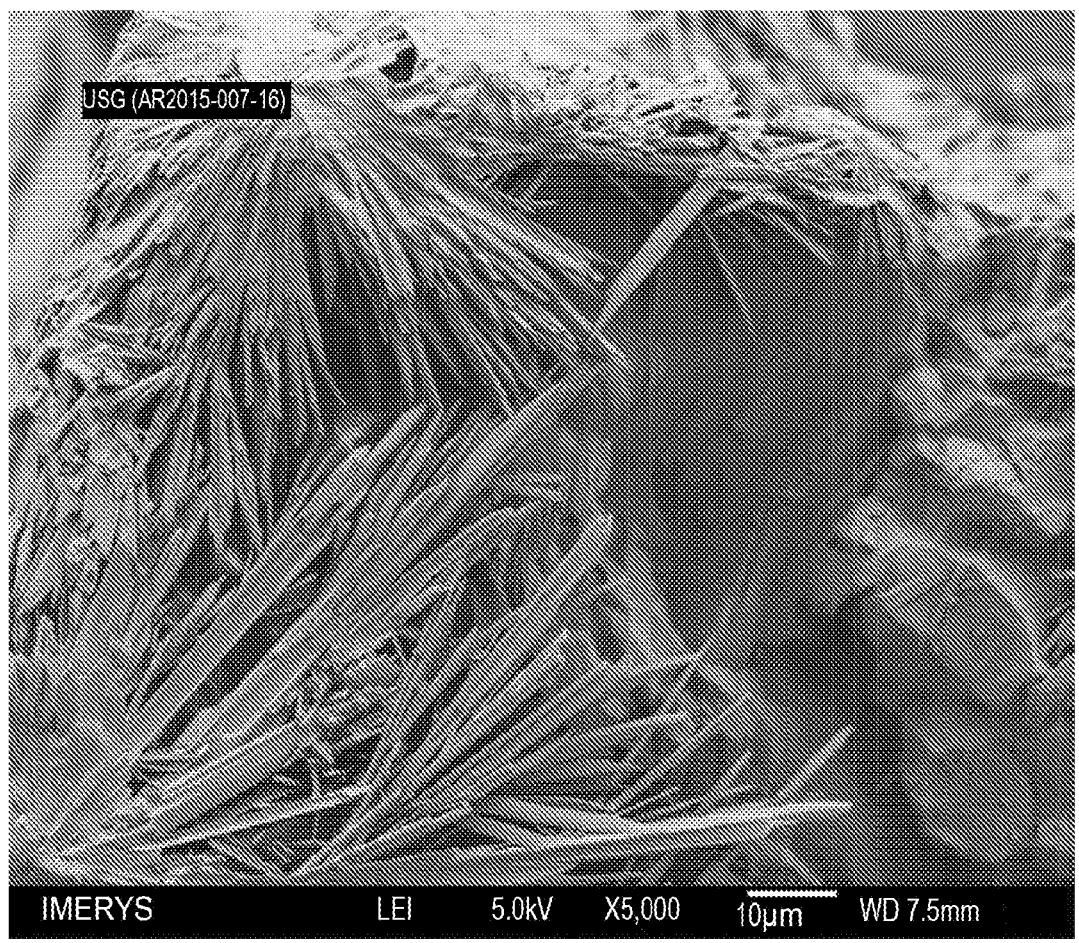
FIG. 38 is an SEM image of a US Gypsum.

An example of a qualitative understanding of cubicity can be shown by comparing FIG. 14 with FIG. 24. FIG. 14 shows a PCC composition having a relatively low surface area to particle size ratio because of the relatively smooth, planar faces of the particles. FIG. 24, by contrast, shows a PCC composition having relatively non-planar faces because of protrusions on the faces of the particles, and therefore, the composition shown has a higher surface area and a lower cubicity.

FIG. 41 shows an exemplary measurement of squareness. According to some embodiments, the PCC compositions may have a squareness in a range from about 70 degrees to about 110 degrees. Five measurements of angles between the planar faces of the PCC particles in FIG. 41 were taken using IMAGE J analysis software, one of which is shown in FIG. 41. Angles were measured by randomly selecting particles from those having faces normal to the plane of the image The measured angles between the edges were 74.6 degrees, 105.2 degrees, 109.6 degrees, 82.6 degrees, and 74.3 degrees. According to some embodiments, the squareness of the PCC particles may be in a range from about 70 degrees to about 110 degrees, such as, for example, in a range from about 75 degrees to about 105 degrees, or from about 80 degrees to about 110 degrees.

In the present disclosure, the monodispersity of the product refers to the uniformity of crystal size and polymorphs. The steepness ($d_{70}/d_{30}$), as defined above, refers to the particle size distribution bell curve, and is a monodispersity indicator. In the present disclosure, the preferred PCC product is monodisperse with a steepness less than 2.5, or less than 2.0, or greater than 1.67, or greater than 1.53. According to some embodiments, the PCC may have a steepness in a range from about 1.0 to about 4.0, such as, for example, in a range from about 1.0 to about 3.0, from about 1.3 to about 2.4. In some embodiments, the steepness may vary according to the morphology of the PCC. For example, calcite may have a different steepness than vaterite.

The present disclosure enables the generation of varied PSD and polymorphs of the PCC product, which can be formed as vaterite, aragonite, calcite (e.g., rhombic calcite), or amorphous calcium carbonate. In general, lower reaction temperature yields smaller/finer, higher surface area vaterite 'balls'. In general, lower excess of ammonium carbonate yields smaller/finer crystals within aggregates, and higher surface area products.

In one embodiment, the PCC composition of the present disclosure is characterized by a single vaterite crystal polymorph content of greater than or equal to 30% by weight relative to the total weight of the composition, or greater than or equal to 40% by weight, or greater than or equal to 60% by weight, or greater than or equal to about 80% by weight, or greater than or equal to about 90% by weight.

In one embodiment, the vaterite PCC has a geometry comprising spherical coral, elliptical coral, rhombic, flower-shaped or mixtures thereof.

In another embodiment, the vaterite PCC has a PSD ($d_{50}$) ranging from 2.0-7.0, or 2.4-6.0, or 2.6-5.5 microns.

In another embodiment, the vaterite PCC has a steepness ($d_{70}/d_{30}$) ranging from 1.0-2.7, or 1.2-2.5, or 1.4-2.4.

In another embodiment, the vaterite PCC has a BET surface area ranging from 8-18, or 10-17, or 10.4-16.1 m$^2$/g.

In another embodiment, the vaterite PCC may have an amount of hydrophobizing agent in a range from about 10 m$^2$/g to about 17 m$^2$/g to coat the particles.

The present disclosure also relates to a precipitated calcium carbonate compound with a calcite polymorph. The calcite precipitated calcium carbonate described within has improved structural characteristics, such as particle size distribution (PSD), steepness, and BET surface area, as compared to heretofore known calcite precipitated calcium carbonate. See Table 3 for a comparison of calcite manufactured from the process herein and a known PCC calcite.

In one embodiment, the PCC composition of the present disclosure is characterized by a single calcite crystal polymorph content of greater than or equal to 30% by weight relative to the total weight of the composition, or greater than or equal to 40% by weight, or greater than or equal to 60% by weight, or greater than or equal to about 80% by weight, or greater than or equal to about 90% by weight.

In one embodiment, the calcite PCC has a rhombic geometry. In general, seeding gypsum with crystalized calcium carbonate consistently yields rhombic PCC. Seeding with calcite, dolomite, or magnesite yields rhombic PCC. In general, seeding with coarse scalenohedral PCC >5% yields a larger/coarser and a higher surface area product. In general, seeding with fine rhombohedral PCC <5% yields a finer crystal size within the aggregate; >5% gives finer aggregates. In the absence of seeding, ammonium carbonate conditions influence rhombic PCC formation.

In one embodiment, rhombic PCC yielded may be small stacked plates of 300-500 nm, forming inconsistent or consistent particle shapes, having a $d_{50}$ 1-6 μm, a steepness of 1.1-1.8, and surface area 2-5 m$^2$/g.

Table 4 below identifies product characteristics obtained from various examples of the foregoing methods.

TABLE 4

Figure 8:
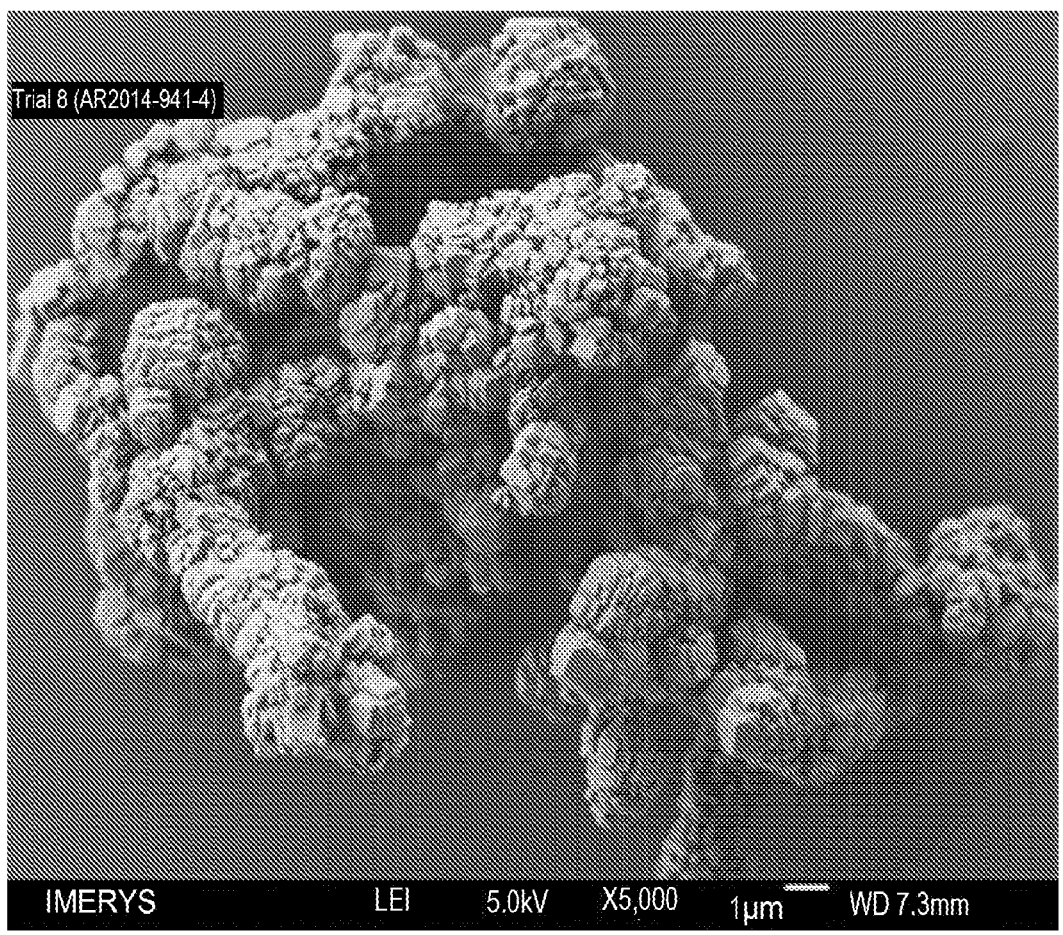
FIG. 8 is an SEM image of a rhombic calcite, 300-500 nm from calcite-seeded gypsum.
Figure 9:
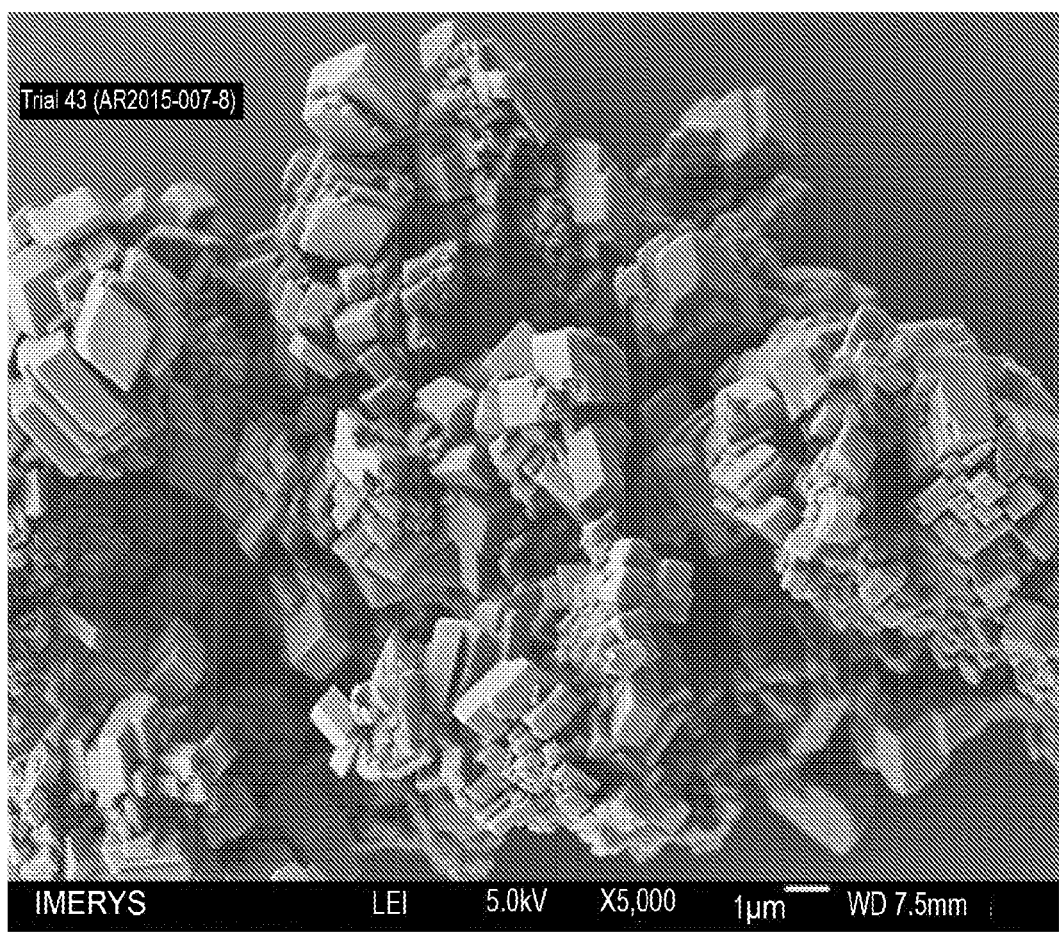
FIG. 9 is an SEM image of a rhombic calcite, 1-3 μm from dolomite seeded-gypsum.
Figure 10:
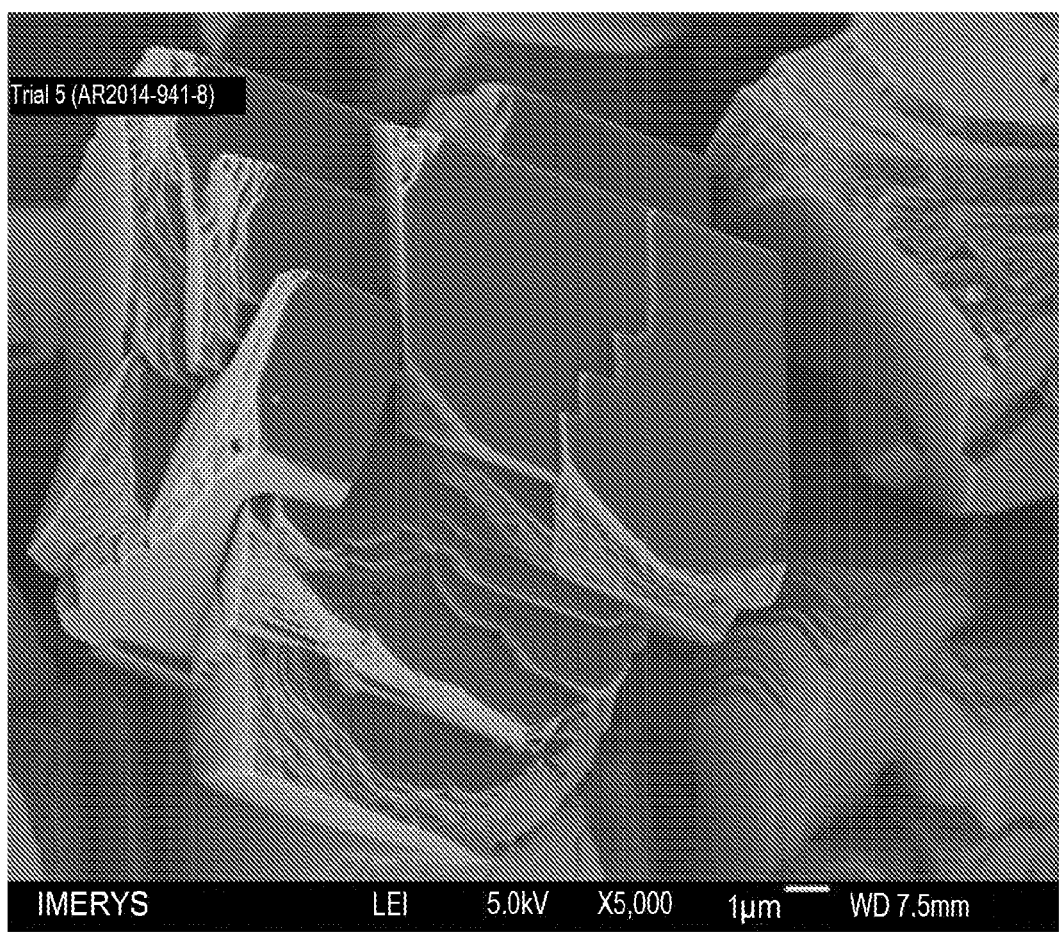
FIG. 10 is an SEM image of a rhombic calcite, 5 μm from calcite seeded-gypsum.
Figure 11:
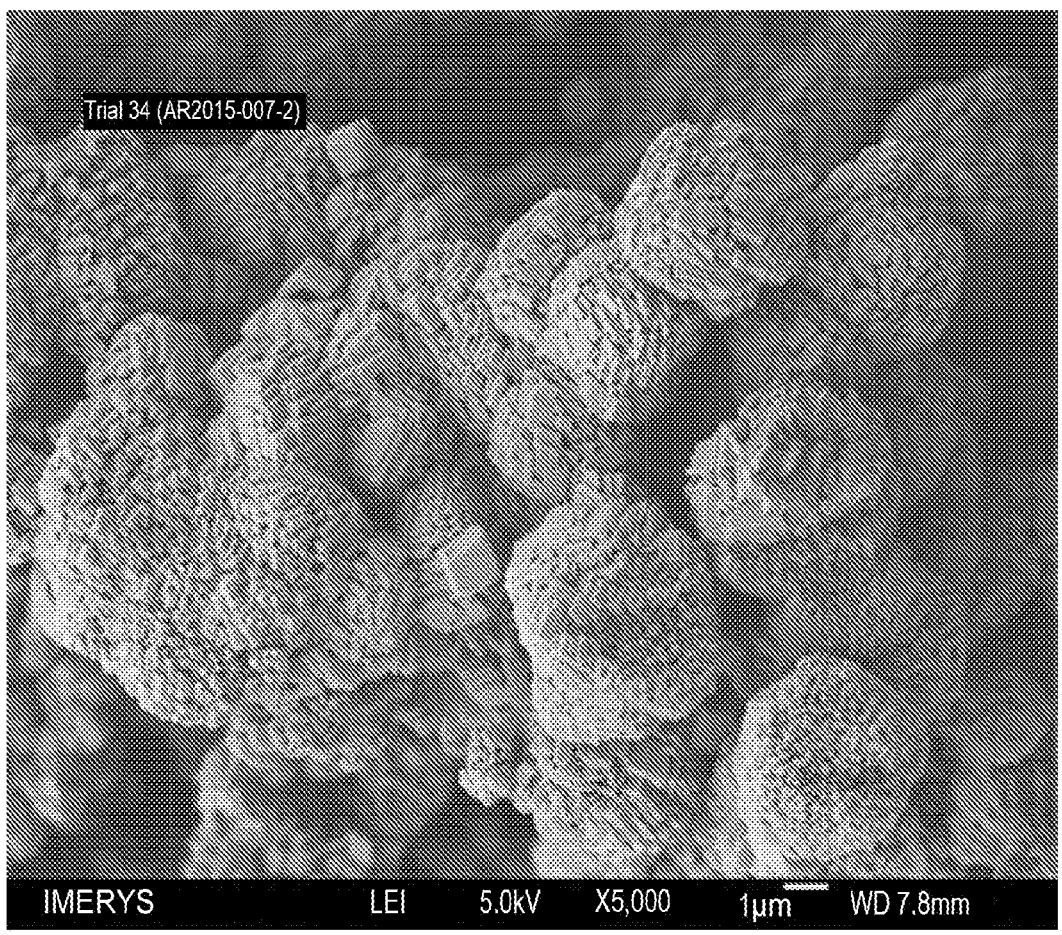
FIG. 11 is an SEM image of a rhombic calcite, 300 nm-1 μm from magnesite-seeded gypsum.
Figure 12:
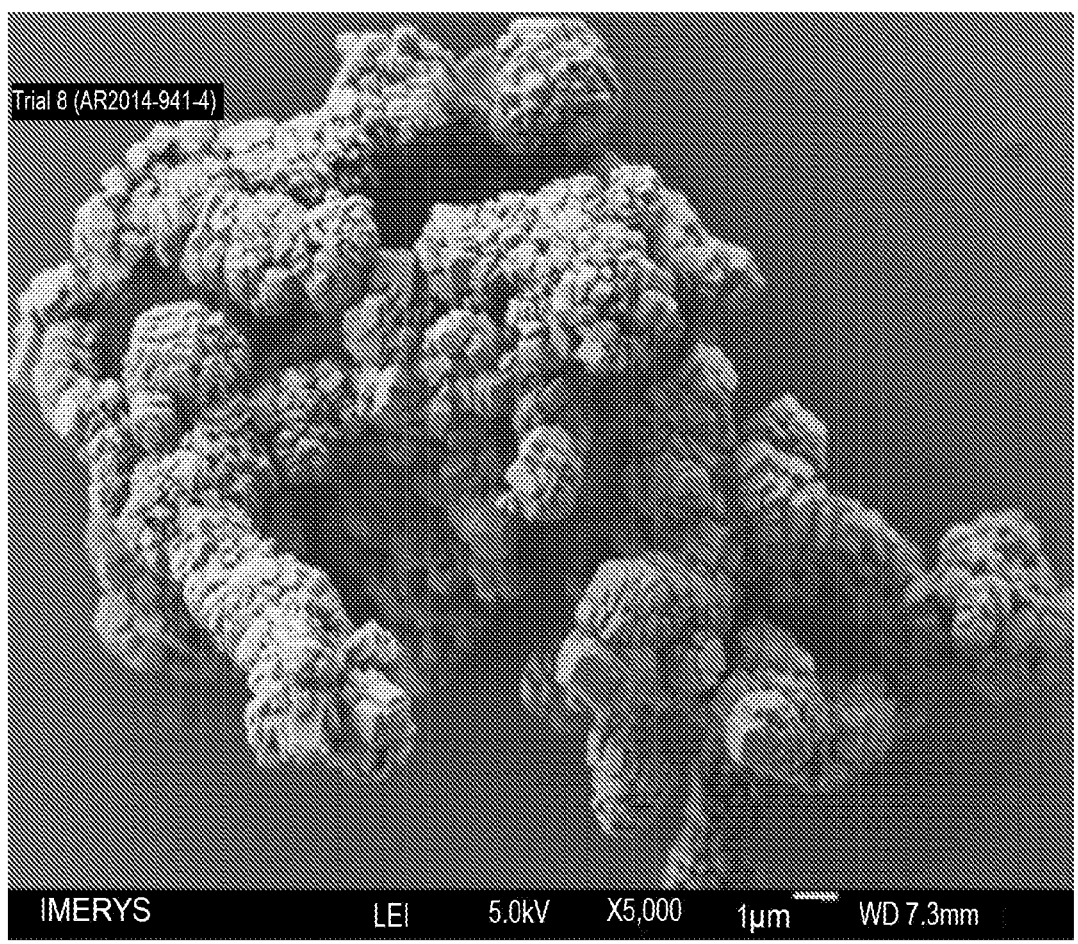
FIG. 12 is an SEM image of a calcite ~300-500 nm with 2% calcite seeding and low theoretical ammonium bicarbonate content in ammonium carbonate.
Figure 13:
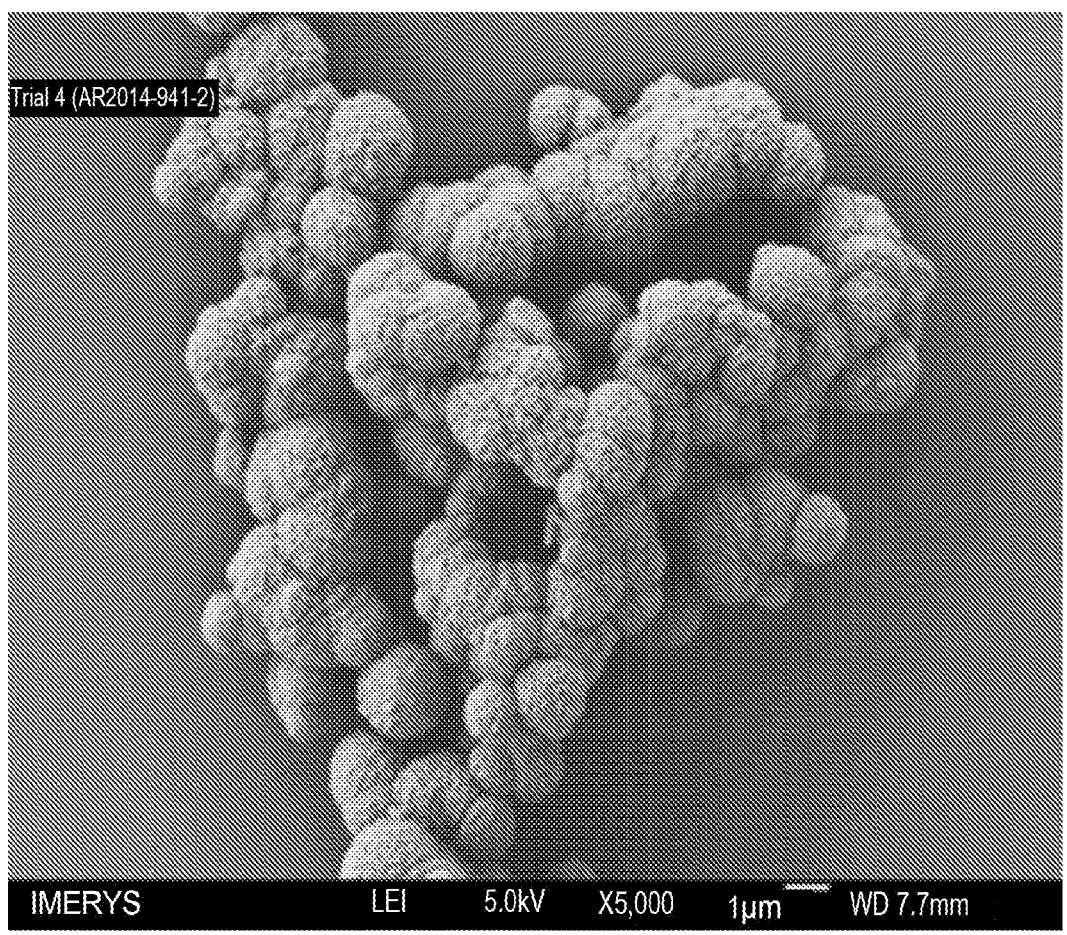
FIG. 13 is an SEM image of a vaterite ~300-500 nm with no seeding and low theoretical ammonium bicarbonate content in ammonium carbonate.

| PCC | SEM | Individual Particle Size (est.) | Particle Size Distribution (d50), agglomerates (μm) | Steepness (d30/d70 × 100) | Surface Area (m$^2$/g) |
|---|---|---|---|---|---|
| Rhombic | See FIG. 8 | 300-500 nm | 4.6 | 60 | 4.6 |
| Rhombic | See FIG. 9 | 1-2 μm | 4.9 | 61 | 2.6 |
| Rhombic | See FIG. 10 | ~5 μm | 27.1 | 73 | 2.8 |

In another embodiment, the calcite PCC has a PSD ($d_{50}$) ranging from 1.8-6.0, or 2.2-5.8, or 2.8-5.6 microns.

In another embodiment, the calcite PCC has a steepness ($d_{70}/d_{30}$) ranging from 1.0-2.5, or 1.2-2.0, or 1.4-1.8.

In another embodiment, the calcite PCC has a BET surface area ranging from 3.0-7.0, or 3.1-6.0, or 3.5-5.0 $m^2/g$.

In another embodiment, the calcite PCC may have an amount of hydrophobizing agent in a range from about 0.15 $m^2/g$ to about 8 $m^2/g$ to coat the particles.

The present disclosure also relates to a precipitated calcium carbonate compound with an aragonite polymorph. The aragonite precipitated calcium carbonate described within has improved structural characteristics, such as particle size distribution (PSD), steepness, and BET surface area, as compared to heretofore known aragonite precipitated calcium carbonate.

In one embodiment, the PCC compound of the present disclosure is characterized by a single aragonite crystal polymorph content of greater than or equal to 30% by weight relative to the total weight of the composition, or greater than or equal to 40% by weight, or greater than or equal to 60% by weight, or greater than or equal to about 80% by weight, or greater than or equal to about 90% by weight.

According to some embodiments, after forming the PCC compound of the present disclosure, the morphology may be changed through post-processing techniques, such as aging. For example, according to some embodiments, an amorphous PCC may be used as a precursor to convert into a crystalline morphology, such as vaterite, argonite, or calcite. According to some embodiments, a metastable PCC, such as vaterite or argonite, may be converted to calcite through aging, such as, for example, wet aging. The amount of vaterite converted to calcite through aging may be varied by adjusting the properties of the aging conditions. For example, the aging may be varied by the presence or absence of ammonium sulfate, including the amount of ammonium sulfate, the aging temperature, and the concentration of wet cake solids. According to some embodiments, when less than about 90% vaterite is present, the vaterite will convert to calcite. When greater than or equal to about 90% vaterite is present, the vaterite can be retained in a dry powder or wet cake. The amount of retained vaterite may vary depending on the aging parameters. According to some embodiments, vaterite can be converted to calcite through a mechanical process, such as by grinding or ball milling the vaterite.

Figure 39:
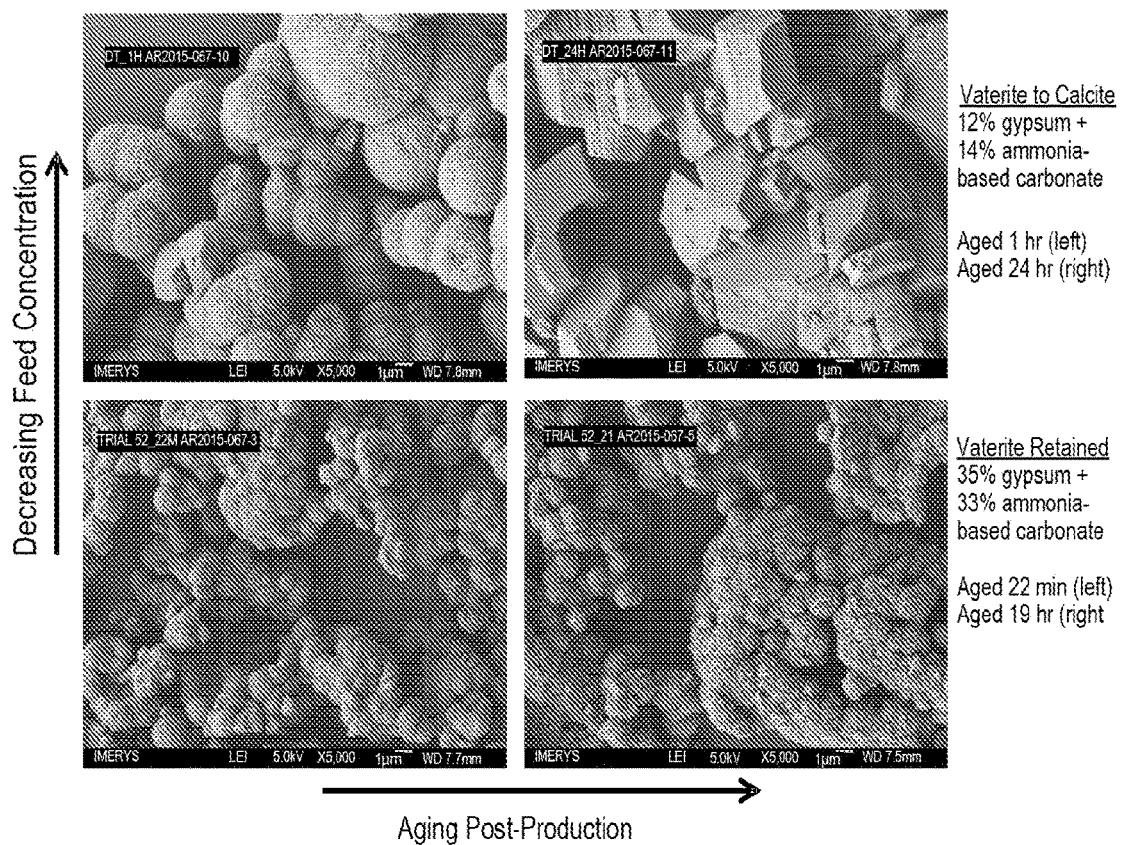
FIG. 39 shows SEM images of vaterite to calcite conversion for various feed concentrations and aging processes.
Figure 40:
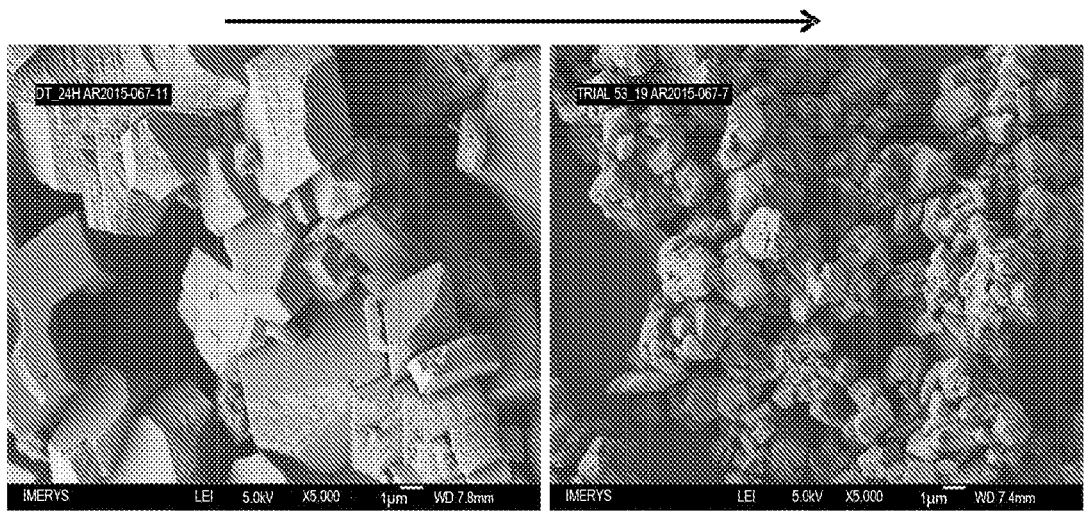
FIG. 40 shows SEM images for different feed concentrations.

According to some embodiments, the concentrations of gypsum and ammonium carbonate may influence the conversion of vaterite to calcite. For example, higher concentrations of gypsum and ammonium carbonate may produce vaterite PCC that is more stable (e.g., resistant to converting to calcite) than vaterite PCC produced using lower concentrations of gypsum and ammonium carbonate. For example, when 10.7% gypsum and 12.5% ammonium carbonate (1:3.7 molar ratio (gypsum:ammonium carbonate)) are reacted at room temperature, the reaction forms vaterite that converts to calcite in the presence of ammonium sulfate within 24 hours. When higher concentrations of gypsum and ammonium carbonate are used in the reaction, the vaterite produced may be more stable. For example, when 35% gypsum and 33% ammonium carbonate (1:1.7 molar ratio (gypsum:ammonium carbonate)) are reacted at room temperature, the reaction forms vaterite, but the vaterite is stable in the presence of ammonium sulfate for at least 24 hours. In other embodiments, impurities, such as, for example, iron present in either gypsum or ammonium-based carbonates may assist stabilizing vaterite PCC produced by the methods described herein. According to some embodiments, the conversion of vaterite to calcite may be controlled through the storage of the vaterite. For example, vaterite in liquid suspension with ammonium sulfate may convert to calcite may be inhibited relative to cakes of vaterite having about 40-60% solids without ammonium sulfate. According to some embodiments, the conversion of vaterite to calcite may reduce the surface area of the PCC formed. For example, the conversion of vaterite to calcite may reduce the surface area of the PCC from greater than 10 $m^2/g$ (vaterite) to less than 1 $m^2/g$ (calcite). According to some embodiments, the conversion of vaterite to calcite may increase the particle size of the PCC. In other embodiments, the conversion of vaterite to calcite may not significantly change the particle size of the PCC. Other additives, such as, for example, citric acid may inhibit the conversion of vaterite to calcite. For example, about 5% by weight citric acid on vaterite may inhibit the conversion to calcite. According to some embodiments, adding ammonium bicarbonate may accelerate the conversion of vaterite to calcite, whereas ammonium sulfate in concentrations from about 0.5% to about 10% by weight may slow or inhibit the conversion to calcite. FIG. 39 shows exemplary effects on morphology of the PCC by varying the feed concentrations and the aging process. FIG. 40 shows exemplary effects of the feed composition on PCC.

According to some embodiments, the methods of forming the PCC compound may be performed in a continuous process, such as, for example, using a tubular reactor. In some embodiments, in the continuous process, the reactants may be mixed in such a way as to cause cavitation.

Commercial Applications

According to certain embodiments, the present disclosure relates to commercial applications of the vaterite, calcite, and/or aragonite precipitated calcium carbonate compound described herein, in one or more of its embodiments.

According to one embodiment, the present disclosure relates to a polymer film or a breathable polymer film containing the vaterite, calcite, and/or aragonite precipitated calcium carbonate compound in one or more of its embodiments.

According to one embodiment, the present disclosure relates to a pulp or paper material containing the vaterite, calcite, and/or aragonite precipitated calcium carbonate compound in one or more of its embodiments.

According to one embodiment, the present disclosure relates to a diaper comprising a breathable polymer film containing the vaterite, calcite, and/or aragonite precipitated calcium carbonate compound in one or more of its embodiments.

According to one embodiment, the present disclosure relates to a filled polymer composition comprising the PCC of the present disclosure in one or more of its embodiments as filler, wherein the polymer can be any desired polymer or resin.

According to some embodiments, the PCC compositions may be used as a filler for various applications. Exemplary applications include, but are not limited to, fillers or additives for plastics, paper coatings, adhesives, sealants, caulks, paper, moldings, coatings, paint, rubber products, and concrete. For example, the PCC compositions may be used as a filler or additive for polyvinylchloride (PVC), plasticized PVC (pPVC), polypropylene (PP), rubber, coatings, paint, ceramics, paper, or concrete. Some exemplary uses include use as a filler or additive for PVC pipes or moldings, pPVC, paint (e.g., exterior paint or road paint), tile coatings (e.g., ceiling tile coatings), decorative coatings, moldings (e.g., PVC moldings, pPVC moldings, or PP moldings), sheet molding compounds, bulk molding compounds, adhesives, caulks, sealants, rubber products, paper, paper fillers, paper coatings, or concrete. According to some embodiments, the relatively lower surface area of the PCC compositions may be suitable as a filler and may have improved dispersibility. The PCC compositions may have relatively high brightness (e.g., greater than 90) and may have a consistent brightness, which may improve the color of a given product in an application. The PCC compositions disclosed herein may have a relatively low surface area when compared to other calcium carbonate products, such as, for example, ground calcium carbonate (GCC). The relatively low surface area may contribute to low adsorption of additives by the PCC, reduced amounts of additives to treat a surface of the PCC, and/or low moisture pick-up by the PCC. According to some embodiments, the relatively lower surface area may contribute to a relatively lower viscosity of the material to which the PCC is added and/or a greater amount of "active" particles when used as a filler or additive, such as, for example, in polymer films. According to some embodiments, a broad particle size distribution of the PCC may increase particle packing, whereas a steep or narrow particle size distribution of the PCC may decrease particle packing. According to some embodiments, a relatively smaller PCC particle size may improve the gloss of a coating, such as, for example, a paper coating or paint, containing the PCC composition. A relatively smaller particle size may also improve the impact resistance of a material, such as, for example, a molded product or coating, containing the PCC composition.

According to some embodiments, the steepness and/or cubicity of the PCC particles described herein may improve the handling properties of powders. For example, the steepness and/or cubitcy of the PCC particles may improve the flowability of powders.

According to some embodiments, the PCC compositions described herein may have improved oil absorption properties. Improved oil absorption may, for example, improve the flowability of paints or powders incorporating the PCC compositions.

According to some embodiments, the PCC compositions, such as the vaterite PCC compositions, may be for various applications, including but not limited to drug delivery, medical devices, biosensing, encapsulation, tracing, polymer fillers, cavitation enhancement in films, heavy metal sequestration, as a nucleation agent (for example, a foam nucleation agent), an abrasive, FGD feeds, synthetic paper component, or an emulsion systems filler. In some embodiments, the PCC, such as vaterite PCC, may be used as a drug delivery agent or component. For example, vaterite may be used as a platform for small molecule or protein absorption or adsorption, such as into the pores of the vaterite. Vaterite may also be used, in some embodiments, as a microparticle or microcapsule for drug encapsulation or drug delivery, for example, vaterite may be used to encapsulate molecules including, but not limited to, insulin, bovine serum albumin, and lysozymes. In some embodiments, encapsulation may occur during a phase transition of the PCC from vaterite to calcite. Such encapsulation may promote controlled release of the encapsulated molecules. In some embodiments, encapsulation may occur through absorption or adsorption of the molecules into the pores of the vaterite. In other embodiments, encapsulation may occur through direct encapsulation during the formation of the PCC particles. In other embodiments, encapsulation may occur through hollow-centered PCC particles.

According to some embodiments, vaterite may be used as a controlled release agent. For example, vaterite may be exposed to highly acidic environments to control release. Vaterite exposed to such environments may break down, thereby releasing the encapsulant or encapsulated, absorbed, or adsorbed molecules. According to some embodiments, the vaterite may serve as a template protein structure to control release of a molecule. According to some embodiments, the vaterite may be used as a template for cross-linking polymer, such as, for example, biopolymers. In some embodiments, the polymers may be cross-linked using the vaterite as a template. Subsequent removal of the vaterite may result in a cross-linked polymer having a structure similar to the vaterite template (e.g., spherical).

According to some embodiments, the PCC, such as vaterite, may be used in medical devices, such as, for example, implantable medical devices. In some embodiments, vaterite may exhibit rapid bioabsorption, for example, due to vaterite's high surface area. Because of rapid absorption, vaterite may be used as a calcium source for biological applications, such as, for example, bone regeneration. Vaterite may also assist in the generation of bone minerals, such as phosphate bone minerals, such as hydroxyapatite. In some embodiments, the hydroxyapatite or other small molecules may be encapsulated by the vaterite or PCC, or may be bound (either chemically or physically) to the surface of the vaterite. Conversion of the vaterite to calcite, in some embodiments, may also promote binding of the PCC to bone.

According to some embodiments, the PCC, such as vaterite, may be used in biosensing applications. For example, vaterite may be used in biosensing of pH changes or ion sensing. In some embodiments, a fluorescent pH sensor may be encapsulated by the vaterite, such as, for example, in tracing applications.

According to some embodiments, the PCC, such as vaterite may be used as a filler for polymers. For example, the vaterite may be used in polymer films, such as, for example, cavitation enhancement. In some embodiments, the vaterite may promote more uniform cavitation of pores and may increase the breathability of the film.

According to some embodiments, PCC, such as vaterite, may encapsulate metals, such as heavy metals. For example, encapsulation may occur through a phase change from vaterite to calcite.

According to some embodiments, the PCC, such as vaterite, may be used as a nucleating agent. In some embodiments, the vaterite may act as a foam nucleating agent.

According to some embodiments, the PCC, such as vaterite, may be used as an abrasive, such as, for example, a cleaning abrasive.

According to some embodiments, the vaterite may be used as a feed material in an FGD process. In some embodiments, the increased surface area of the vaterite may improve reactivity and/or increase the reaction rate. For example, the vaterite may neutralize sulfuric acid generated in the FGD process.

According to some embodiments, the properties of vaterite PCC compositions described in this disclosure may be beneficial for various applications. For example, a polymorph shift may be induced under shear and/or heat. For example, the vaterite may convert to needle-like particles or rhombic particles. A polymorph shift may, in some embodiments, be influenced by the presence of surfactants or macromolecules. A polymorph shift may also be influenced by inclusions in the vaterite structure, such as metals or other ions. For example, polymorph changes may be mitigated through the use of surfactants, reacting the vaterite in the presence of metals, or through the use of additives. Additives may include, but are not limited to, acids or additives for biomineralization, such as, for example, ovalbumin, glutamic acid, or aspartic acid.

The examples below are intended to further illustrate examples of a process for desulfurizing flue gas to form gypsum and for converting gypsum thus obtained or limestone into precipitated calcium carbonate with desired polymorph and crystal size.

Example 1

Gypsum or other sulfate was slurried in water at 33% solids. Ammonium carbonate was dissolved in water at elevated temperature in a concentration to give a 1:1.7 [gypsum:ammonium carbonate] molar ratio for reaction. Alternative carbonate feeds were dissolved in water at room temperature in an amount to give a 1:1.7 [sulfate:carbonate] molar ratio for reaction. The sulfate slurry and carbonate solution were mixed and allowed to react for at least 10 minutes. The slurry was then filtered and the slurry cake washed with water. Reaction cake and decanted liquid were chemically and physically analyzed by FTIR, DSC, SEM, Sedigraph, and BET surface area analysis. Reactions involving this process are described in Table 1 and 2.

Example 2

For reactions involving ammonium carbonate production from ammonium hydroxide and $CO_2$, sulfate was slurried at ambient temperature and pressure as described above. Ammonium hydroxide was added to the sulfate slurry just prior to the mixture being poured in a reaction vessel. The reaction vessel was closed, then heated or cooled to a selected temperature with stirring. $CO_2$ was bubbled through the reaction vessel with stirring for a minimum 1 hour. After 1 hour of reaction time, a small portion of the slurry was removed and checked for full conversion to PCC by phenylphthalene color change. Upon reaction completion, the slurry was removed from the reaction vessel, filtered, washed and analyzed as described above. Reactions involving this process are described in Table 1.

What is claimed is:

1. A process for treating a sulfurous fluid to form gypsum and magnesium carbonate, comprising:
   contacting the sulfurous fluid with a sequestrating agent to yield a scrubbed fluid, gypsum and magnesium sulfate; and
   reacting a carbonate salt with the magnesium sulfate to produce a magnesium carbonate; wherein the carbonate salt comprises a carbonate anion and at least one cation selected from the group consisting of sodium, calcium, potassium, ammonium, magnesium, and hydronium.
2. The process of claim 1, further comprising separating at least a portion of the gypsum from the magnesium sulfate to form a gypsum product.
3. The process of claim 2, wherein the separating is by filtration or centrifugation.
4. The process of claim 2, wherein the moisture content of the gypsum product after separating does not exceed 10%.
5. The process of claim 2, wherein the gypsum product comprises at least one impurity selected from the group consisting of a carbonate, a sulfate, an iron mineral, and an organic species.
6. The process of claim 1, wherein the sequestrating agent is a calcium-containing carbonate mineral.
7. The process of claim 6, wherein the calcium-containing carbonate material is dolomite or dolomitic limestone.
8. The process of claim 6, wherein the calcium-containing carbonate mineral has an average particle size ranging from 50 µm to 100 µm.
9. The process of claim 1, wherein the sulfurous fluid is a flue gas with a temperature ranging from 350° C. to 1200° C.
10. The process of claim 1, wherein the contacting removes 98 to 99% of sulfur from the sulfurous fluid.
11. The process of claim 1, further comprising flowing a sulfurous fluid into a mixture comprising water and a sequestrating agent, wherein the pH of the mixture is controlled during the flowing by controlling a flow rate of the sulfurous fluid into the mixture, adding a buffer to the mixture, or both.
12. The process of claim 11, wherein the buffer is ammonia, a dibasic acid, or both.
13. The process of claim 11, wherein the mixture has a pH from 5 to 6 during the flowing.
14. The process of claim 11, further comprising flowing oxygen into the mixture concurrently with the sulfurous fluid to reduce a concentration of sulfites in the mixture.
15. The process of claim 1, wherein the magnesium carbonate is amorphous with a surface area greater than or equal to 20 m2/g.
16. The process of claim 1, further comprising seeding the magnesium sulfate prior to the reacting by adding gypsum, a carbonate salt seed, or both to control the production of the magnesium carbonate.
17. The process of claim 1, wherein said magnesium carbonate is in the form magnesite.
18. The process of claim 1, further comprising: separating at least a portion of the gypsum from the magnesium sulfate to form a gypsum product; and processing the gypsum to form a processed gypsum.
19. The process of claim 18, wherein the processing is at least one process selected from the group consisting of grinding, milling, recrystallizing, magnetically separating, bleaching, acid washing, and beneficiating.
20. The process of claim 18, wherein the processed gypsum is 90 to 99% pure gypsum.

* * * * *